US012235503B2

(12) United States Patent
Geens et al.

(10) Patent No.: US 12,235,503 B2
(45) Date of Patent: Feb. 25, 2025

(54) TELECOMMUNICATIONS ENCLOSURE MOUNTING SYSTEM

(71) Applicant: COMMSCOPE TECHNOLOGIES LLC, Hickory, NC (US)

(72) Inventors: Johan Geens, Bunsbeek (BE); Pieter Vermeulen, Westerlo (BE); Geert Jozef Maria Verbist, Herentals (BE); Bart Vos, Geel (BE); Stefan Sepelev, Wavre (BE)

(73) Assignee: CommScope Technologies LLC, Hickory, NC (US)

( * ) Notice: Subject to any disclaimer, the term of this patent is extended or adjusted under 35 U.S.C. 154(b) by 97 days.

(21) Appl. No.: 17/775,246

(22) PCT Filed: Nov. 5, 2020

(86) PCT No.: PCT/US2020/059116
§ 371 (c)(1),
(2) Date: May 6, 2022

(87) PCT Pub. No.: WO2021/092177
PCT Pub. Date: May 14, 2021

(65) Prior Publication Data
US 2022/0397734 A1  Dec. 15, 2022

Related U.S. Application Data

(60) Provisional application No. 63/062,730, filed on Aug. 7, 2020, provisional application No. 62/992,592, filed (Continued)

(51) Int. Cl.
G02B 6/44        (2006.01)

(52) U.S. Cl.
CPC .................. *G02B 6/4452* (2013.01)

(58) Field of Classification Search
CPC .................................... G02B 6/4452
See application file for complete search history.

(56) References Cited

U.S. PATENT DOCUMENTS

| 4,922,056 A | 5/1990 | Larsson |
| 5,495,549 A | 2/1996 | Schneider et al. |

(Continued)

FOREIGN PATENT DOCUMENTS

| CN | 204928011 | 12/2015 |
| CN | 105929511 | 9/2016 |

(Continued)

OTHER PUBLICATIONS

International Search Report and Written Opinion of the International Searching Authority for International Patent Application No. PCT/US2020/059116 mailed Apr. 16, 2021, 13 pages.

(Continued)

*Primary Examiner* — Sung H Pak
(74) *Attorney, Agent, or Firm* — Merchant & Gould P.C.

(57) ABSTRACT

A telecommunications enclosure system includes a terminal assembly including an optical terminal that mounts to a terminal mounting bracket via a mechanical coupling interface. The mechanical coupling interface includes a release actuator that allows the optical terminal to be released from the terminal mounting bracket by accessing the release actuator from a first side of the terminal assembly, and also allows the optical terminal to be released from the terminal mounting bracket by accessing the release actuator from an opposite second side of the terminal assembly.

20 Claims, 64 Drawing Sheets

Related U.S. Application Data on Mar. 20, 2020, provisional application No. 62/963,893, filed on Jan. 21, 2020, provisional application No. 62/932,239, filed on Nov. 7, 2019.

(56) References Cited

U.S. PATENT DOCUMENTS

| | | | |
|---|---|---|---|
| 5,668,911 A | 9/1997 | Debortoli | |
| 6,135,624 A * | 10/2000 | Masters | F21V 21/02 |
| | | | 362/388 |
| 6,215,937 B1 | 4/2001 | Dinh | |
| 7,038,127 B2 | 5/2006 | Harwood | |
| 7,477,824 B2 * | 1/2009 | Reagan | G02B 6/4441 |
| | | | 385/136 |
| 7,558,458 B2 | 7/2009 | Gronvall et al. | |
| 7,627,222 B2 | 12/2009 | Reagan et al. | |
| 7,680,388 B2 | 3/2010 | Reagan et al. | |
| 7,844,160 B2 | 11/2010 | Reagan et al. | |
| 8,213,760 B2 | 7/2012 | Rudenick et al. | |
| 8,718,434 B2 | 5/2014 | Gronvall et al. | |
| 9,939,602 B2 | 4/2018 | Allen | |
| 11,428,886 B2 * | 8/2022 | Cams | H02G 3/10 |
| 2004/0035600 A1 | 2/2004 | Dietrichson et al. | |
| 2006/0198593 A1 | 9/2006 | Ivancevic | |
| 2006/0291144 A1 | 12/2006 | Verding | |
| 2008/0019654 A1 | 1/2008 | Corbeels | |
| 2008/0050085 A1 | 2/2008 | Tinucci | |
| 2008/0224006 A1 | 9/2008 | Call et al. | |
| 2008/0292261 A1 | 11/2008 | Kowalczyk et al. | |
| 2009/0238531 A1 | 9/2009 | Holmberg et al. | |
| 2010/0006723 A1 | 1/2010 | Yan | |
| 2010/0027954 A1 | 2/2010 | Gronvall et al. | |
| 2010/0189404 A1 | 7/2010 | Rudenick et al. | |
| 2011/0103760 A1 | 5/2011 | Cote et al. | |
| 2011/0123166 A1 | 5/2011 | Reagan et al. | |
| 2016/0033056 A1 | 2/2016 | Bishop et al. | |
| 2019/0041597 A1 | 2/2019 | Marcouiller et al. | |
| 2019/0219198 A1 | 7/2019 | Chappell, II et al. | |
| 2019/0248617 A1 | 8/2019 | Kiziah | |

FOREIGN PATENT DOCUMENTS

| | | |
|---|---|---|
| EP | 0932260 | 7/1999 |
| EP | 4036623 | 8/2022 |
| JP | 2002-107592 | 4/2002 |
| JP | 2007-267489 | 10/2007 |
| KR | 10-2010-0001584 U | 2/2010 |
| KR | 20-0455528 Y1 | 9/2011 |
| KR | 10-2085836 | 5/2020 |
| WO | 2010/062626 | 6/2010 |
| WO | 2019/209645 A1 | 10/2019 |

OTHER PUBLICATIONS

Extended European Search Report for Application No. 20884609.7 mailed Oct. 30, 2023.

Coyote 9.5" x 19" (292 mm x 509 mm) Dome Closure, Preformed Line Productts, Aug. 2012, 16 pages. (retrieved via https:// plp.com/vn/images/pdfs/Communications/Fiber_Networks/Coyote_Fiber_Optic_Closures/Coyote_Dome_Closure/sp3138-1coydome9.5.x19_2.pdf) (Year: 2012).

Fiberlign ADSS Storage Bracket, Preformed Line Products, Jan. 2017, 4 pages. (retrieved via https://plp.com/images/pdfs/Energy/Fiber_Optics/Cable_Storage_Systems/FIBERLIGN_ADSS_Storage_Bracket/SP3186-3_FibrlgnADSSstorbrkt.pdf) (Year: 2017).

Fiberlign Cable Storage 2 Assembly for OPGW, Preformed Line Products, Mar. 2017, 4 pages. (retrieved via https//plp.com/za/images/pdfs/Energy/Fiber_Optics/Cable_Storage_Systems/FIBERLIGN_Cable_Storage_2_for_0PGW/SP3233-1_FIBERLIGN_Cable_Storage_2_Assembly_for_OPGW.pdf) (Year: 2017).

Photo showing admitted prior art as of Apr. 23, 2018, 1 page.

* cited by examiner

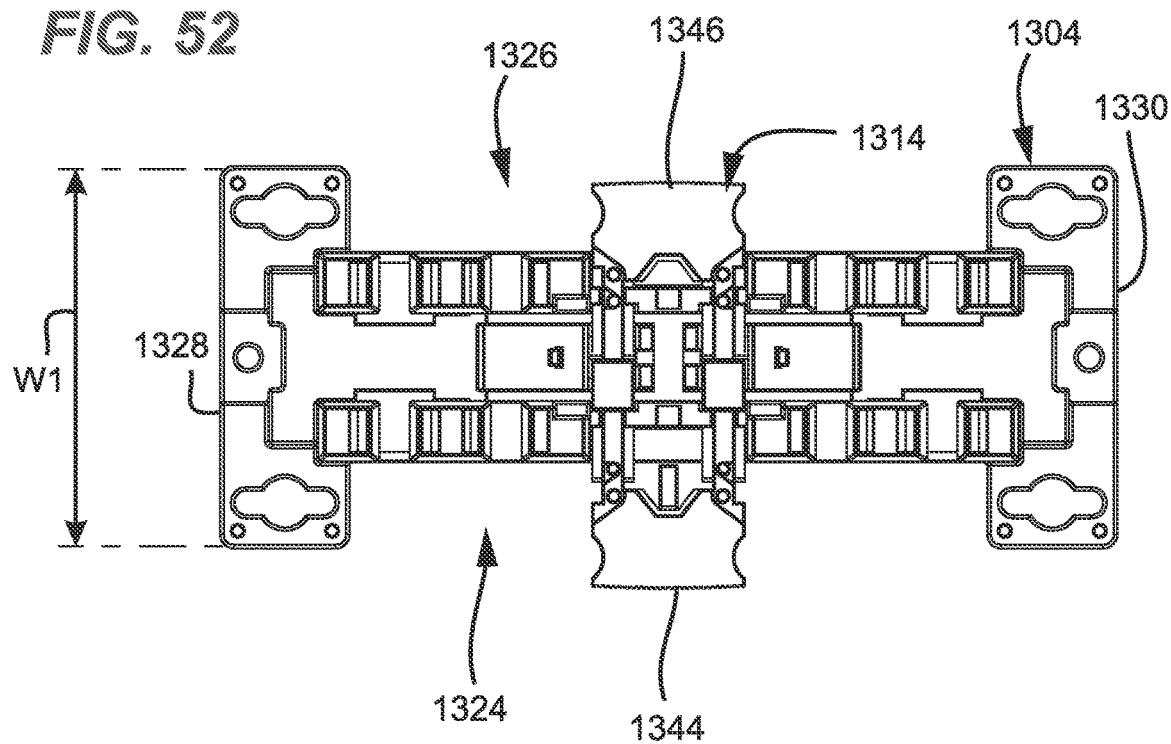
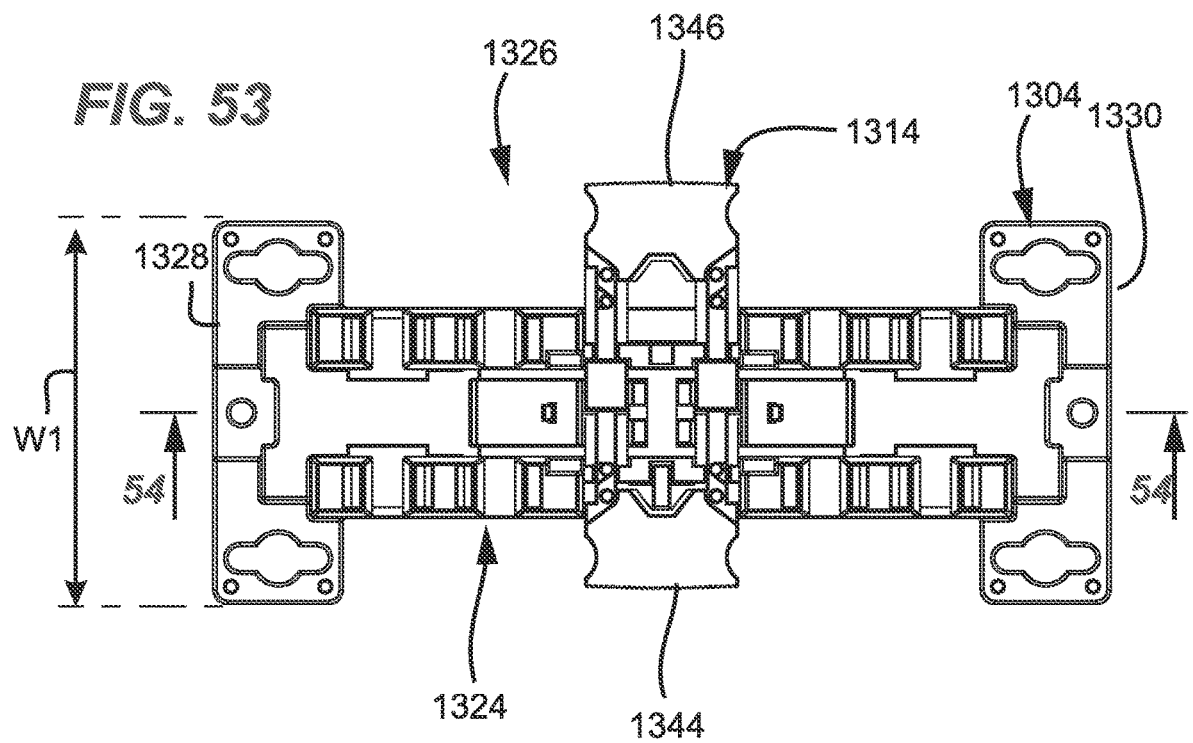

TELECOMMUNICATIONS ENCLOSURE MOUNTING SYSTEM

CROSS-REFERENCE TO RELATED APPLICATIONS

This application is a National Stage Application of PCT/US2020/059116, filed on Nov. 5, 2020, which claims the benefit of U.S. Patent Application Ser. No. 62/932,239, filed on Nov. 7, 2019, and claims the benefit of U.S. Patent Application Ser. No. 62/963,893, filed on Jan. 21, 2020, and claims the benefit of U.S. Patent Application Ser. No. 62/992,592, filed on Mar. 20, 2020, and claims the benefit of U.S. Patent Application Ser. No. 63/062,730, filed on Aug. 7, 2020, the disclosures of which are incorporated herein by reference in their entireties. To the extent appropriate, a claim of priority is made to each of the above disclosed applications.

BACKGROUND

Fiber optic communication systems allow service providers to deliver high bandwidth communication capabilities to customers. Fiber optic communication systems employ a distribution network of fiber optic cables to transmit large volumes of data over long distances. A drop cable is typically the last leg of the distribution network before reaching an end subscriber such as a house, apartment, office, place of business, and the like. Typically, a drop cable is run from an optical terminal before reaching an end subscriber location.

Optical terminals can be mounted on a variety of structures in the field including walls, poles, cables, and the like. In some instances, mounting brackets can be used to mount the optical terminals to a variety of structures in the field.

Sometimes, an area where it is desirable to mount an optical terminal is a confined space that provides a limited amount of room for mounting and unmounting the optical terminal. Therefore, it would be desirable to provide an arrangement that reduces the amount of space needed for mounting and unmounting optical terminals in the field.

SUMMARY

One aspect of the present disclosure relates to a telecommunications enclosure system having a terminal assembly including an optical terminal that mounts to a terminal mounting bracket via a mechanical coupling interface. The mechanical coupling interface includes a release actuator that allows the optical terminal to be released from the terminal mounting bracket by accessing the release actuator from a first side of the terminal assembly, and also allows the optical terminal to be released from the terminal mounting bracket by accessing the release actuator from an opposite second side of the terminal assembly.

Other aspects of the present disclosure relate to terminal mounting brackets and optical terminals having mechanical coupling features in accordance with the principles of the present disclosure.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the examples disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows:

FIG. 52 is a front view of the terminal mounting bracket of FIG. 49 with the release actuator positioned in a first offset position in which the release actuator is offset toward a first side of the terminal mounting bracket.

FIG. 53 is another front view of the terminal mounting bracket of FIG. 49 with the release actuator oriented in a second offset position in which the release actuator is offset toward a second side of the terminal mounting bracket.

DETAILED DESCRIPTION

Figure 1:
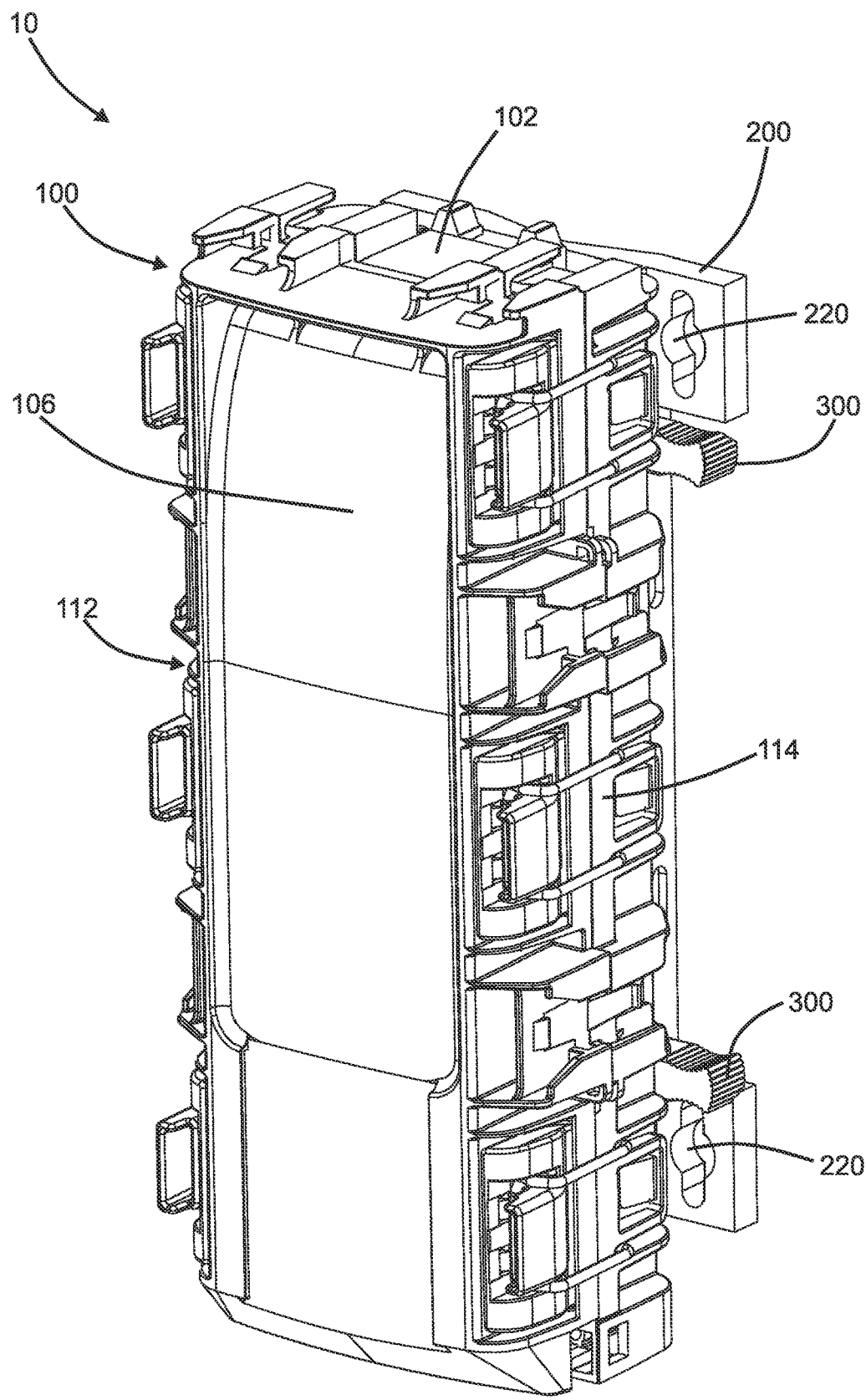
FIG. 1 is a front isometric view of a telecommunications enclosure system in accordance with a first embodiment of the present disclosure.

Various embodiments will be described in detail with reference to the drawings, wherein like reference numerals represent like parts and assemblies throughout the several views. Reference to various embodiments does not limit the scope of the claims attached hereto. Any examples set forth in this specification are not intended to be limiting and merely set forth some of the many possible embodiments for the appended claims.

Figure 2:
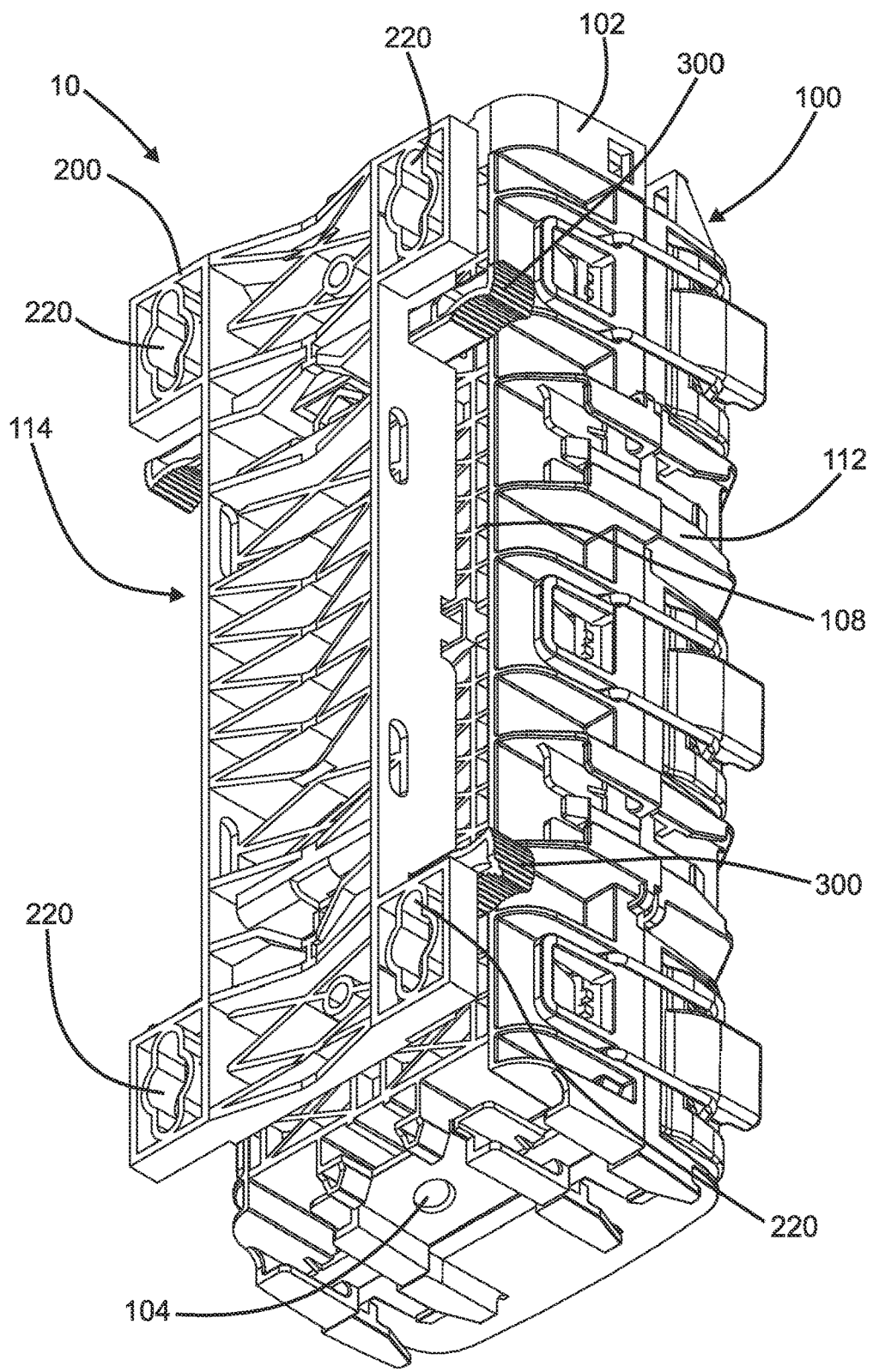
FIG. 2 is a rear isometric view of the telecommunications enclosure system of FIG. 1.
Figure 3:
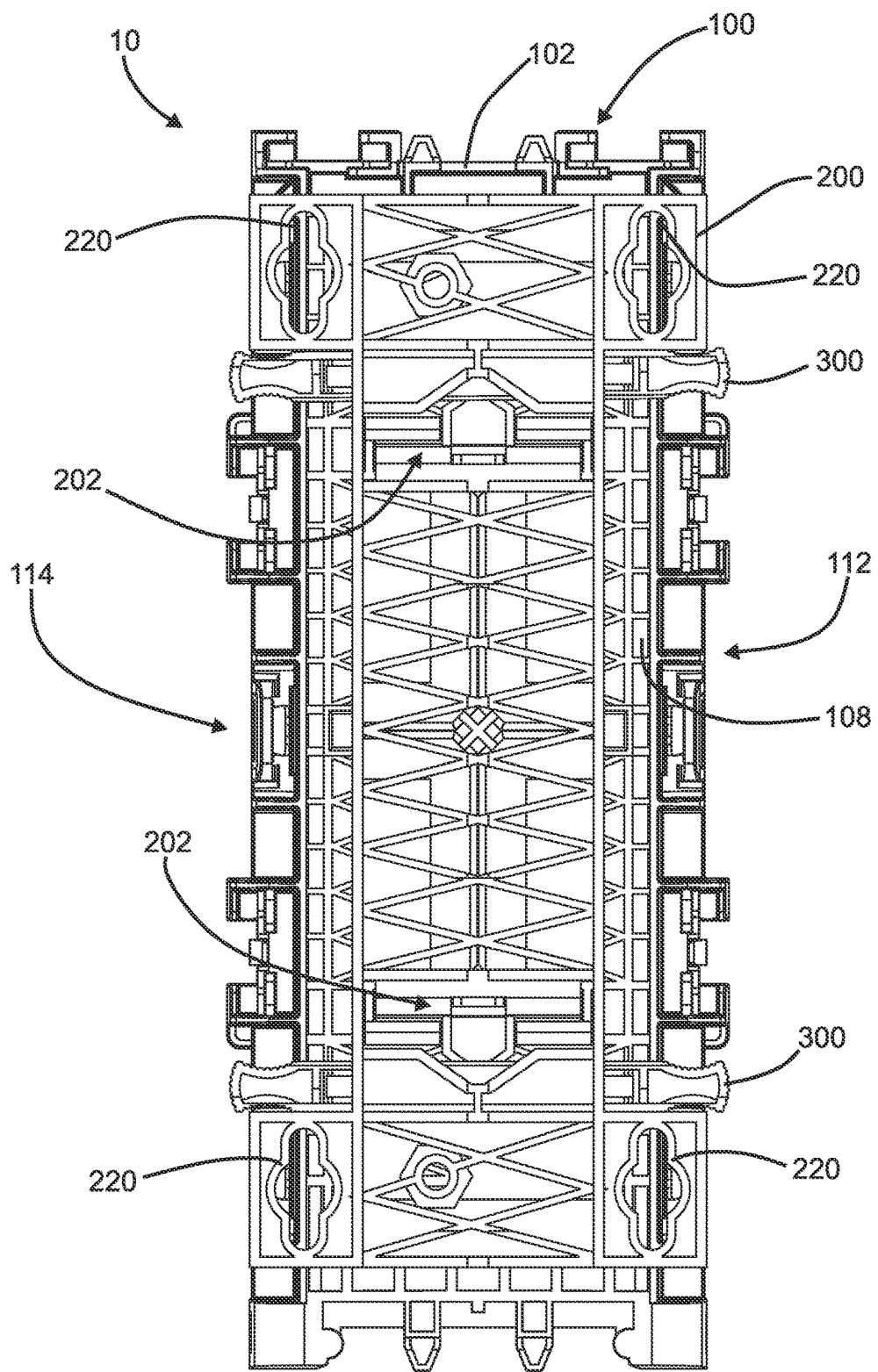
FIG. 3 is a rear view of the telecommunications enclosure system of FIG. 1.

FIGS. 1-3 are front isometric, rear isometric, and rear views, respectively, of a telecommunications enclosure system 10 in accordance with a first embodiment of the present disclosure. The telecommunications enclosure system 10 includes an optical terminal 100, a terminal mounting bracket 200, and one or more latch actuators 300.

The optical terminal 100 has front and rear sides 106, 108, and opposite first and second sides 112, 114. The optical terminal 100 includes a housing 102 for enclosing optical components. The housing 102 has at least one optical port 104. The at least one optical port 104 can be configured to receive a fiber optic connector from outside the optical terminal 100 such that the optical port 104 is a hardened fiber optic adapter port or can be configured to receive a fiber optic cable such that the optical port 104 is a sealed cable opening. For example, U.S. Pat. Nos. 8,718,434 and 8,213,760, which are hereby incorporated by reference in their entireties, include both hardened adapter ports and sealed cable pass-through locations.

The terminal mounting bracket 200 includes fastener openings 220. Fasteners such as screws, bolts, nails, and the like can be passed through the fastener openings 220 for mounting the terminal mounting bracket 200 (and the optical terminal 100 when mounted thereto) to a structure in the field including a wall of a building and/or an underground hand hole box, a pole (such as a wooden pole that carries power and telecommunication cables), and the like. The terminal mounting bracket 200 (and the optical terminal 100 when mounted thereto) can be mounted to a structure in either a horizontal or vertical orientation.

Figure 4:
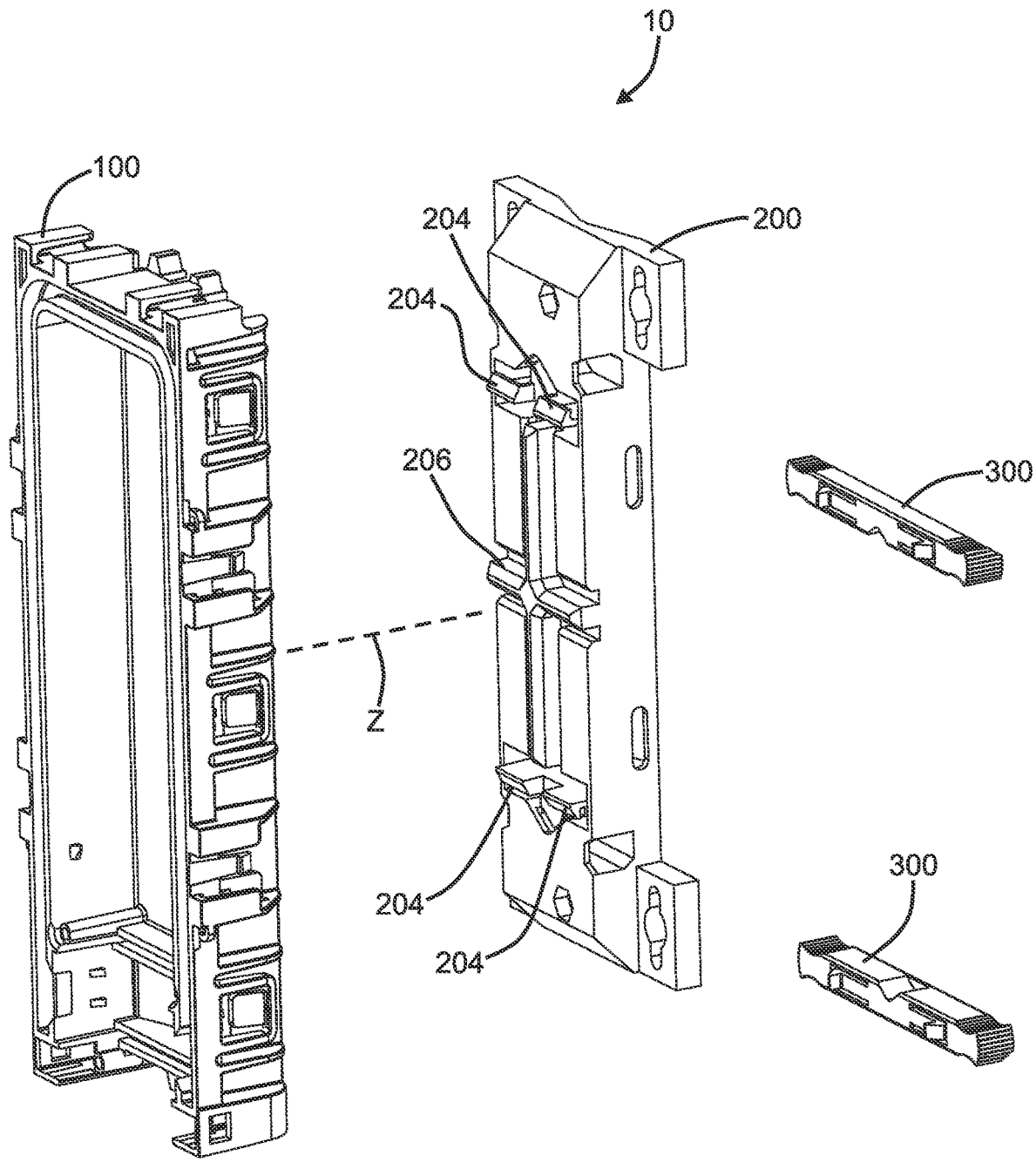
FIGS. 4 and 5 are front and rear exploded isometric views, respectively, of the telecommunications enclosure system of FIG. 1.
Figure 5:
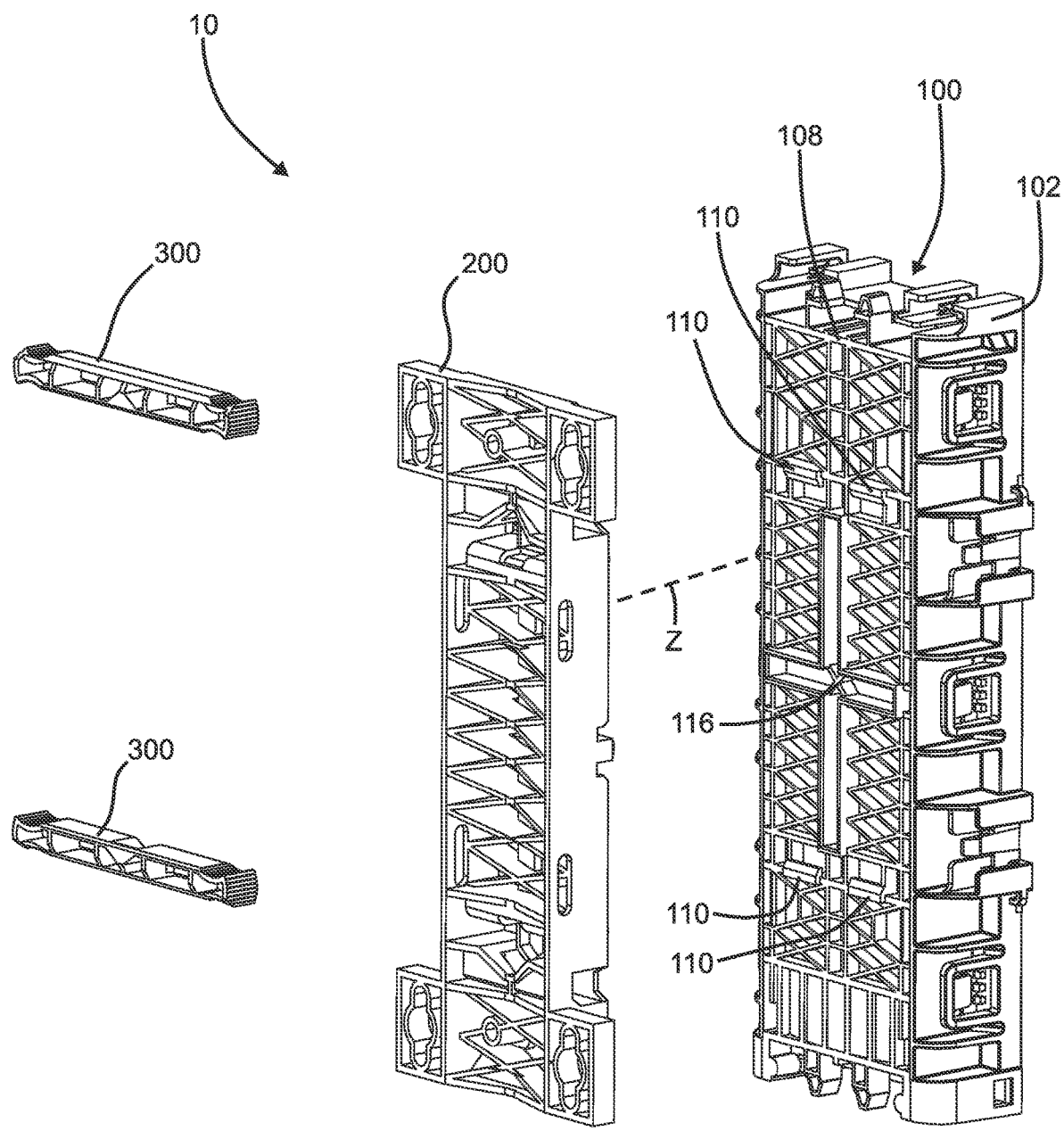

FIGS. 4 and 5 are front and rear isometric exploded views, respectively, of the telecommunications enclosure system 10. The optical terminal 100 mounts onto the terminal mounting bracket 200. Advantageously, the optical terminal 100 does not pivot or slide relative to the terminal mounting bracket 200 when the optical terminal 100 mounts onto the terminal mounting bracket 200. Instead, the optical terminal 100 moves linearly relative to the terminal mounting bracket 200 in a first direction along a first axis Z.

Figure 6:
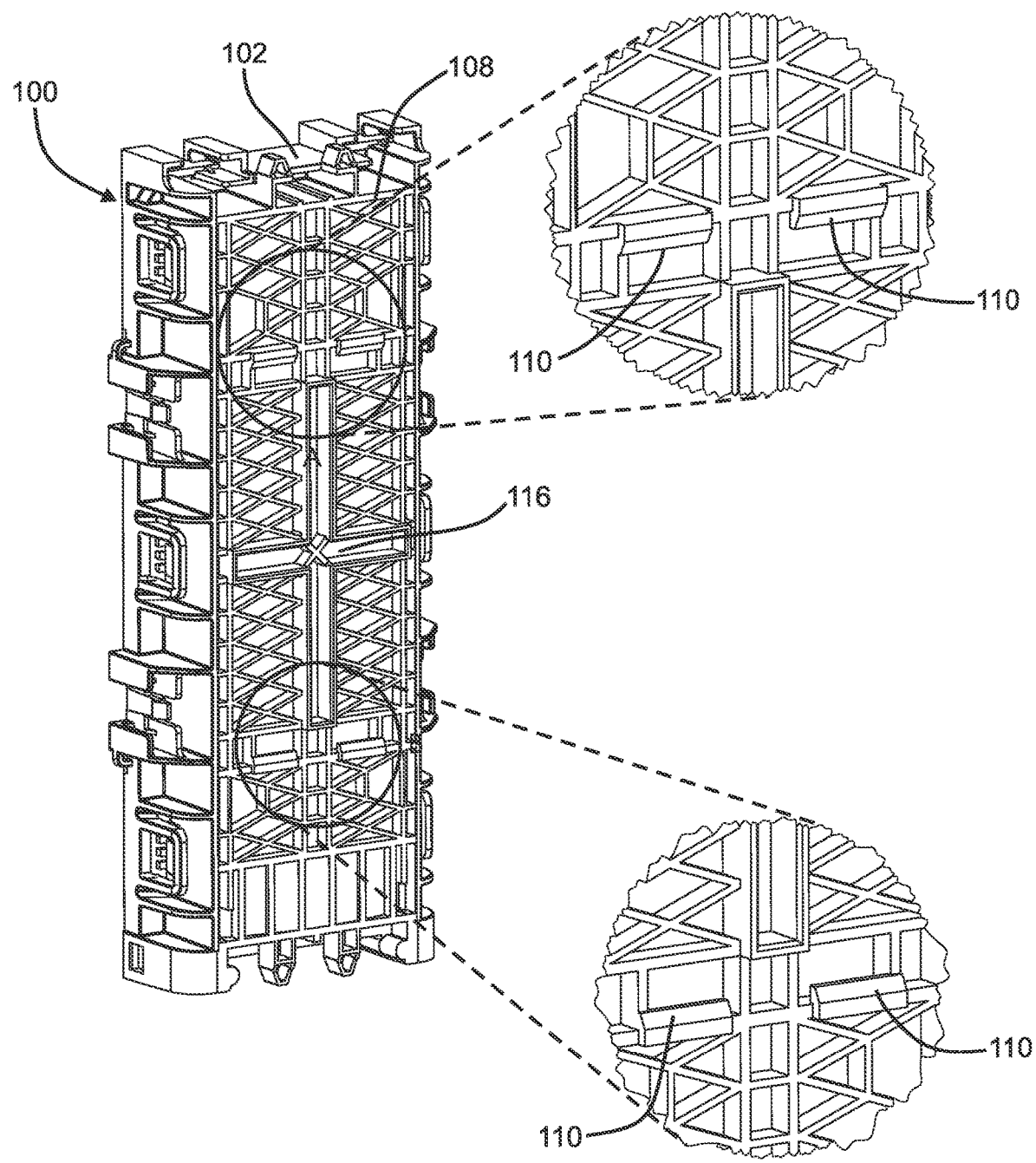
FIG. 6 is a rear isometric view of an optical terminal of the telecommunications enclosure system of FIG. 1.
Figure 7:
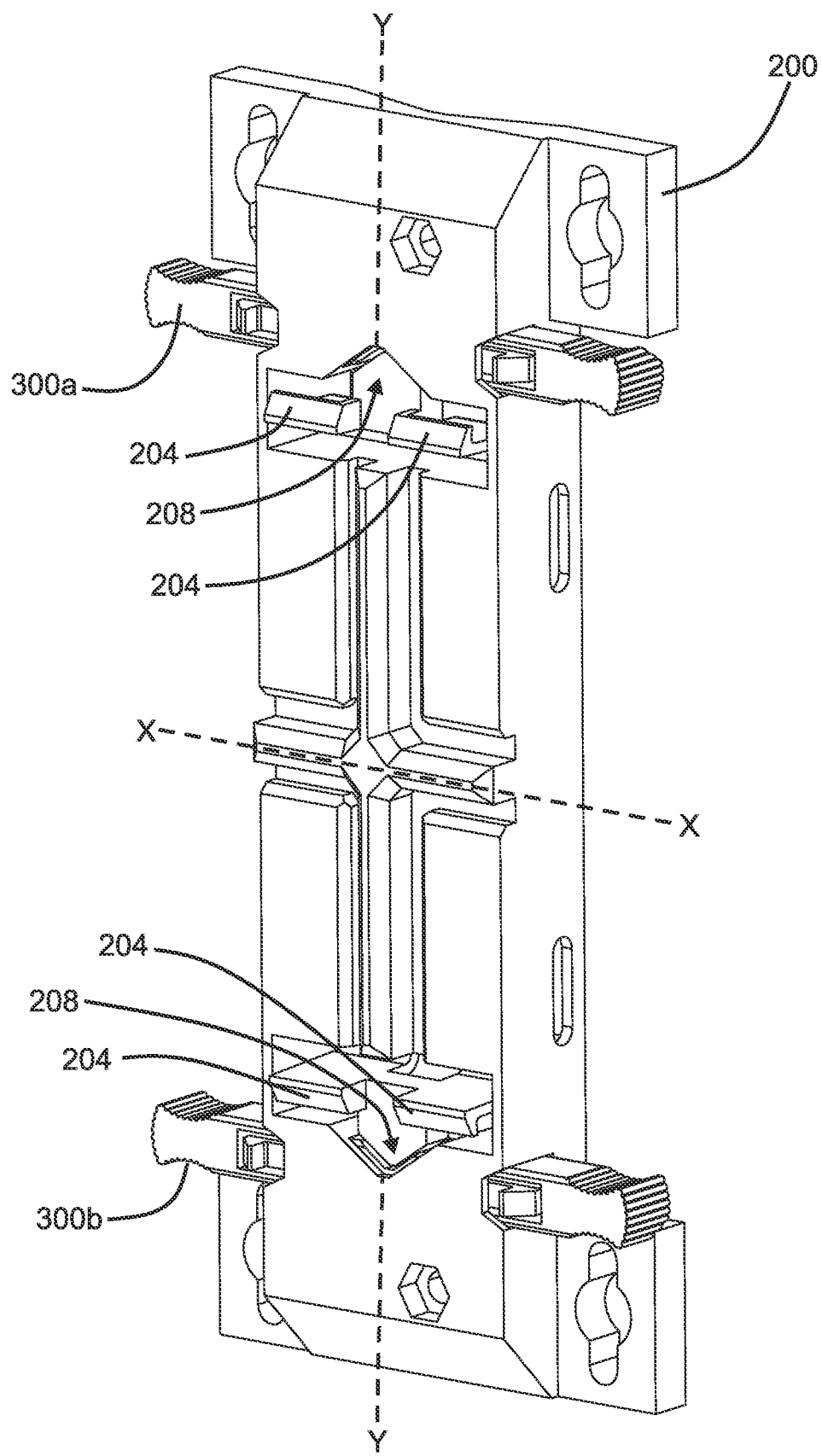
FIG. 7 is a front isometric view of a terminal mounting bracket and latch actuators of the telecommunications enclosure system of FIG. 1.

FIG. 6 is a rear isometric view of the optical terminal 100. FIG. 7 is a front isometric view of a terminal mounting bracket 200 and latch actuators 300a, 300b. Referring now to FIGS. 3-7, the telecommunications enclosure system 10 includes at least one latching arrangement 202 (see FIG. 3). In the example embodiment illustrated in the FIGS., the telecommunications enclosure system 10 includes two latching arrangements 202 that are positioned toward opposite ends of the rear side 108 of the optical terminal 100.

Each latching arrangement 202 has at least one latch 204 that engages at least one catch 110 to mount the optical terminal 100 onto the terminal mounting bracket 200. The latching arrangement 202 when latched prevents the optical terminal 100 from moving in an opposite, second direction along the first axis Z relative to the terminal mounting bracket 200.

In this example embodiment of the telecommunications enclosure system 10, the latching arrangement 202 has a plurality of latches 204 on the terminal mounting bracket 200 and a plurality of corresponding catches 110 on the rear side 108 of the optical terminal 100. Advantageously, the latching arrangement 202 can be unlatched from the first side 112 of the optical terminal 100 without accessing the second side 114, and can be unlatched from the second side 114 of the optical terminal 100 without accessing the first side 112.

A nested relationship is provided by a nest feature 206 on the terminal mounting bracket 200 and a corresponding nest feature 116 on the rear side 108 of the optical terminal 100. The nested relationship prevents relative movement between the optical terminal 100 and the terminal mounting bracket 200 along a plane perpendicular to the first axis Z when the optical terminal 100 is latched to the terminal mounting bracket 200. The nest features 116, 206 are depicted as cross-shaped mating female and male features. The nest features 116, 206 can also assist in providing alignment between the latches 204 and catches 110.

Referring now to FIG. 7, latch actuators 300a, 300b are moveable in a first direction along a second axis X to unlatch the latching arrangement 202. Additionally, the latch actuators 300a, 300b are moveable in a second direction, opposite the first direction along the second axis X, to unlatch the latching arrangement 202. The second axis X is transverse to the first axis Z (shown in FIGS. 4 and 5). The latch actuators 300a, 300b are accessible from the opposite first and second sides 112, 114 of the optical terminal 100 when the optical terminal 100 is mounted onto the terminal mounting bracket 200.

Figure 8:
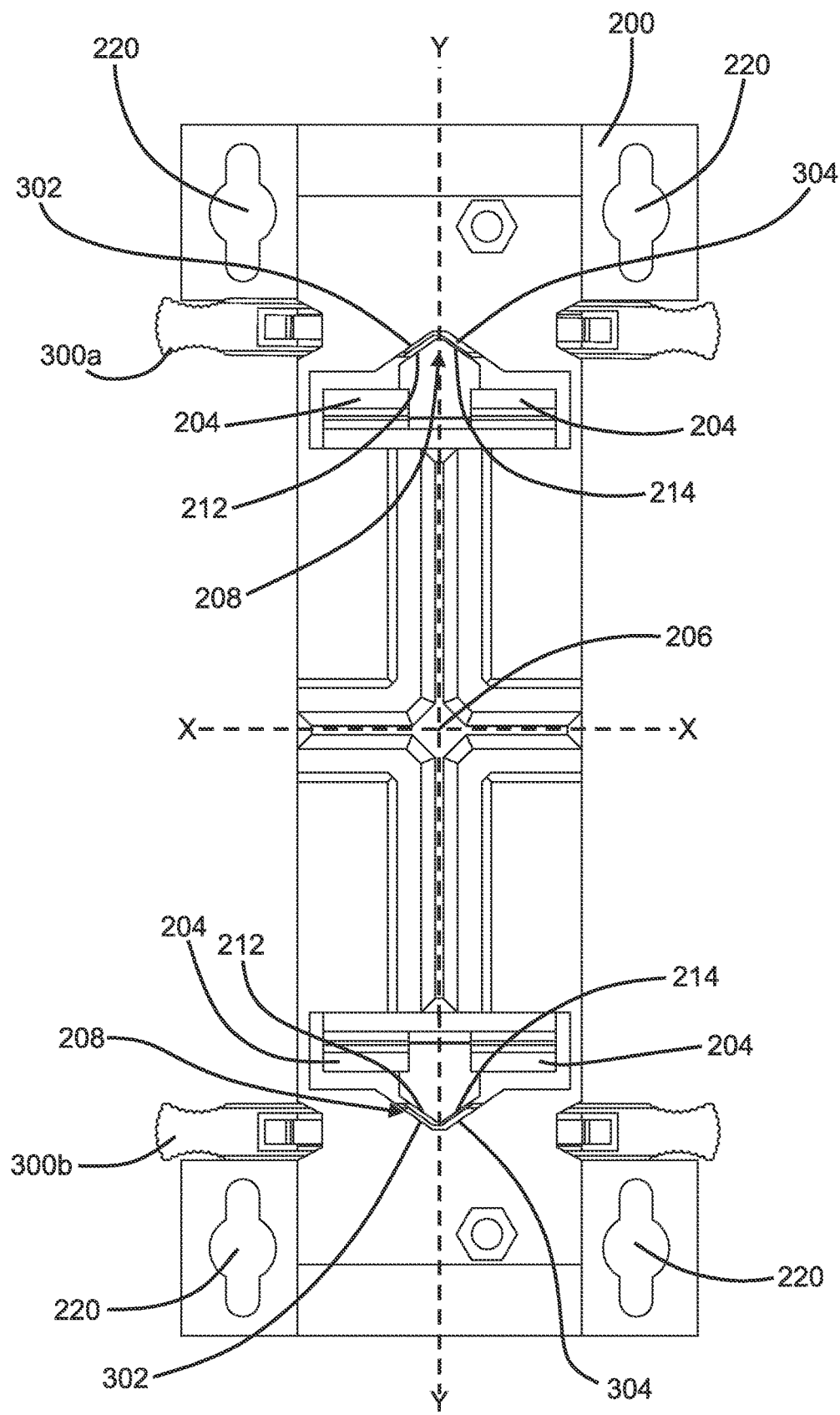
FIGS. 8 and 9 are front and rear views, respectively, of the terminal mounting bracket and latch actuators of FIG. 7.
Figure 9:
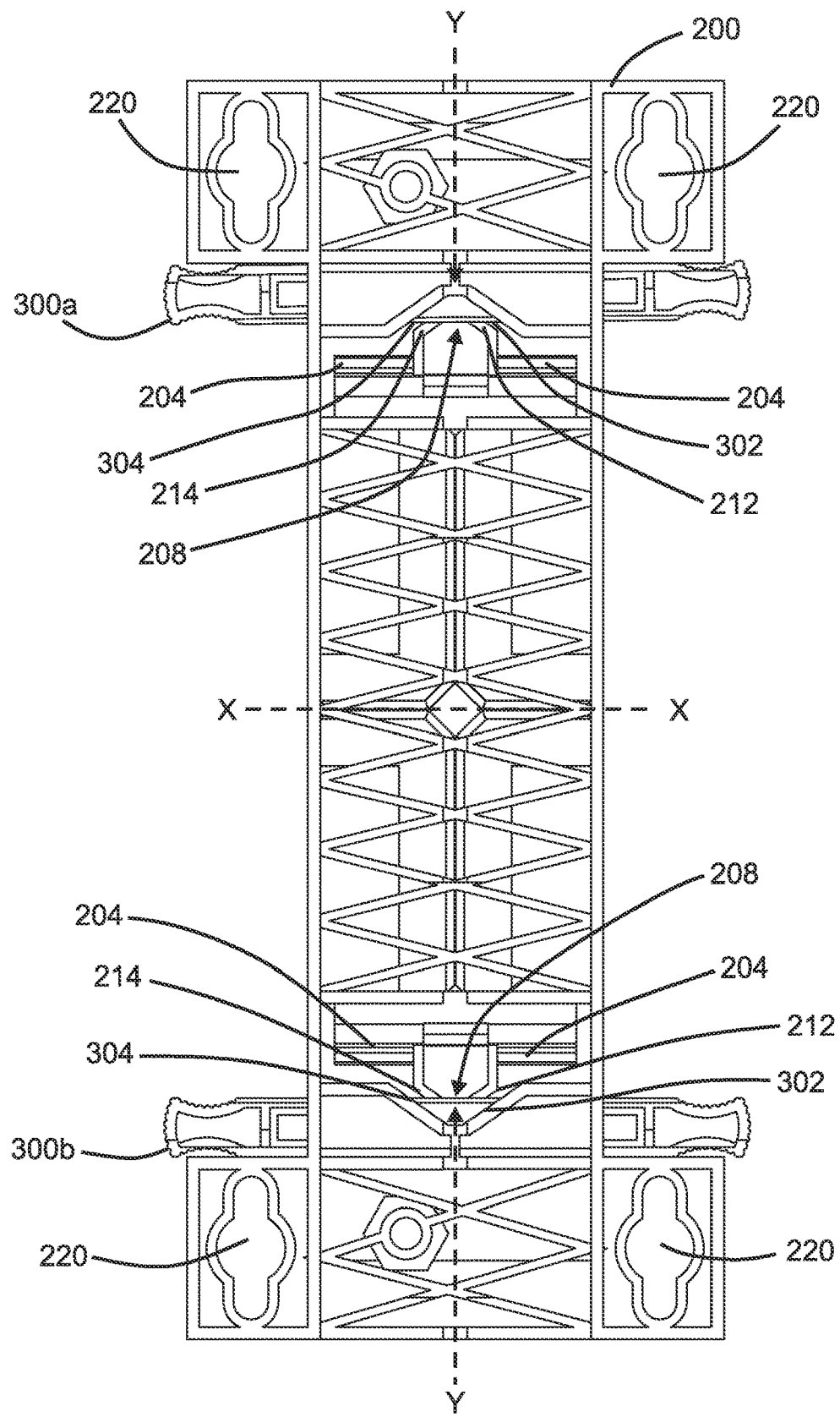

FIGS. 8 and 9 are front and rear views, respectively, of the terminal mounting bracket 200 and the latch actuators 300. Referring now to FIGS. 8 and 9, the latching arrangements 202 each include a cam arrangement 208 that converts movement of the latch actuators 300a, 300b in the first and second directions along the second axis X into a flexing of the latches 204 in first and second directions along a third axis Y that is transverse to the first axis Z and second axis X. The flexing of the latches 204 in the first and second directions along the third axis Y allows the latches 204 to engage and disengage the catches 110 on the optical terminal 100 to unlatch the optical terminal 100 from the terminal mounting bracket 200.

In the example embodiment of FIGS. 1-9, the cam arrangements 208 are defined between the latch actuators 300a, 300b and the latches 204 of the terminal mounting bracket 200. The terminal mounting bracket 200 includes the latches 204 of the latching arrangement 202, and the cam arrangement 208 uses movement of the latch actuators 300a, 300b in the first or second directions along the second axis X to flex the latches 204 along the third axis Y to disengage the corresponding catches 110 on the optical terminal 100.

Figure 10:
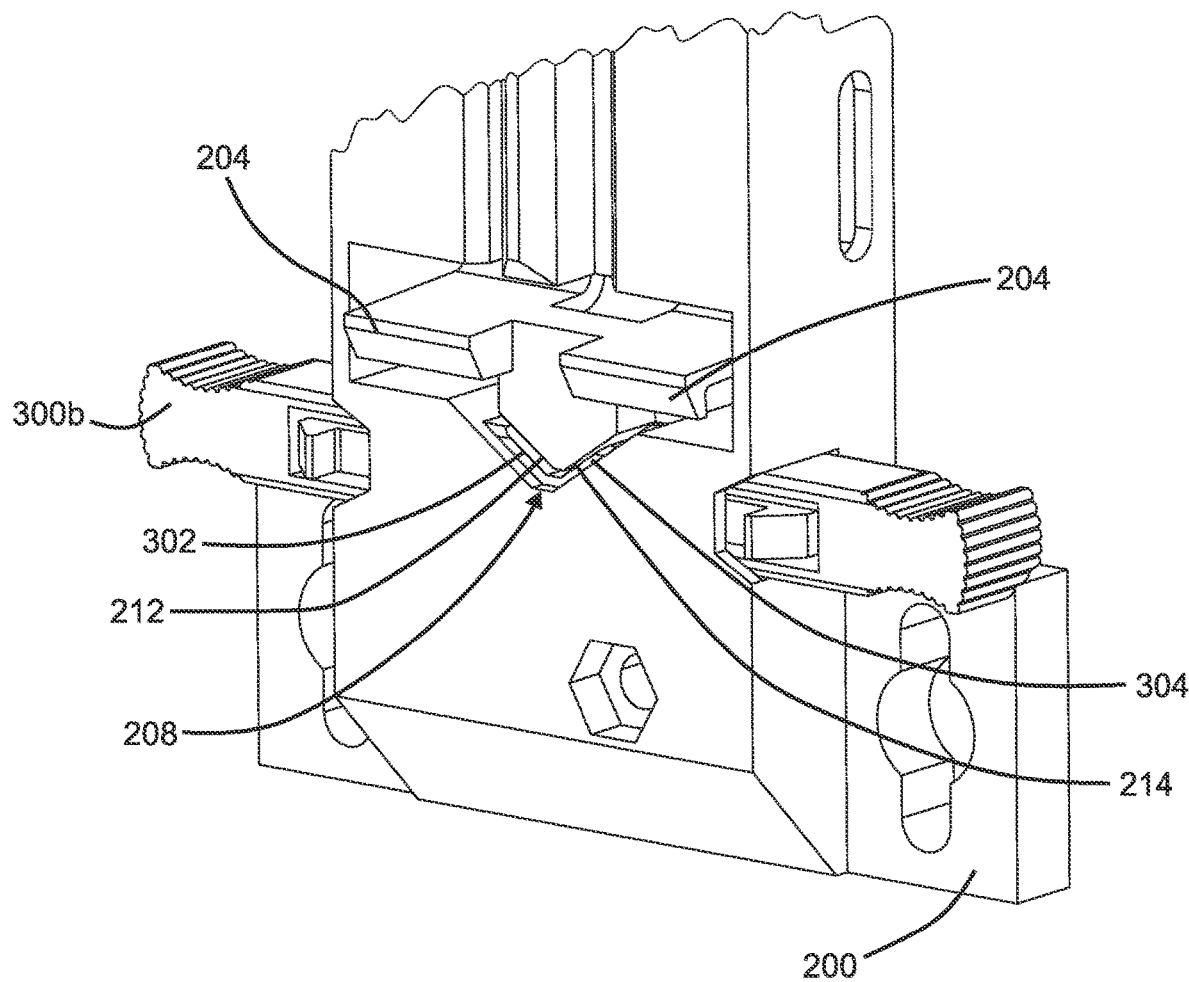
FIGS. 10 and 11 are detailed front and rear isometric views of a cam arrangement between the latch actuator and terminal mounting bracket of FIG. 7.
Figure 11:
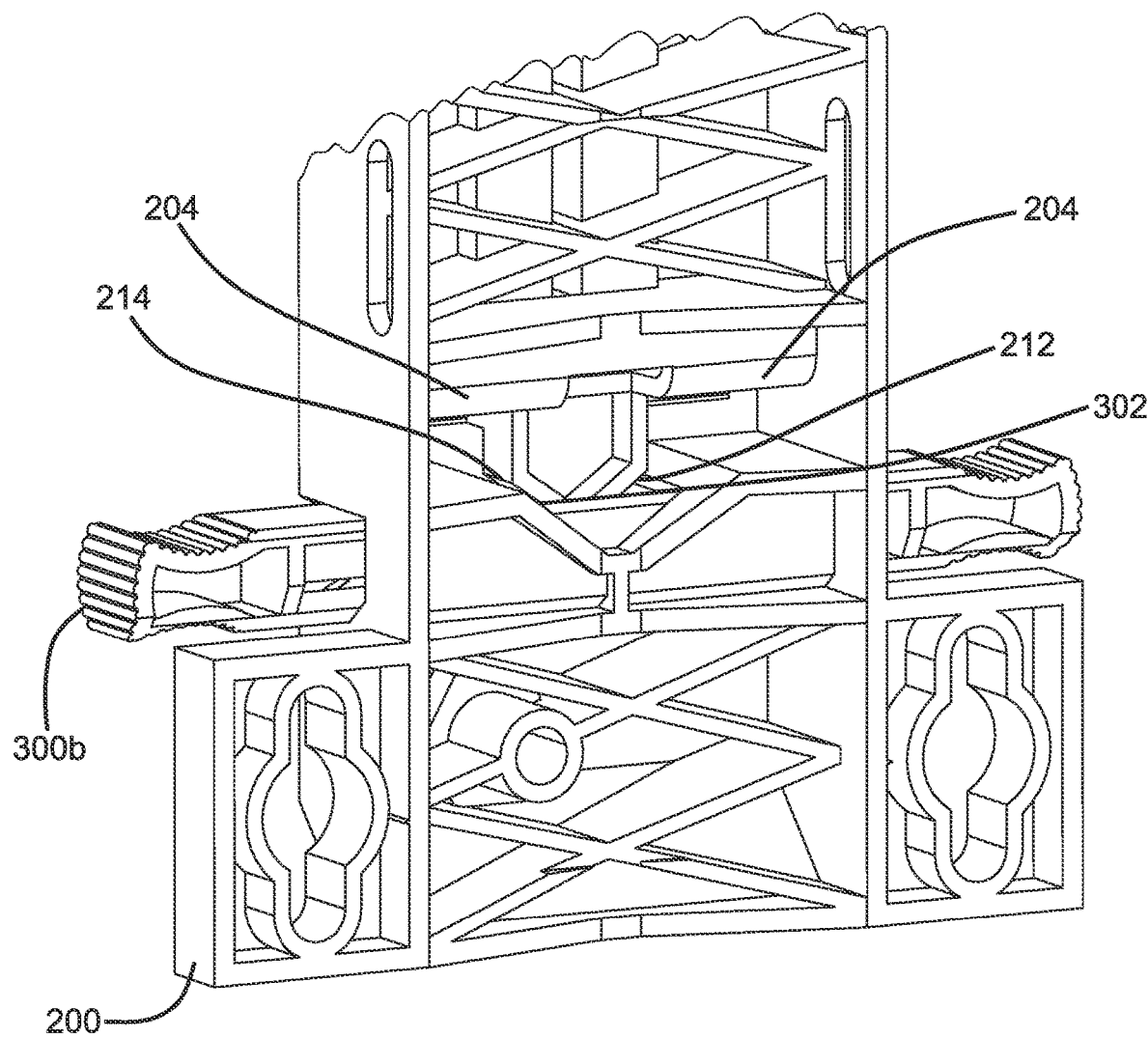
Figure 12:
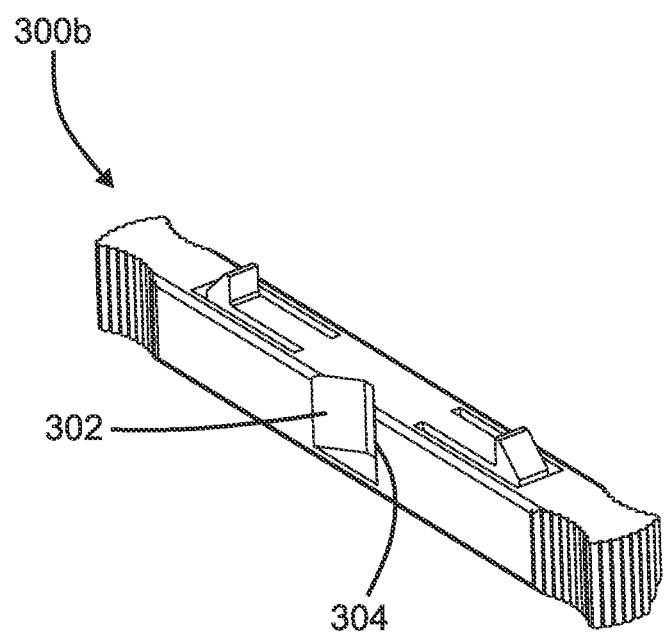
FIG. 12 is an isometric view of the latch actuator of FIG. 7.

FIGS. 10 and 11 are detailed front and rear isometric views, respectively, of the cam arrangement 208 between the latch actuator 300b and terminal mounting bracket 200. FIG. 12 is an isometric view of the second latch actuator 300b (the first latch actuator 300a being the same). As shown in FIGS. 10-12, the cam arrangement 208 includes first angled surfaces 302, 304 on the latch actuator 300b and corresponding second angled surfaces 212, 214 on the terminal mounting bracket 200.

Referring now to FIG. 8, movement of the first latch actuator 300a in a first direction along the second axis X (e.g., from left to right) allows a first angled surface 302 of the first latch actuator 300a to engage a corresponding second angled surface 212 of the terminal mounting bracket 200. Each latch 204 is flexible with respect to the terminal mounting bracket 200 such that when the first angled surface 302 of the first latch actuator 300*a* engages the corresponding second angled surface 212 of the terminal mounting bracket 200, the corresponding latches 204 are flexed in a first direction (e.g., downward) along the third axis Y causing the latches 204 to disengage the catches 110 on the optical terminal 100.

Movement of the first latch actuator 300*a* in a second direction along the second axis X (e.g., from right to left) allows a first angled surface 304 of the first latch actuator 300*a* to engage a corresponding second angled surface 214 of the terminal mounting bracket 200 to flex the corresponding latches 204 in the first direction (e.g., downward) along the third axis Y causing the latches 204 to disengage the catches 110 on the optical terminal 100.

Movement of the second latch actuator 300*b* in the first direction along the second axis X (e.g., from left to right) allows a first angled surface 302 of the second latch actuator 300*b* to engage a corresponding second angled surface 212 of the terminal mounting bracket 200 to flex the latches 204 in a second direction (e.g., upward) along the third axis Y causing the latches 204 to disengage the catches 110 on the optical terminal 100.

Movement of the second latch actuator 300*b* in the second direction along the second axis X (e.g., from right to left) allows a first angled surface 304 of the second latch actuator 300*b* to engage a corresponding second angled surface 214 of the terminal mounting bracket 200 to flex the latches 204 in the second direction (e.g., upward) along the third axis Y causing the latches 204 to disengage the catches 110 on the optical terminal 100.

Advantageously, the latching arrangements 202 can be unlatched from either the first or second sides 112, 114 of the optical terminal 100 when the optical terminal 100 is mounted onto the terminal mounting bracket 200. Additionally, the latching arrangements 202 when unlatched enable the optical terminal 100 to be removed from the terminal mounting bracket 200 in the second direction along the first axis Z without pivoting the optical terminal 100 relative to the terminal mounting bracket 200. The latches 204 are elastic in construction and are spring biased toward latched positions by their inherent elasticity. Thus, the latches 204 automatically move to the latched positions when not held in unlatched positions by the latch actuators 300*a*, 300*b*.

Figure 13:
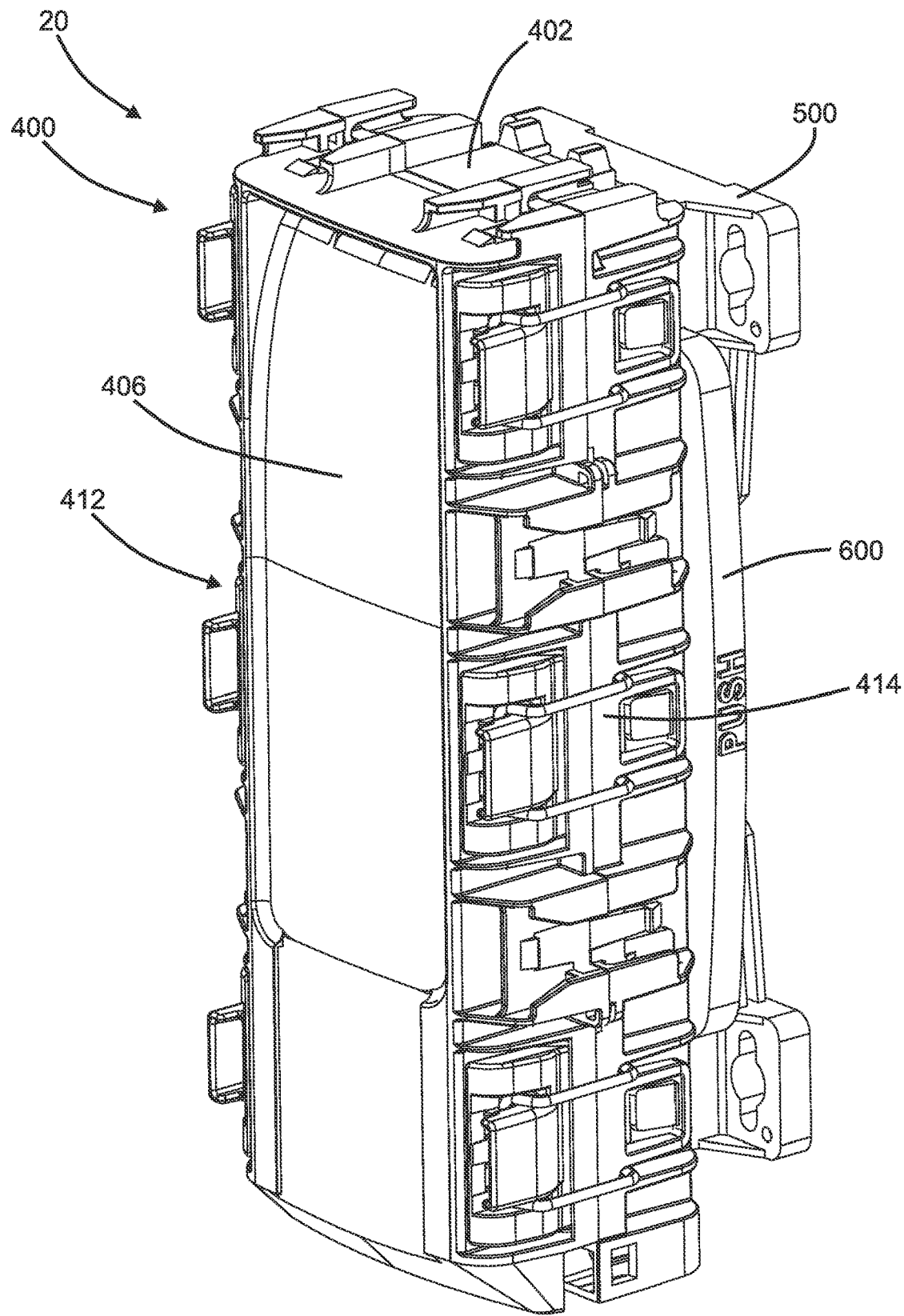
FIGS. 13 and 14 are front and rear isometric views of a telecommunications enclosure system in accordance with a second embodiment of the present disclosure.
Figure 14:
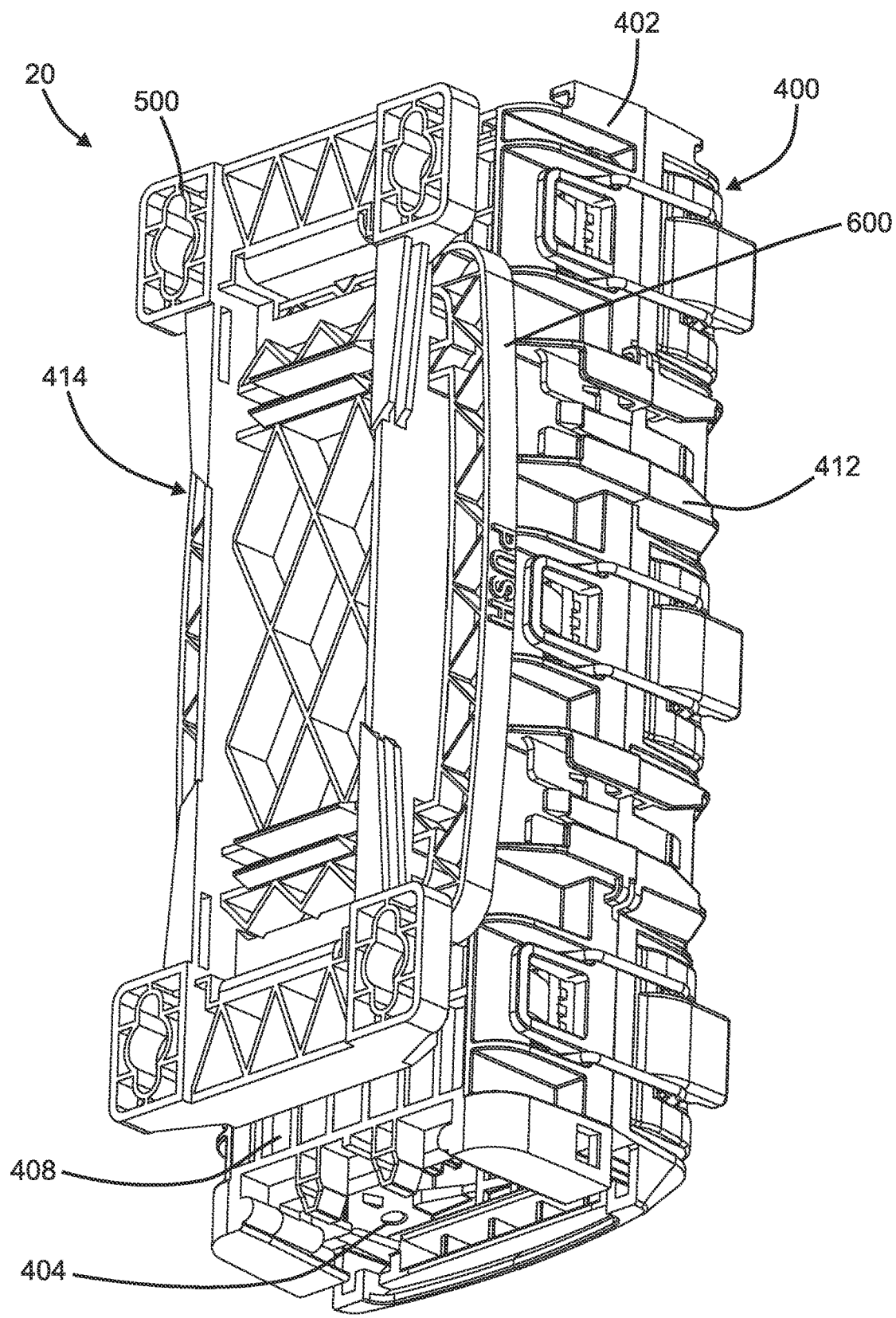
Figure 15:
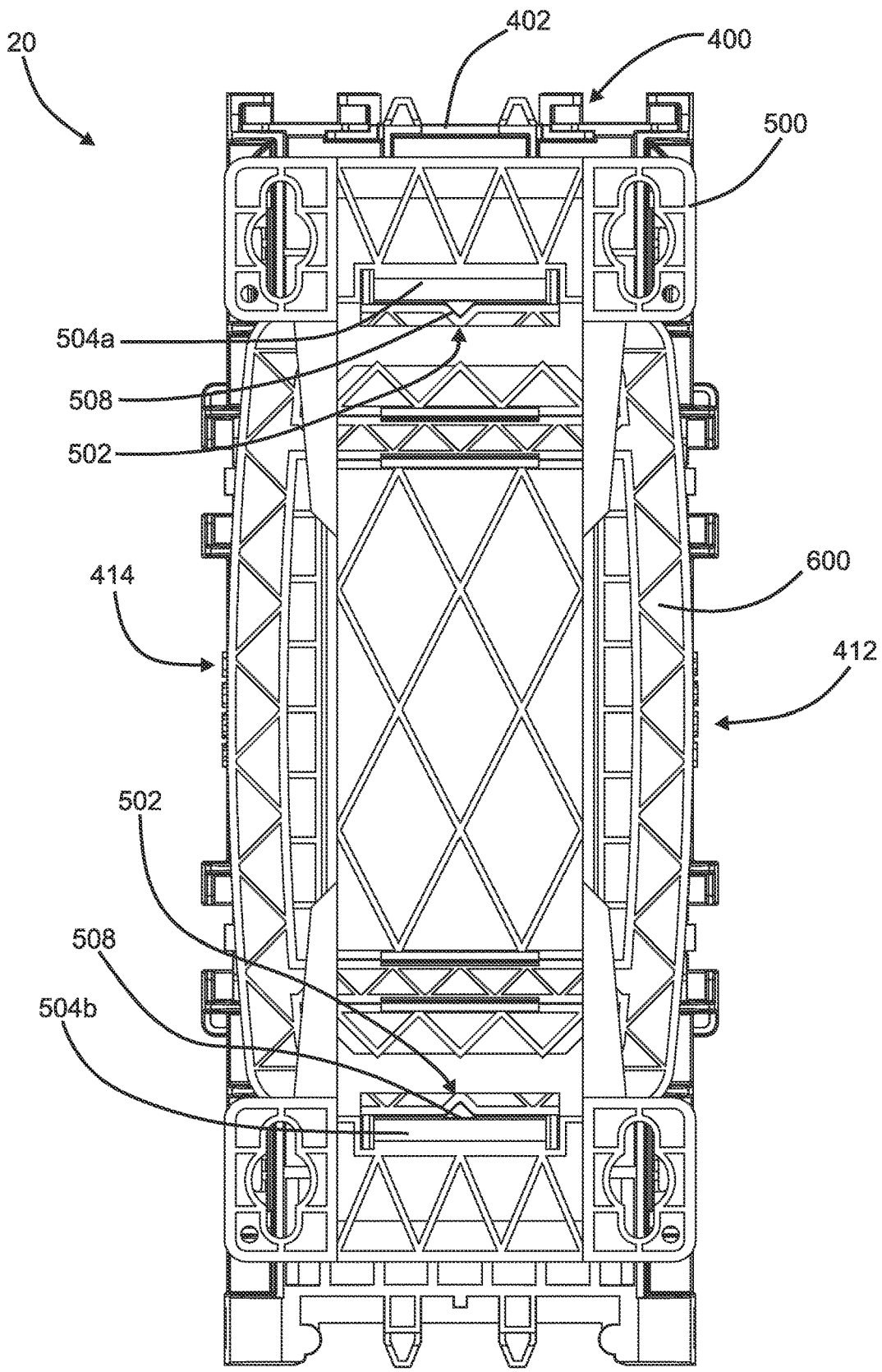
FIG. 15 is a rear view of the telecommunications enclosure system of FIG. 13.

FIGS. 13-15 are front isometric, rear isometric, and rear views, respectively, of a telecommunications enclosure system 20 in accordance with a second embodiment of the present disclosure. The telecommunications enclosure system 20 includes an optical terminal 400, a terminal mounting bracket 500, and a latch actuator 600.

The optical terminal 400 has front and rear sides 406, 408, and opposite first and second sides 412, 414. The optical terminal 400 includes a housing 402 for enclosing optical components. The housing 402 has at least one optical port 404. The at least one optical port 404 can be configured to receive a fiber optic connector from outside the optical terminal 400 such that the optical port 404 is a hardened fiber optic adapter port or can be configured to receive a fiber optic cable such that the optical port 404 is a sealed cable opening.

The terminal mounting bracket 500 includes fastener openings 520 configured to receive fasteners for mounting the terminal mounting bracket 500 to a structure in the field. Fasteners such as screws, bolts, nails, and the like can be passed through the fastener openings 520 for mounting the terminal mounting bracket 500 (and the optical terminal 400 when mounted thereto) to structures including a wall, a pole, and the like. When mounted to a structure in the field, the terminal mounting bracket 500 (and the optical terminal 400 when mounted thereto) can be mounted in either a horizontal orientation or a vertical orientation.

The latch actuator 600 is configured to unlatch the optical terminal 400 from the terminal mounting bracket 500. While the latch actuator 600 is shown in the example embodiments depicted in the FIGS. as a component that is separate from the optical terminal 400, it is contemplated that the latch actuator 600 could be integral with the optical terminal 400 such that the latch actuator 600 is a part of the optical terminal 400.

Figure 16:
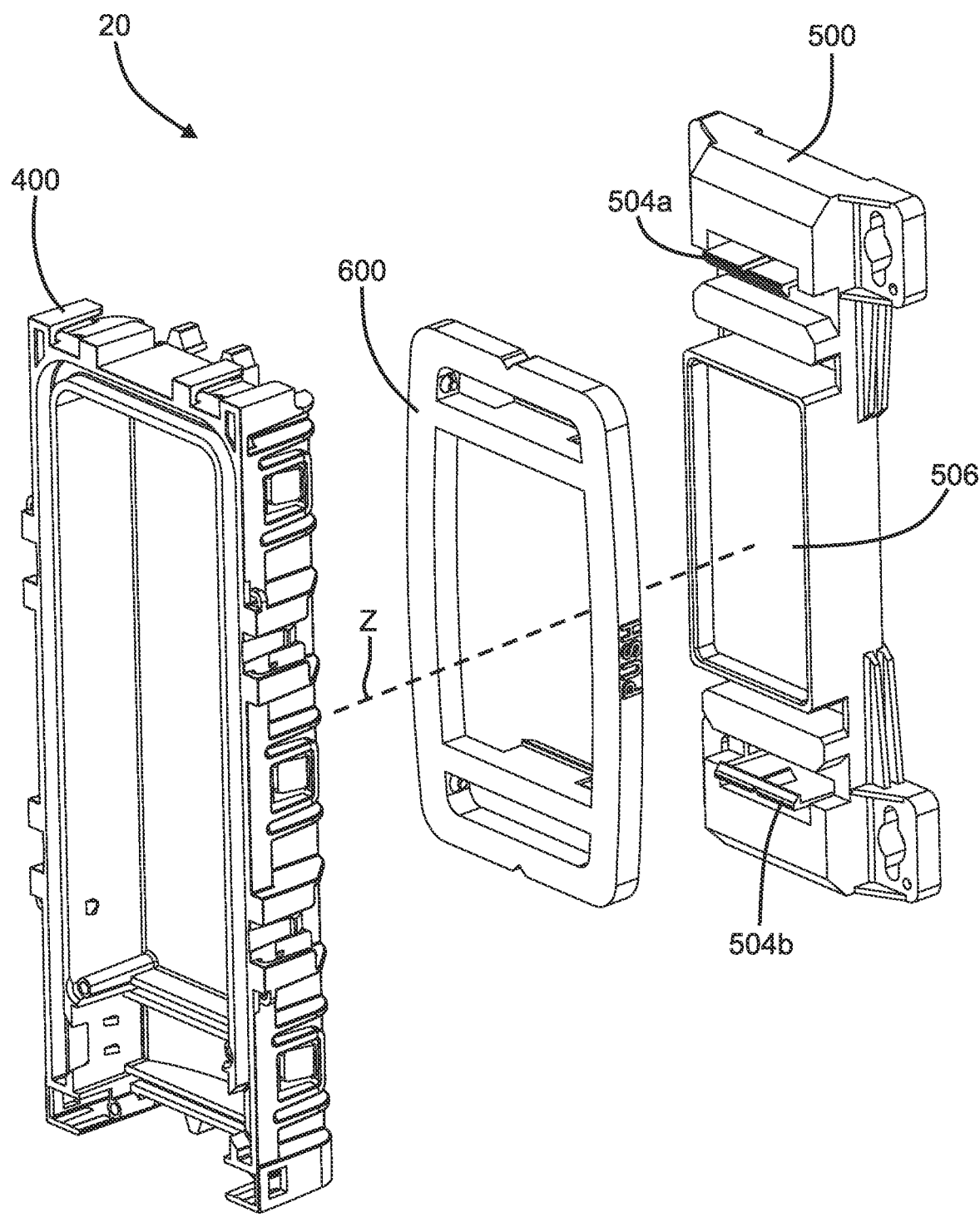
FIGS. 16 and 17 are front and rear exploded isometric views of the telecommunications enclosure system of FIG. 13.
Figure 17:
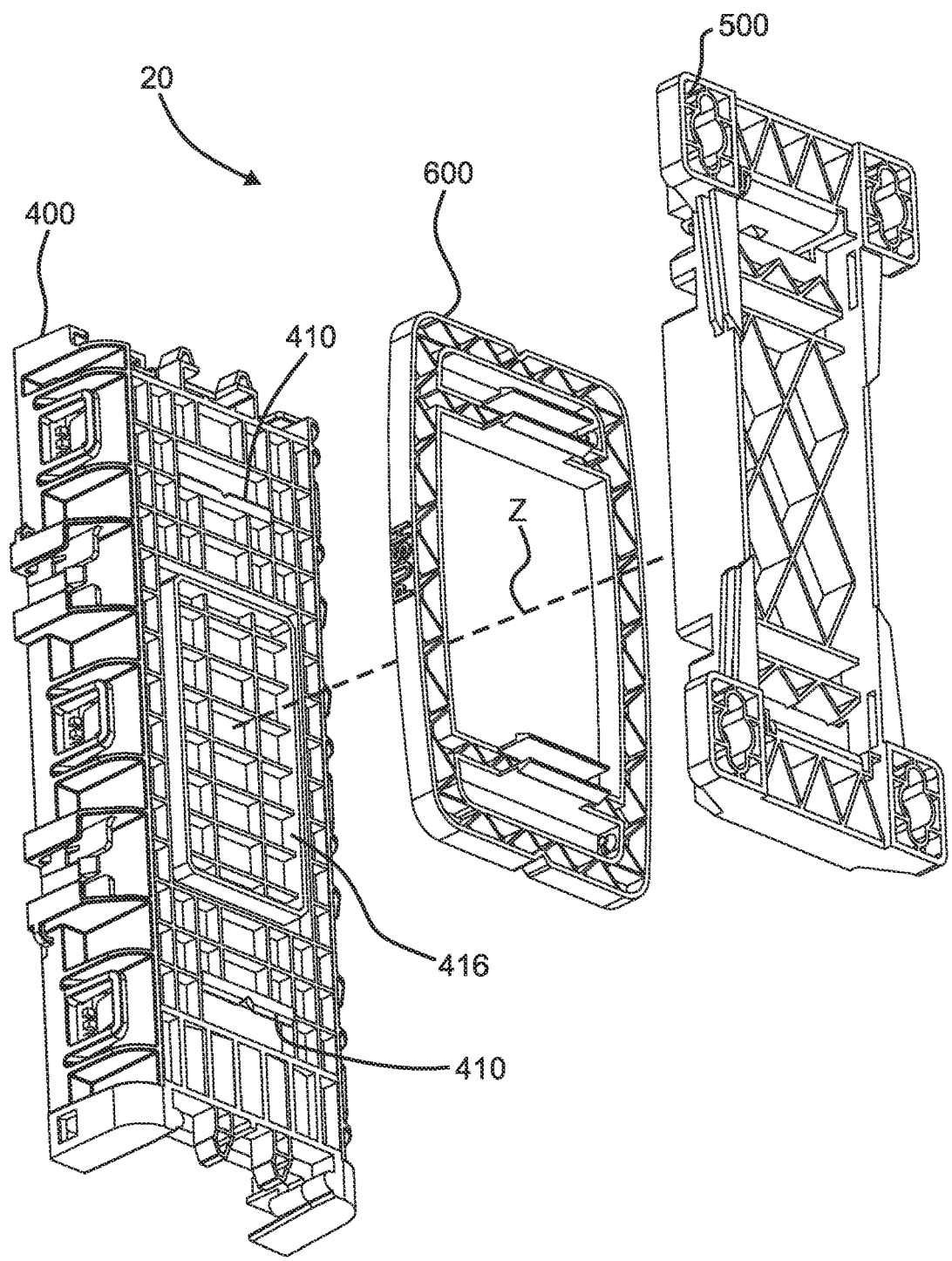

FIGS. 16 and 17 are front and rear exploded isometric views, respectively, of the telecommunications enclosure system 20. The optical terminal 400 mounts onto the terminal mounting bracket 500. Advantageously, the optical terminal 400 does not pivot or slide relative to the terminal mounting bracket 500 when the optical terminal 400 mounts onto the terminal mounting bracket 500. Instead, the optical terminal 400 moves linearly relative to the terminal mounting bracket 500 in a first direction along a first axis Z to provide engagement between the optical terminal 400 and terminal mounting bracket 500.

As shown in FIG. 15, the telecommunications enclosure system 20 includes at least one latching arrangement 502 to secure the optical terminal 400 onto the terminal mounting bracket 500. In the example embodiment illustrated in the FIGS., the telecommunications enclosure system 20 includes two latching arrangements 502 that are positioned toward opposite ends of the rear side 408 of the optical terminal 400.

Figure 18:
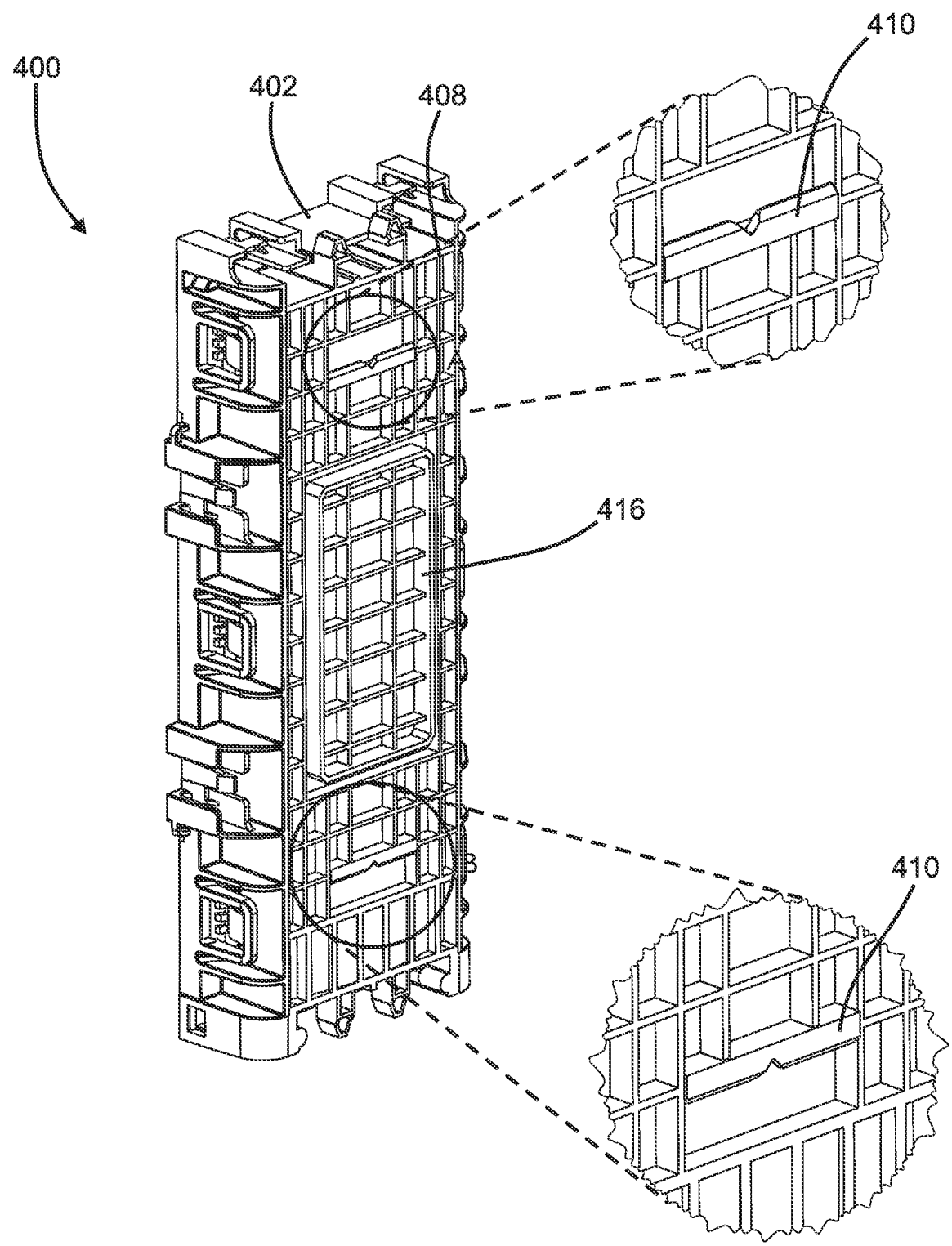
FIG. 18 is a rear isometric view of an optical terminal of the telecommunications enclosure system of FIG. 13.
Figure 19:
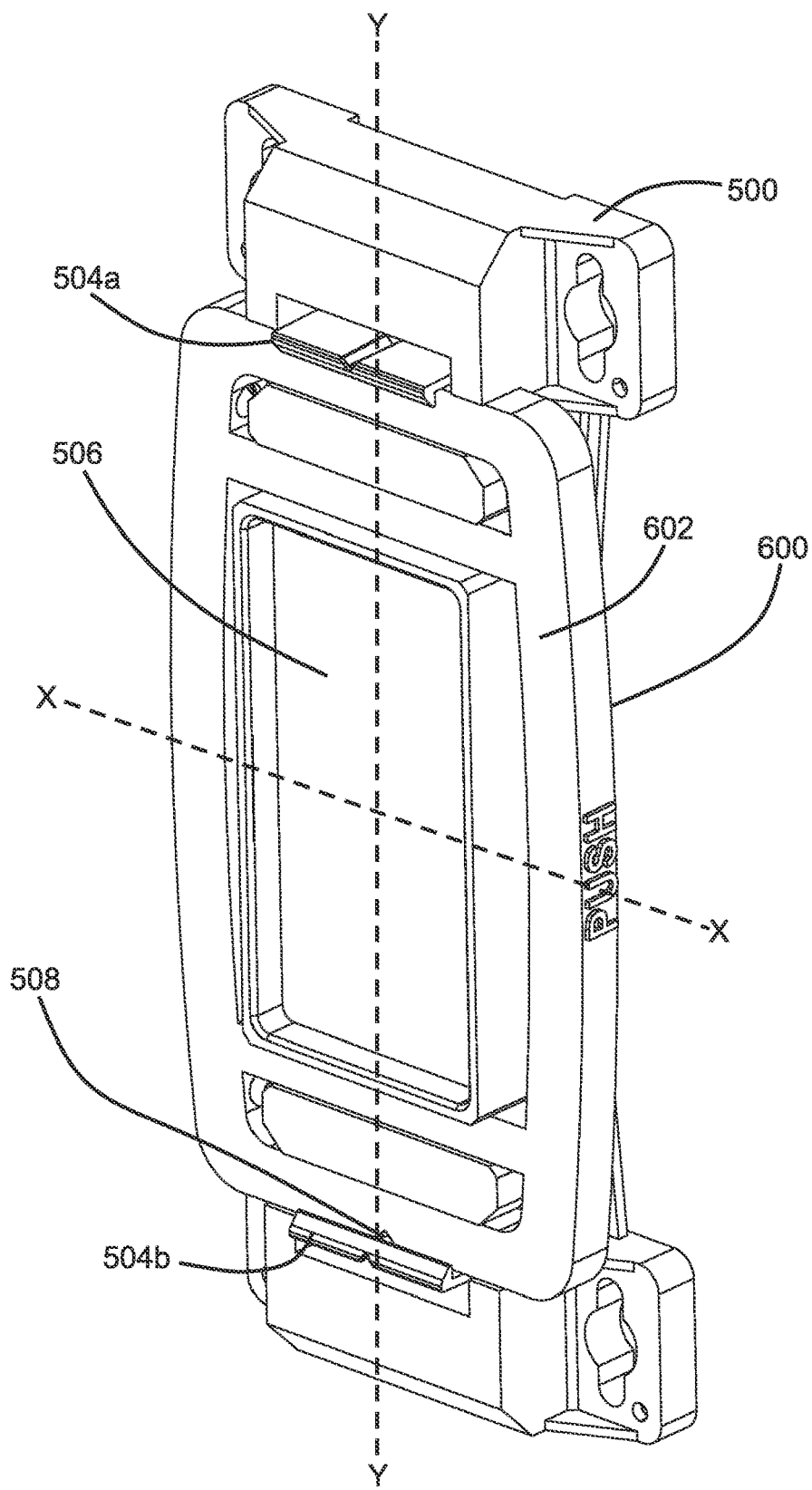
FIGS. 19 and 20 are front and rear isometric views of a terminal mounting bracket and latch actuator of the telecommunications enclosure system of FIG. 13.

FIG. 18 is a rear isometric view of the optical terminal 400. FIG. 19 is a front isometric view of the terminal mounting bracket 500 and latch actuator 600. Referring now to FIGS. 15-19, each latching arrangement 502 has at least one latch 504 that engages at least one catch 410 to mount the optical terminal 400 onto the terminal mounting bracket 500. The latching arrangements 502 when latched prevent the optical terminal 400 from moving in a second direction along the first axis Z relative to the terminal mounting bracket 500. Advantageously, the latching arrangements 502 can be unlatched from the first side 412 of the optical terminal 400 without accessing the second side 414, and can be unlatched from the second side 414 of the optical terminal 400 without accessing the first side 412.

In this second example embodiment, the terminal mounting bracket 500 includes first and second latches 504*a*, 504*b* positioned at opposite ends of the terminal mounting bracket 500, and corresponding catches 410 on the rear side 408 of the optical terminal 400.

As shown in FIGS. 18 and 19, a nested relationship is provided by a nest feature 506 on the terminal mounting bracket 500 and a corresponding nest feature 416 on the rear side 408 of the optical terminal 400. The nested relationship between the nest feature 506 and the corresponding nest feature 416 prevents relative movement between the optical terminal 400 and the terminal mounting bracket 500 along a plane perpendicular to the first axis Z. The nest features 416, 506 are depicted in the FIGS. as mating male and female structures that are rectangular in shape.

Figure 20:
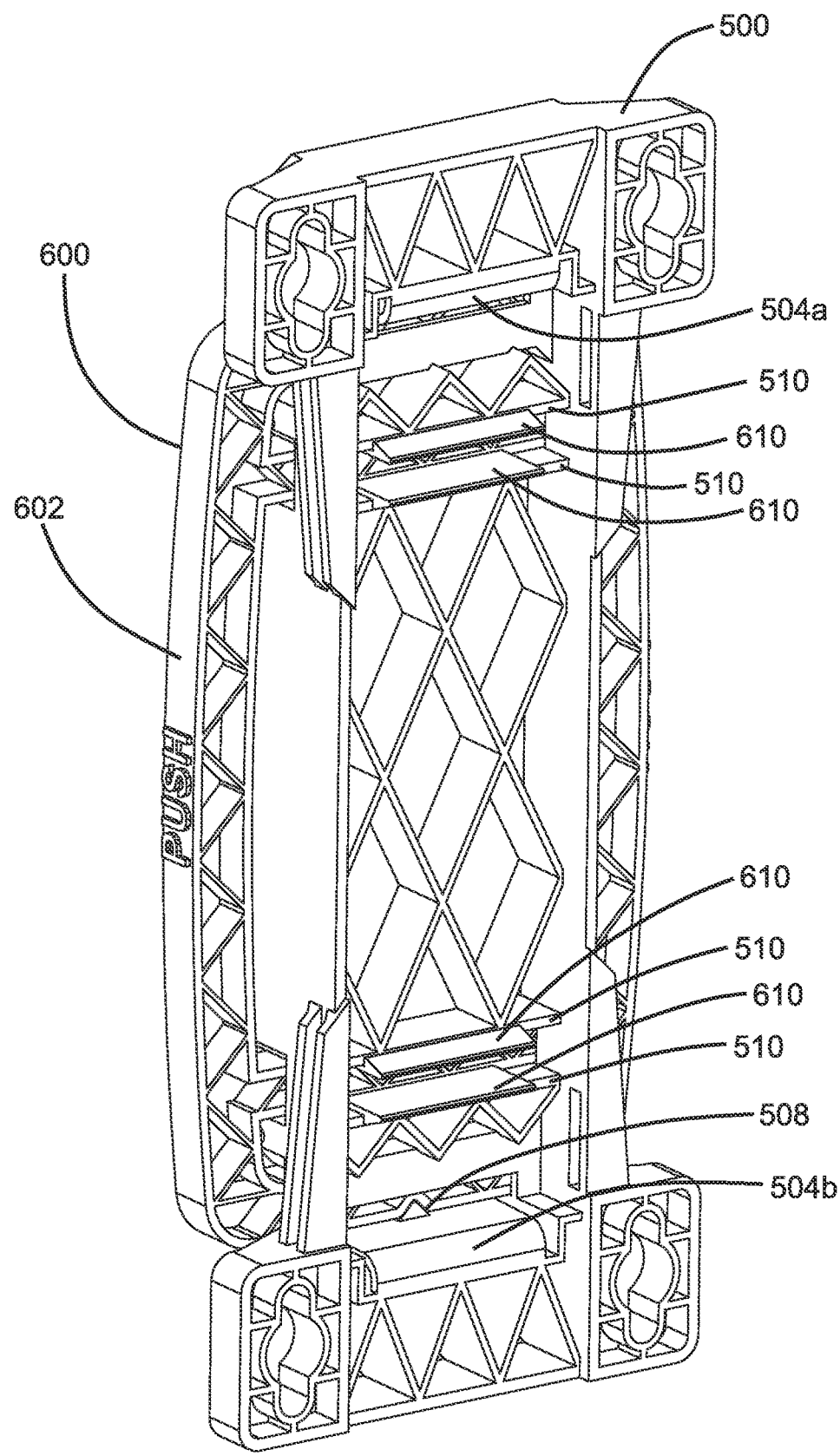

FIG. 20 is a rear isometric view of the terminal mounting bracket 500 and latch actuator 600. As shown in FIG. 20, the latch actuator 600 includes one or more secondary latches 610 that engage corresponding surfaces 510 on the rear of the terminal mounting bracket 500 to mount the latch actuator 600 onto the terminal mounting bracket 500. The secondary latches 610 allow the latch actuator 600 to move relative to the terminal mounting bracket 500 along a second axis X that is transverse to the first axis Z.

Figure 21:
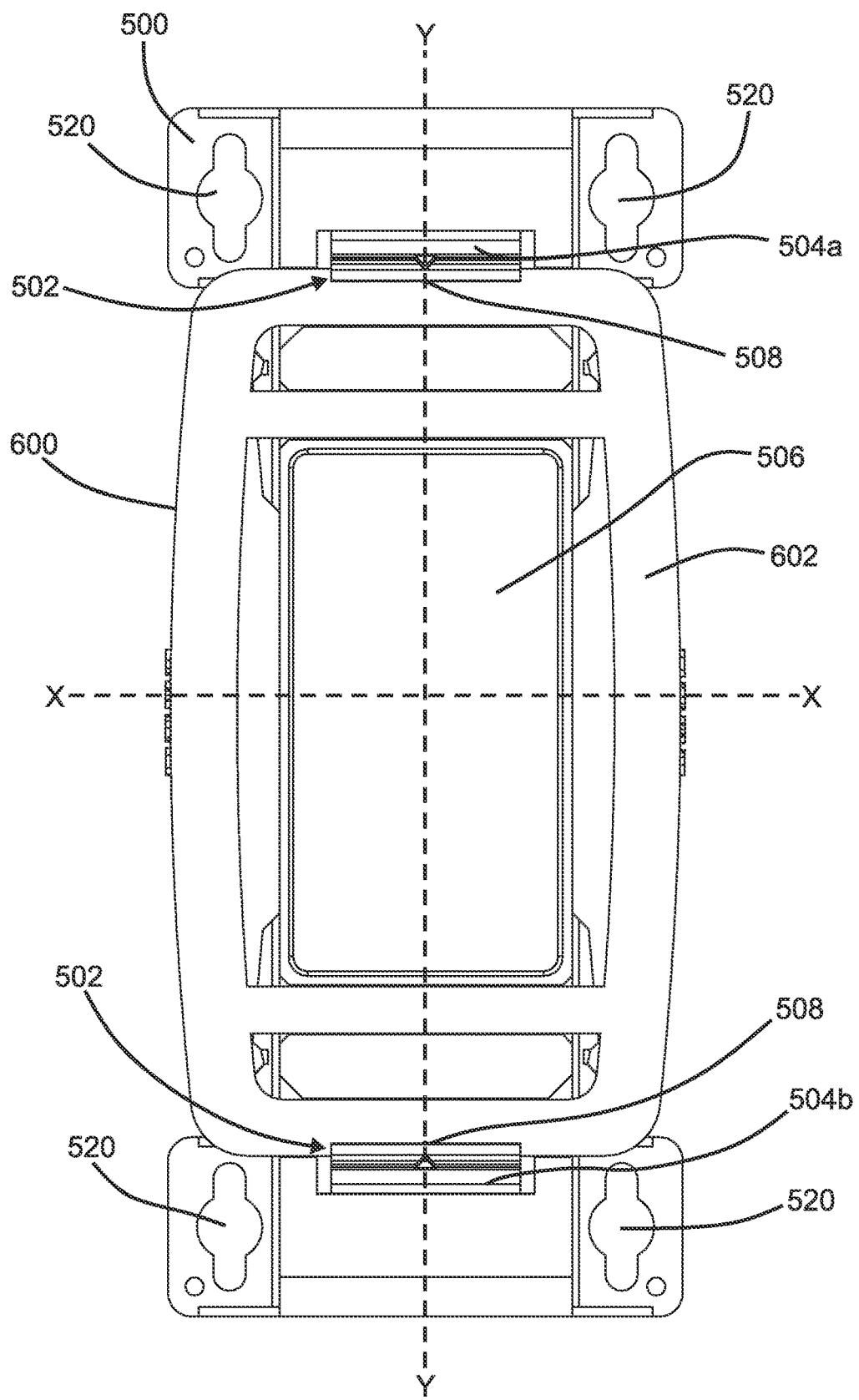
FIGS. 21 and 22 are front and rear views, respectively, of the latch actuator and terminal mounting bracket of FIG. 19.
Figure 22:
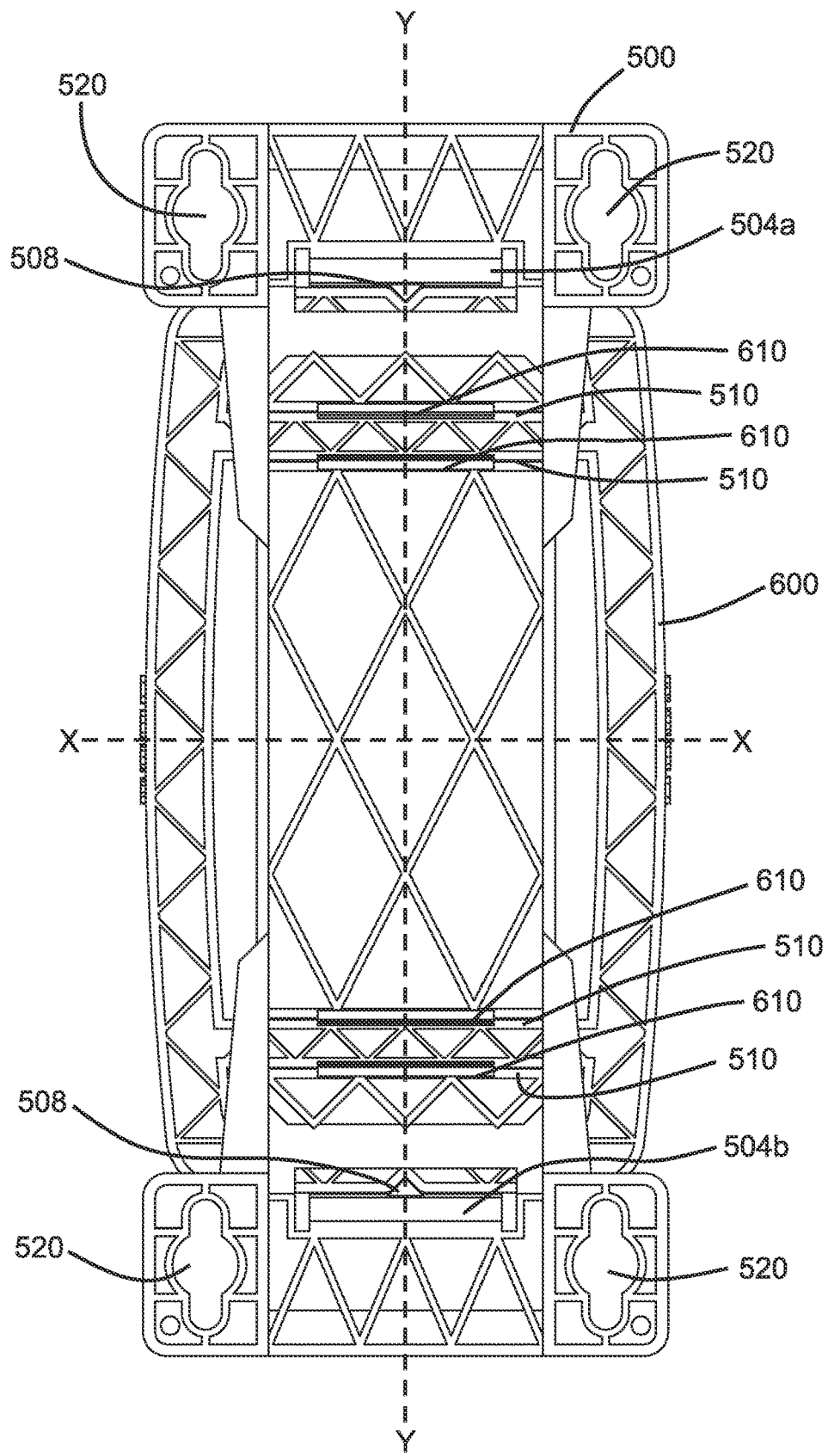

FIGS. 21 and 22 are front and rear views, respectively, of the terminal mounting bracket 500 and the latch actuator 600. The latch actuator 600 includes a ring portion 602 that surrounds the nest feature 506 defined by the terminal mounting bracket 500. The ring portion 602 is moveable in a first direction along the second axis X (e.g., from left to right) to unlatch the latching arrangements 502, and is also moveable in an opposite, second direction along the second axis X (e.g., from right to left) to unlatch the latching arrangements 502. The second axis X is transverse to the first axis Z. The ring portion 602 of the latch actuator 600 is accessible from the opposite first and second sides 412, 414 of the optical terminal 400 when the optical terminal 400 is mounted onto the terminal mounting bracket 500.

Each latching arrangement 502 includes a cam arrangement 508 defined between the latch actuator 600 and the latches 504a, 504b of the terminal mounting bracket 500. The cam arrangement 508 uses movement of the ring portion 602 along the second axis X to flex the latches 504a, 504b along a third axis Y to disengage the catches 410 on the optical terminal 400. The third axis Y is transverse to both the first axis Z and the second axis X.

Figure 23:
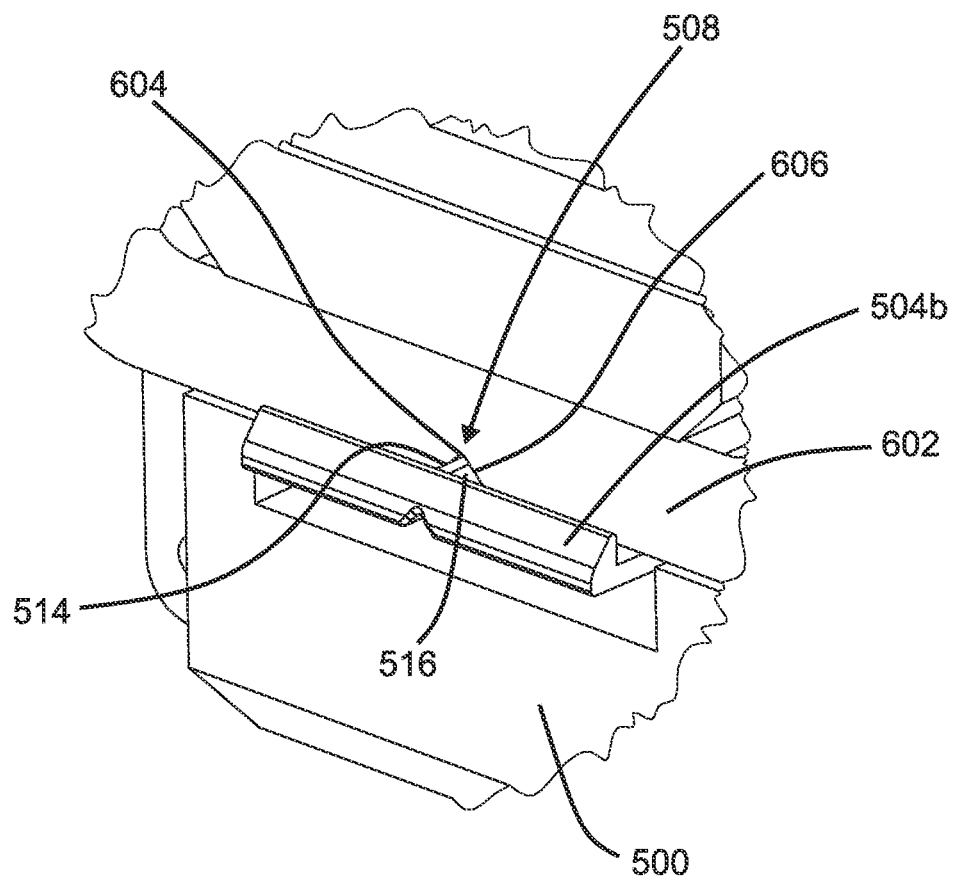
FIGS. 23 and 24 are detailed front and rear isometric views of a cam arrangement between the latch actuator and terminal mounting bracket of FIG. 19.
Figure 24:
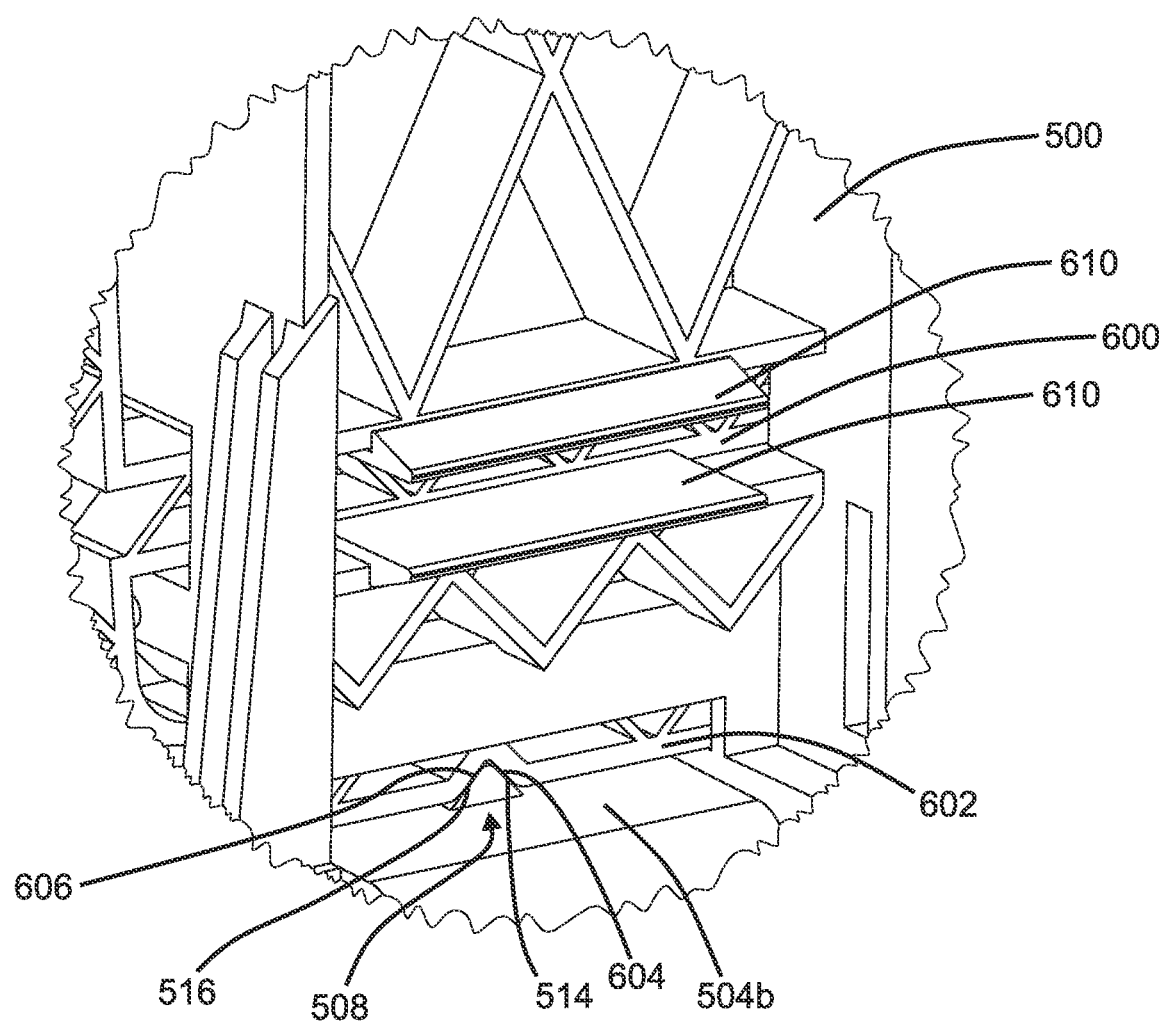

FIGS. 23 and 24 are detailed front and rear isometric views of the cam arrangement 508 between the latch actuator 600 and terminal mounting bracket 500. As shown in these FIGS., the cam arrangement 508 converts movement of the ring portion 602 in the first and second directions along the second axis X into a flexing of the latches 504a, 504b in first or second directions along the third axis Y. The flexing of the latches 504a, 504b in the first or second directions along the third axis Y allows the latches 504a, 504b to disengage the catches 410 on the optical terminal 400 and unlatch the optical terminal 400. The latches 504a, 504b have elastic constructions that bias the latches toward latched positions.

The cam arrangement 508 includes first angled surfaces 604, 606 on the ring portion 602 and corresponding second angled surfaces 514, 516 on the latches 504a, 504b. Movement of the ring portion 602 in the first or second direction along the second axis X allows the first angled surface 604, 606 to engage the corresponding second angled surface 514, 516 and thereby flex the latches 504a, 504b on the terminal mounting bracket 500 in the first and second directions along the third axis Y to disengage the catches 410.

Movement of the ring portion 602 in a first direction along the second axis X (e.g., from left to right) allows the first angled surfaces 604 of the latch actuator 600 to engage the corresponding second angled surfaces 514 of the terminal mounting bracket 500. Each latch 504a, 504b is flexible with respect to the terminal mounting bracket 500 such that when the first angled surfaces 604 engage the corresponding second angled surfaces 514, a first latch 504a is flexed in a first direction along the third axis Y (e.g., upward) causing the first latch 504a to disengage a corresponding catch 410 on the optical terminal 400, and a second latch 504b is flexed in a second direction along the third axis Y (e.g., downward) causing the second latch 504b to disengage a corresponding catch 410 on the optical terminal 400.

Movement of the ring portion 602 in a second direction along the second axis X (e.g., from right to left) allows first angled surface 606 of the latch actuator 600 to engage corresponding second angled surfaces 516 of the terminal mounting bracket 500 to flex the first latch 504a in the first direction along the third axis Y (e.g., upward) causing the first latch 504a to disengage a corresponding catch 410 on the optical terminal 400, and to flex the second latch 504b in the second direction along the third axis Y (e.g., downward) causing the second latch 504b to disengage a corresponding catch 410 on the optical terminal 400.

Advantageously, the latching arrangements 502 can be unlatched from either the first or second sides 412, 414 of the optical terminal 400 when the optical terminal 400 is mounted onto the terminal mounting bracket 500. Additionally, the latching arrangements 502 when unlatched enable the optical terminal 400 to be removed from the terminal mounting bracket 500 in the second direction along the first axis Z without pivoting the optical terminal 400 relative to the terminal mounting bracket 500.

Figure 25:
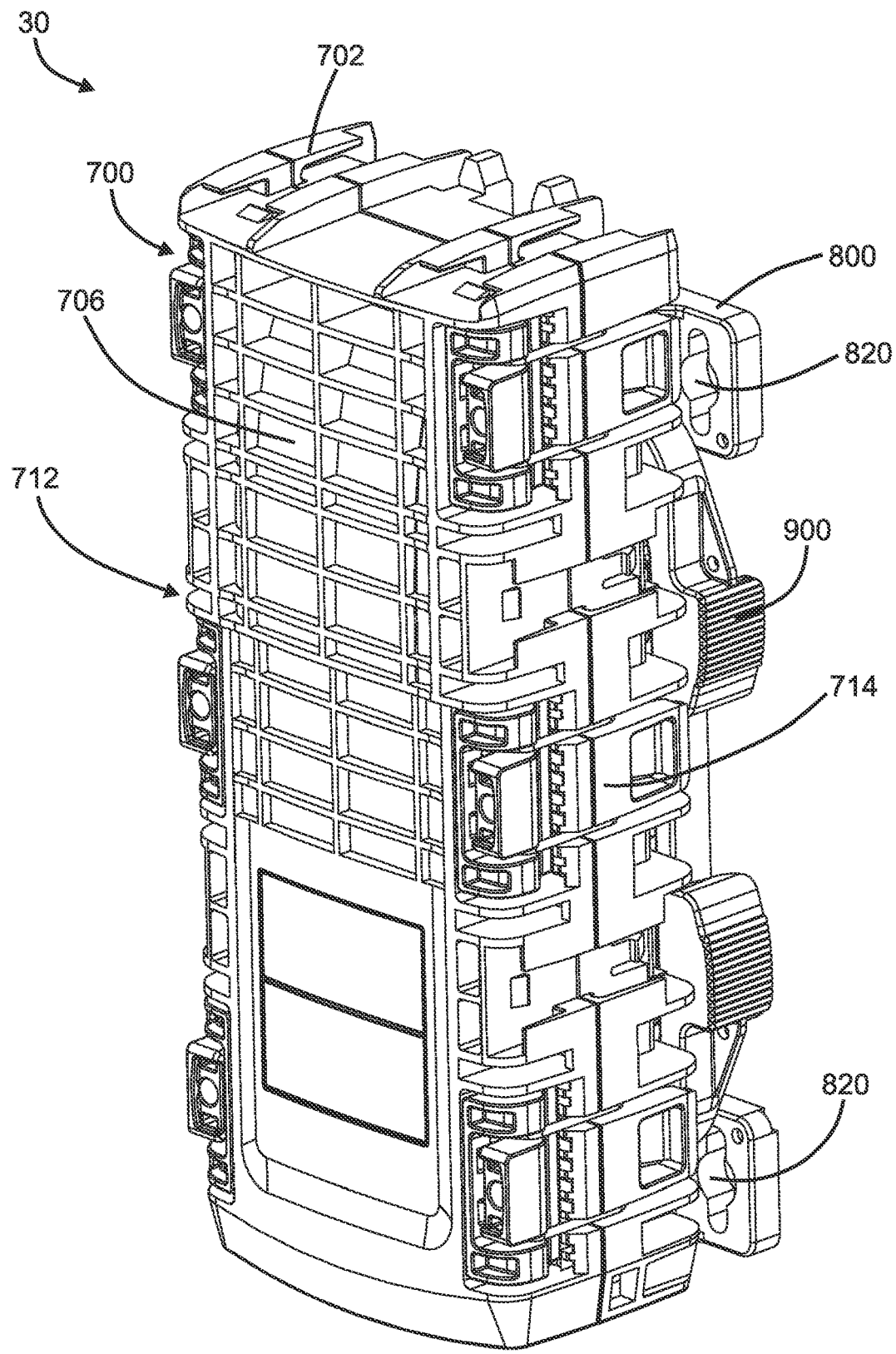
FIGS. 25 and 26 are front and rear isometric views of a telecommunications enclosure system in accordance with a third embodiment of the present disclosure.
Figure 26:
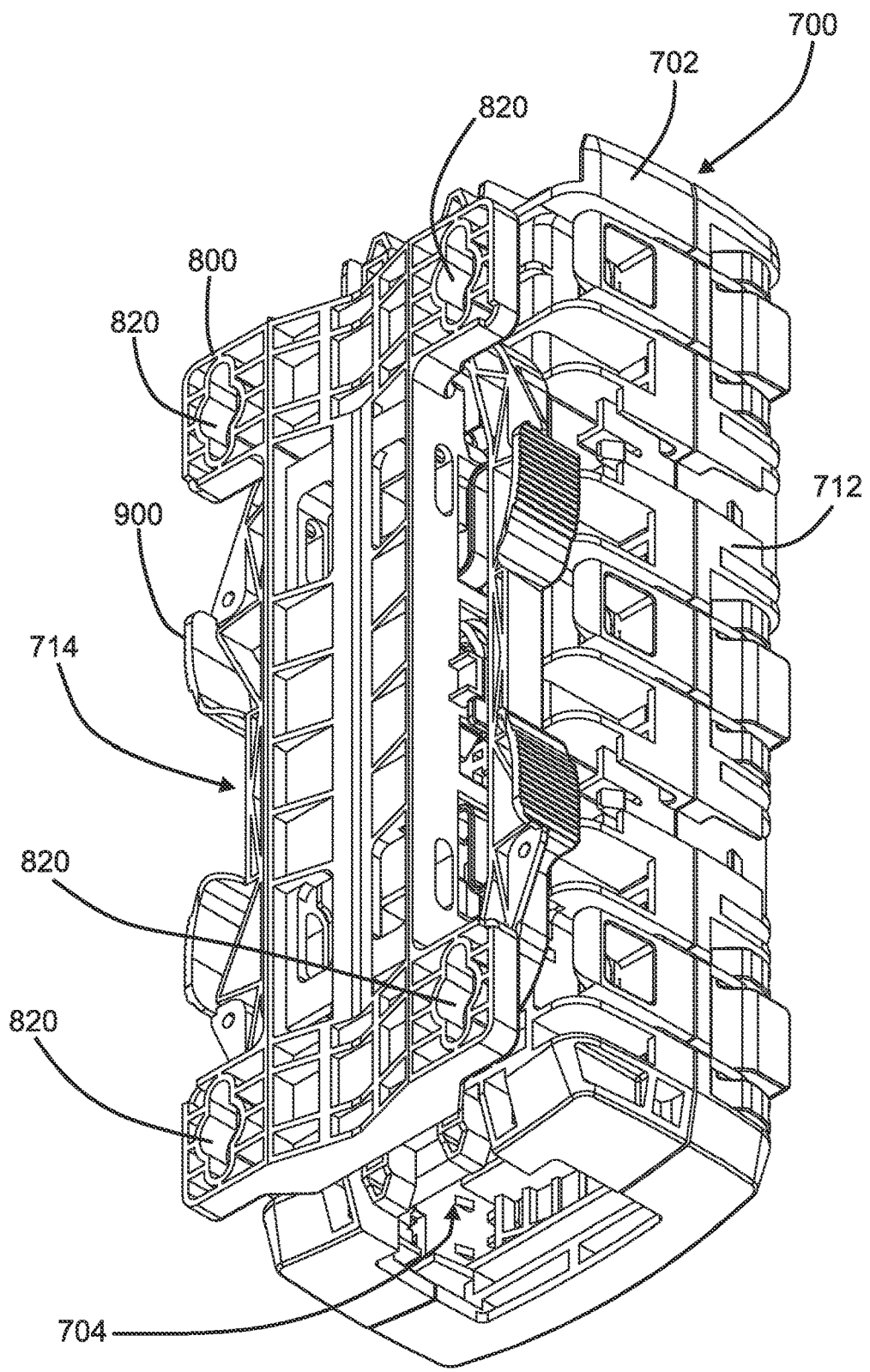

FIGS. 25 and 26 are front isometric and rear isometric views, respectively, of a telecommunications enclosure system 30 in accordance with a third embodiment of the present disclosure. The telecommunications enclosure system 30 includes an optical terminal 700, a terminal mounting bracket 800, and a latch actuator 900.

The optical terminal 700 has front and rear sides 706, 708, and opposite first and second sides 712, 714. The optical terminal 700 includes a housing 702 for enclosing optical components. The housing 702 has at least one optical port 704. The at least one optical port 704 can be configured to receive a fiber optic connector from outside the optical terminal 700 such that the optical port 704 is a hardened fiber optic adapter port or can be configured to receive a fiber optic cable such that the optical port 704 is a sealed cable opening.

The terminal mounting bracket 800 includes fastener openings 820 configured to receive fasteners for mounting the terminal mounting bracket 800 to a structure in the field. Fasteners such as screws, bolts, nails, and the like can be passed through the fastener openings 820 for mounting the terminal mounting bracket 800 (and the optical terminal 700 when mounted thereto) to structures including a wall, a pole, and the like. When mounted to a structure in the field, the terminal mounting bracket 800 (and the optical terminal 700 when mounted thereto) can be mounted in either a horizontal orientation or a vertical orientation.

The latch actuator 900 is configured to latch and unlatch the optical terminal 700 from the terminal mounting bracket 800. Advantageously, the optical terminal 700 does not pivot or slide relative to the terminal mounting bracket 800 when the optical terminal 700 is mounted onto the terminal mounting bracket 800 via the latch actuator 900. Instead, the latch actuator 900 enables the optical terminal 700 to mount to the terminal mounting bracket 800 by moving linearly relative to the terminal mounting bracket 800 in a first direction along a first axis Z (see FIGS. 27 and 28), and to dismount by moving in an opposite linear direction along the first axis Z. While the latch actuator 900 is shown in the example embodiments as a component that is separate from the optical terminal 700, it is contemplated that the latch actuator 900 could be integral with the optical terminal 700 such that the latch actuator 900 is a part of the optical terminal 700.

Figure 27:
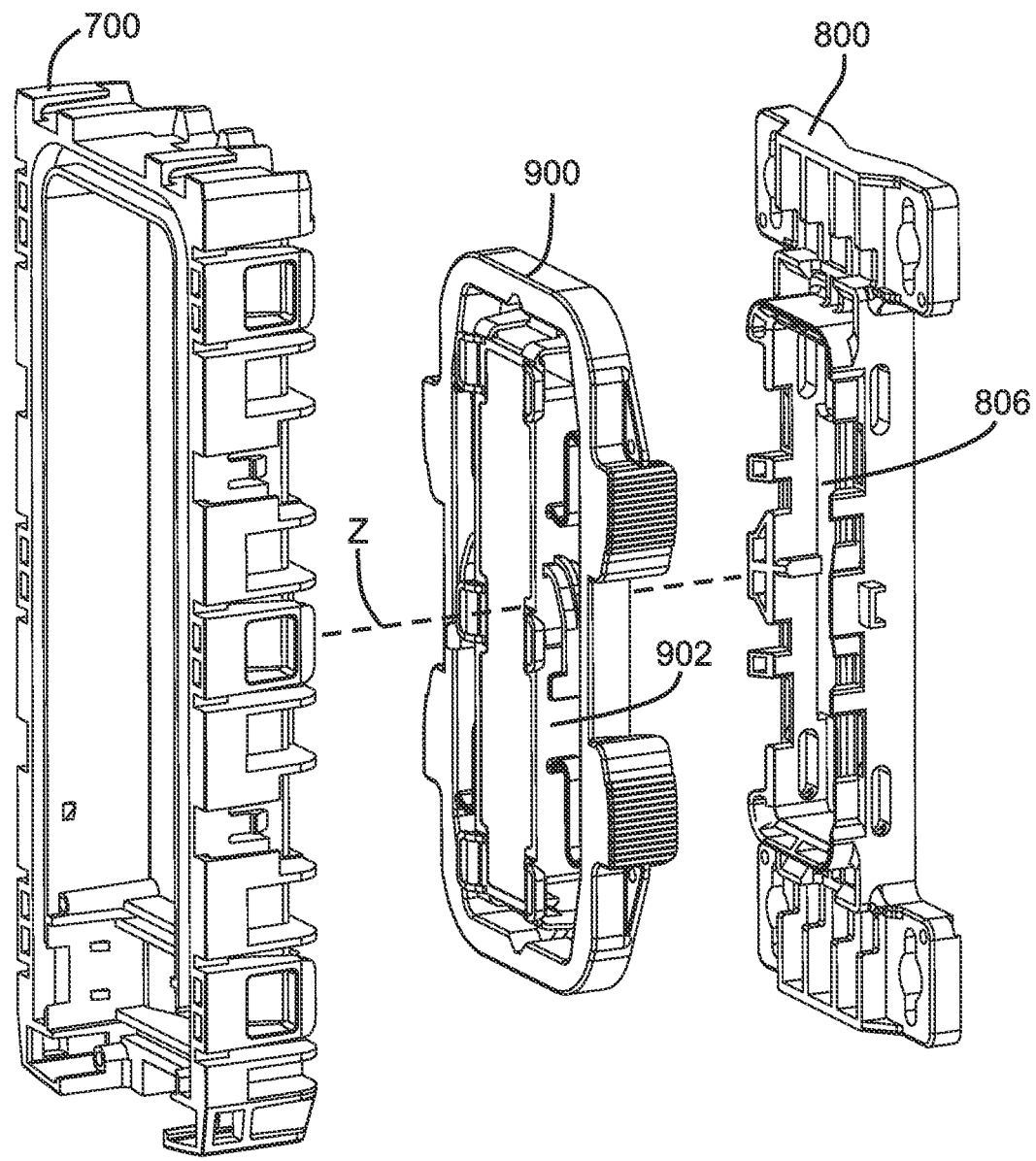
FIGS. 27 and 28 are front and rear exploded isometric views of the telecommunications enclosure system of FIG. 25.
Figure 28:
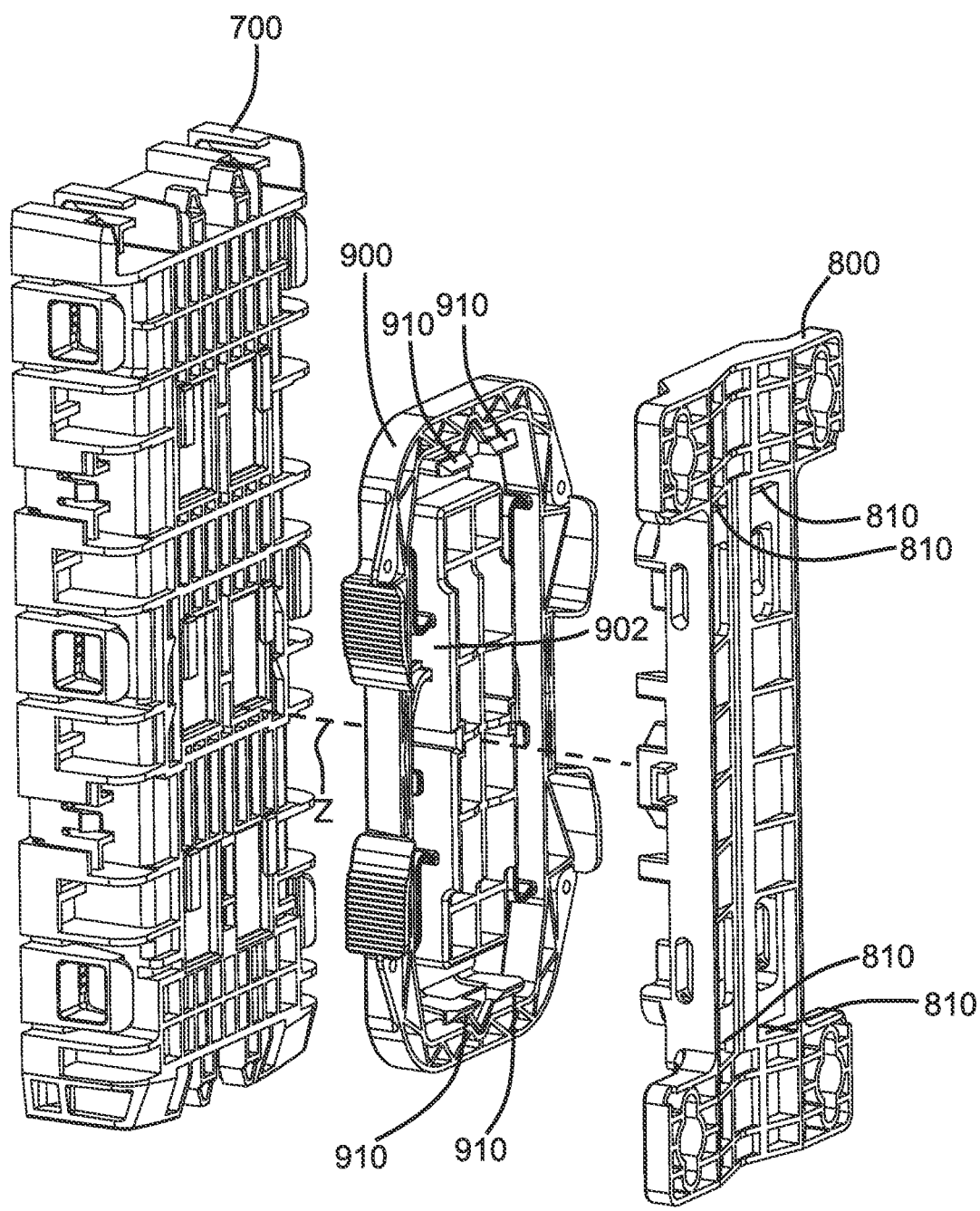
Figure 29:
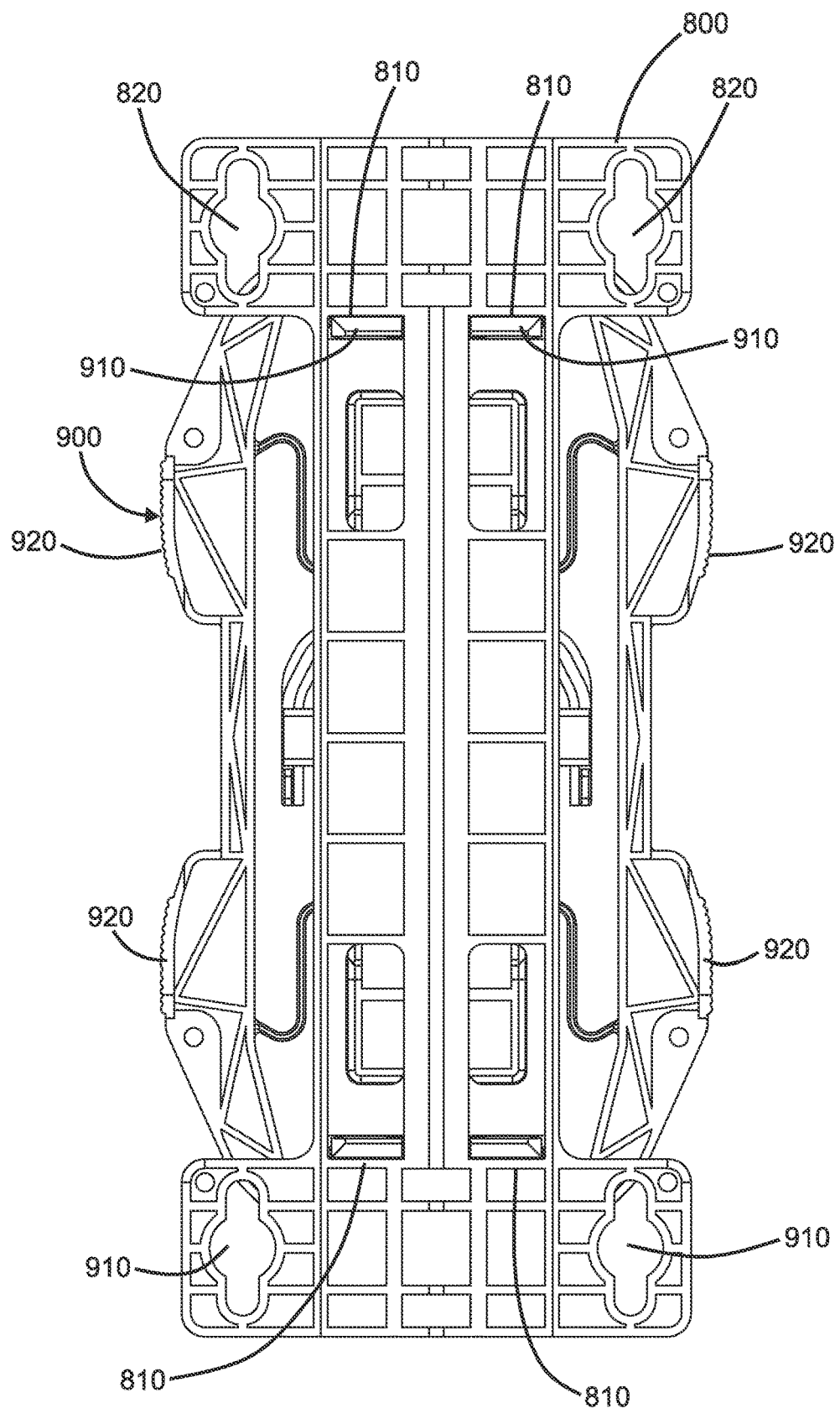
FIG. 29 is a rear view of a latch actuator latched onto a terminal mounting bracket of the telecommunications enclosure system of FIG. 25.

FIGS. 27 and 28 are front and rear exploded isometric views of the telecommunications enclosure system 30. FIG. 29 is a rear view of the latch actuator 900 latched onto the terminal mounting bracket 800. As shown in FIGS. 27-29, the latch actuator 900 includes latches 910 that engage corresponding surfaces 810 on the rear of the terminal mounting bracket 800 to latch the latch actuator 900 to the terminal mounting bracket 800. The latches 910 are flexibly connected to a central portion 902 of the latch actuator 900. In some examples, the latches 910 snap-fit onto the corresponding surfaces 810 when the latch actuator 900 is moved linearly relative to the terminal mounting bracket 800 in a first direction along a first axis Z. When latched, the latch actuator 900 is prevented from moving relative to the terminal mounting bracket 800 in a second direction along the first axis Z.

Still referring to FIGS. 27-29, a nested relationship is provided between a nest feature 806 on the terminal mounting bracket 800 and the central portion 902 of the latch actuator 900. The nested relationship prevents relative movement between the latch actuator 900 and the terminal mounting bracket 800 along a plane perpendicular to the first axis Z when the latch actuator 900 is latched onto the terminal mounting bracket 800. The nest feature 806 and central portion 902 are depicted in the FIGS. as mating male and female structures that are rectangular in shape.

Figure 30:
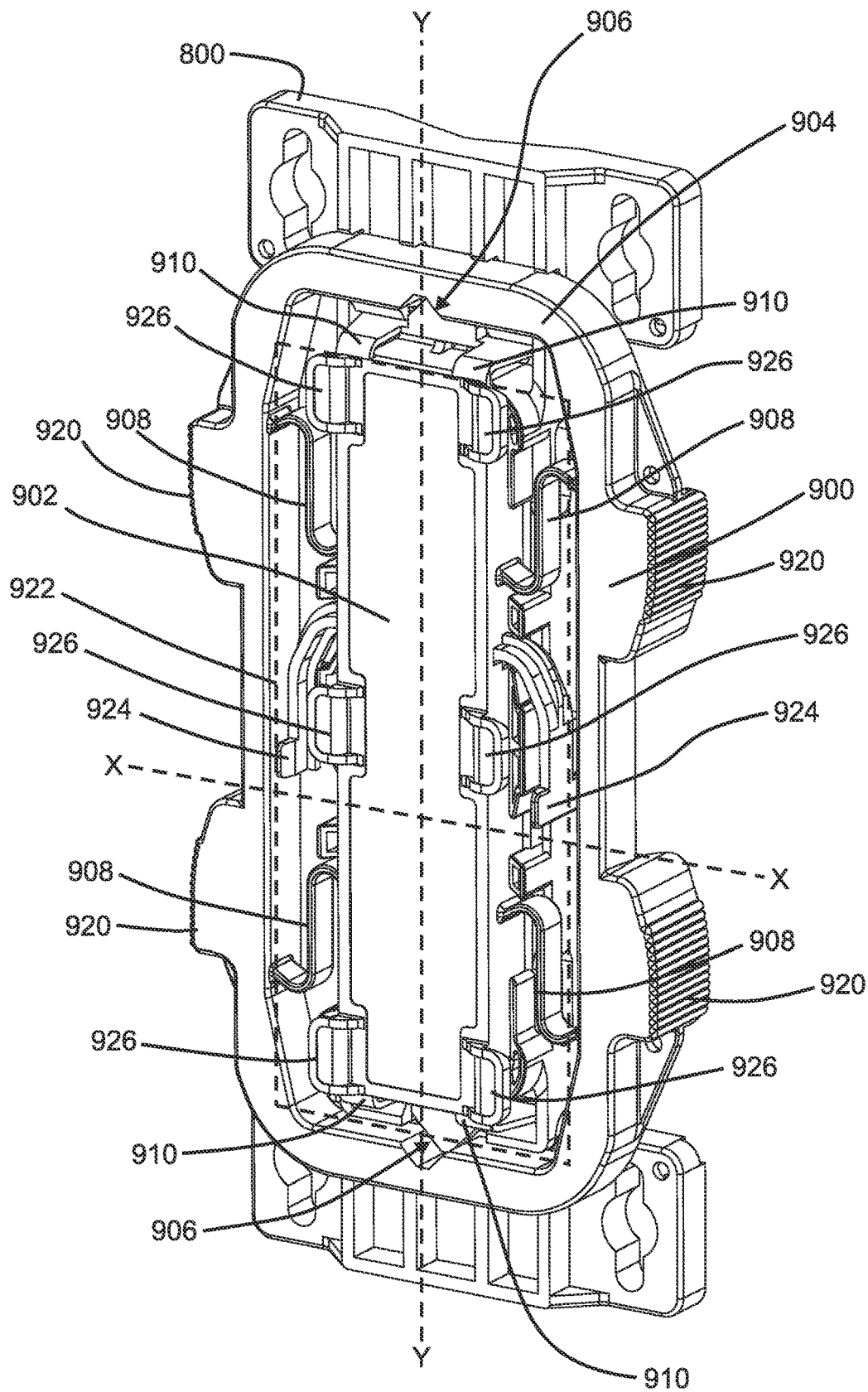
FIG. 30 is a front isometric view of the latch actuator latched onto the terminal mounting bracket of the telecommunications enclosure system of FIG. 25.
Figure 31:
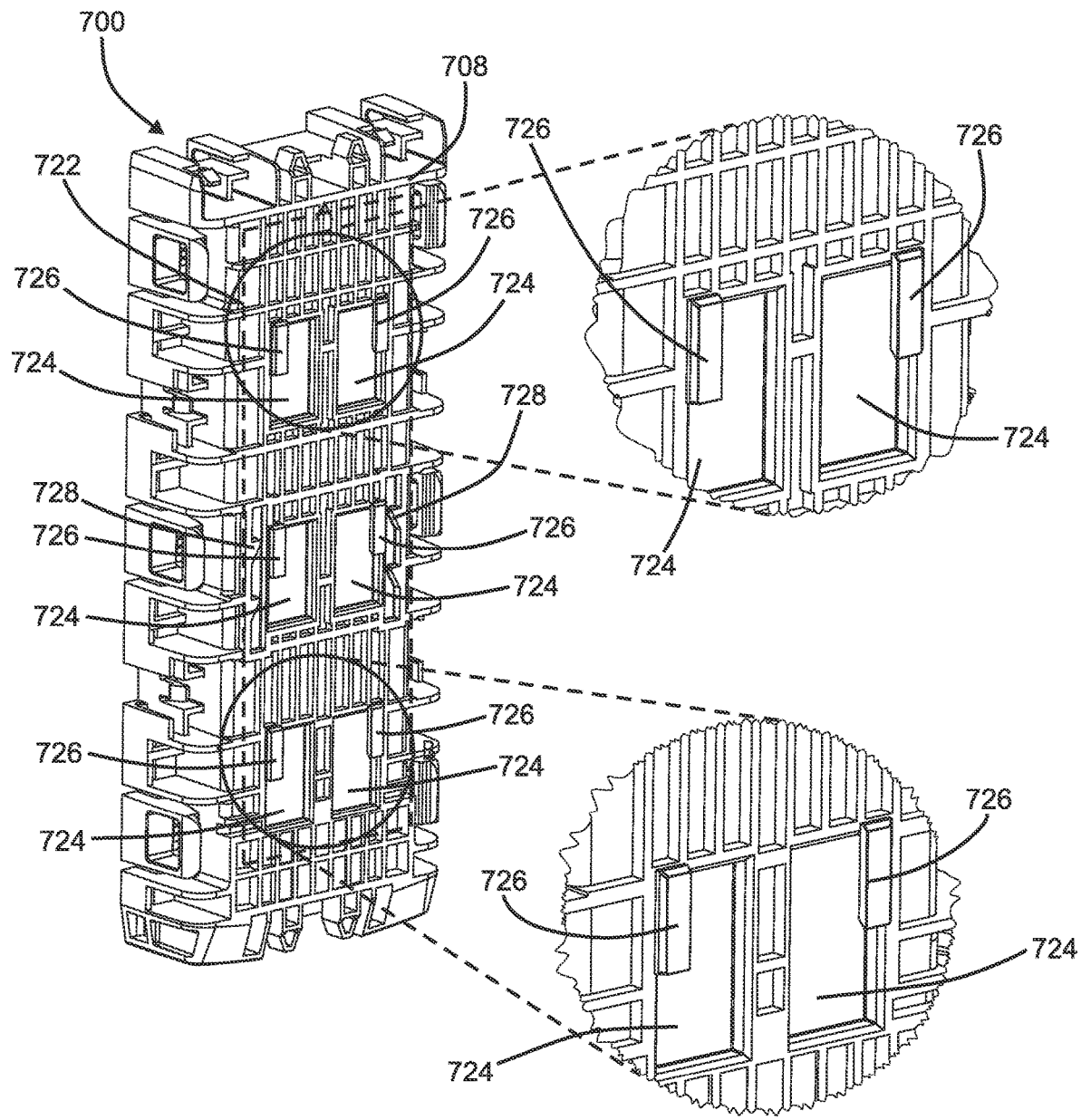
FIG. 31 is a rear isometric view of an optical terminal of the telecommunications enclosure system of FIG. 25.

FIG. 30 is a front isometric view of the terminal mounting bracket 800 latched onto the latch actuator 900. FIG. 31 is a rear isometric view of the optical terminal 700. Referring now to FIGS. 27-31, the optical terminal 700 mounts onto the terminal mounting bracket 800 via the latch actuator 900. The optical terminal includes a first mechanical interface 722 that mounts onto a second mechanical interface 922 of the latch actuator 900. The first and second mechanical interfaces 722, 922 are similar to the mechanical interfaces described in PCT International Patent Application No. PCT/US2019/028252, filed Apr. 19, 2019, and which claims the benefit of U.S. Patent Application Ser. No. 62/661,351, filed Apr. 23, 2018, and claims the benefit of U.S. Patent Application Ser. No. 62/683,962, filed Jun. 12, 2018, and claims the benefit of U.S. Patent Application Ser. No. 62/747,731, filed Oct. 19, 2018, and claims the benefit of U.S. Patent Application Ser. No. 62/807,008, filed Feb. 18, 2019, the disclosures of which are incorporated herein by reference in their entireties.

In some examples, the latch actuator 900 is pre-mounted to the optical terminal 700 prior to being used to secure the optical terminal 700 to the terminal mounting bracket 800. Thus, the latch actuator 900 becomes part of the optical terminal 700, but is also removable from the optical terminal 700.

The first mechanical interface 722 includes a plurality of mounting slots 724. Each mounting slot 724 is covered at least in part by a retainer 726. In the illustrated example, the first mechanical interface 722 includes six mounting slots 724 and six retainers 726. It is contemplated that in other examples, the number of mounting slots 724 and retainers 726 may vary such that the first mechanical interface 722 may include more than or fewer than six mounting slots 724 and associated retainers 726. The first mechanical interface 722 also includes one or more catches 728. In the illustrated example, the first mechanical interface 722 includes catches 728 on opposite ends of the rear side 708 of the optical terminal 700.

The second mechanical interface 922 has one or more side latches 924 and a plurality of mounting tabs 926. In the illustrated example, the central portion 902 of the latch actuator 900 includes the plurality of mounting tabs 926 of the second mechanical interface 922. The mounting tabs 926 are able to slide within the mounting slots 724 of the first mechanical interface 722, and to thereafter engage the retainers 726 to prevent movement of the optical terminal 700 along the first axis Z relative to the latch actuator 900 (and also relative to the terminal mounting bracket 800 when the latch actuator 900 is attached thereto). The number of mounting tabs 926 can match the number of corresponding mounting slots 724 and associated retainers 726 such that the first mechanical interface 722 is illustrated as having six mounting tabs 926. However, the number of mounting tabs 926 may vary such that the second mechanical interface 922 may include more than or fewer than six mounting tabs 926.

When the mounting tabs 926 slide within the mounting slots 724, the one or more side latches 924 engage the one or more catches 728 on the optical terminal 700 to prevent movement of the optical terminal 700 along a plane perpendicular to the first axis Z relative to the latch actuator 900 (and also relative to the terminal mounting bracket 800 when the latch actuator 900 is latched thereto). Thus, when the first mechanical interface 722 slides relative to the second mechanical interface 922, the optical terminal 700 is latched onto the latch actuator 900. As described above, the latch actuator 900 latches onto the terminal mounting bracket 800 via the latches 910 that engage the surfaces 810 of the terminal mounting bracket 800. Accordingly, the optical terminal 700 is also latched onto the terminal mounting bracket 800 via the latch actuator 900.

Figure 32:
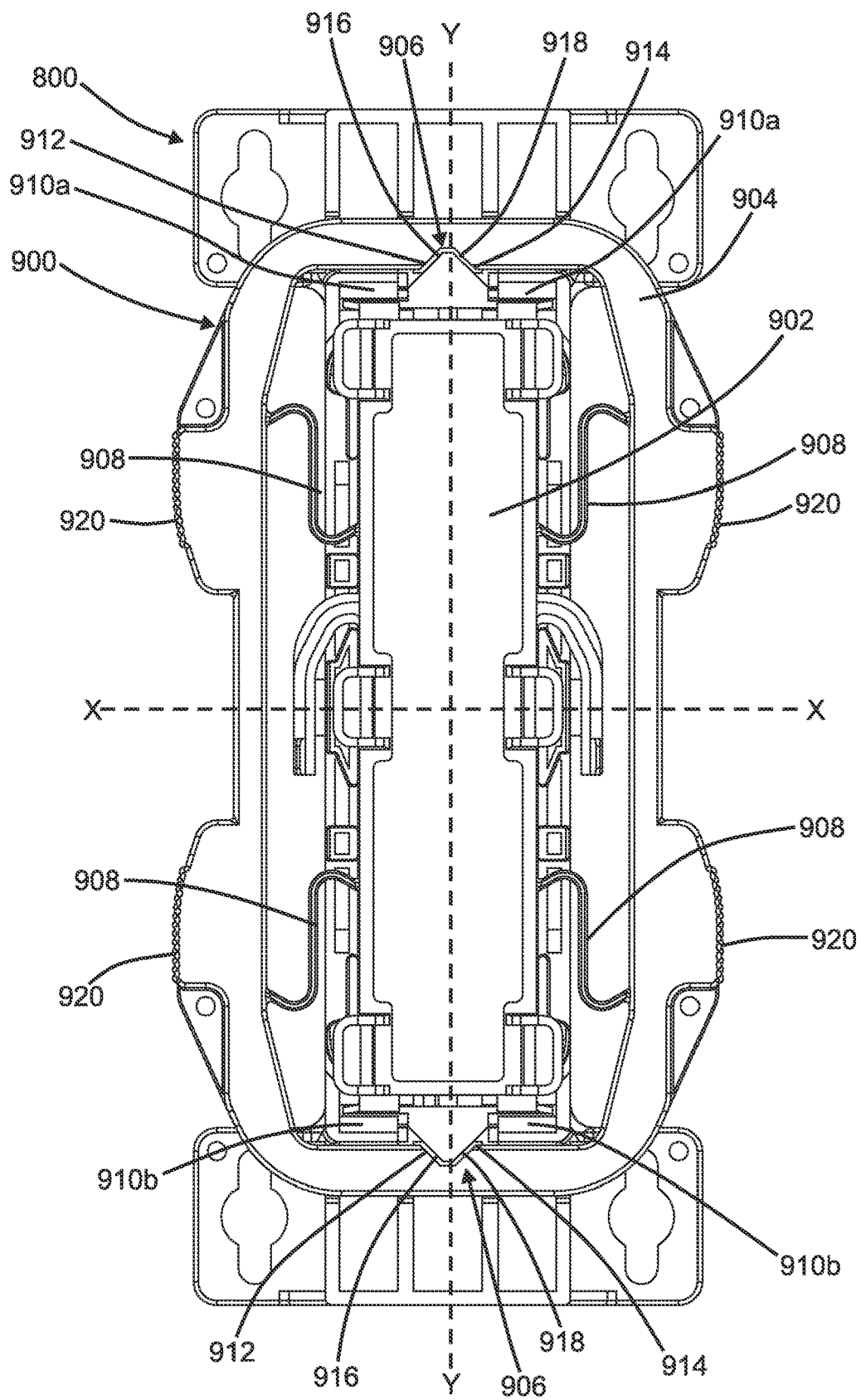
FIG. 32 is a front view of the latch actuator and terminal mounting bracket of FIG. 29.

FIG. 32 is a front view of the latch actuator 900 latched onto the terminal mounting bracket 800. Referring now to FIGS. 30 and 32, the latch actuator 900 includes a ring portion 904 that surrounds the central portion 902. Elastic members 908 connect the ring portion 904 to the central portion 902. The elastic members 908 bias the ring portion 904 toward a neutral position relative to the central portion 902. The elastic members 908 enable the ring portion 904 to be moveable from the neutral position relative to the central portion 902 in first and second directions of a second axis X. The second axis X is transverse to the first axis Z.

The ring portion 904 is moveable in the first direction along the second axis X to unlatch the latches 910 that engage the terminal mounting bracket 800, and the ring portion 904 is also moveable in the second direction along the second axis X to unlatch the latches 910 that engage the terminal mounting bracket 800. The ring portion 904 of the latch actuator 900 is accessible from the opposite first and second sides 712, 714 of the optical terminal 700 via one or more handlebars 920 when the optical terminal 700 is mounted onto the latch actuator 900, and the latch actuator 900 is latched onto the terminal mounting bracket 800.

A cam arrangement 906 is defined between the ring portion 904 and the central portion 902. The cam arrangement 906 converts a movement of the ring portion 904 in the first and second directions along the second axis X to flex the latches 910 along a third axis Y that is transverse to the second axis X. When flexed along the third axis Y, the latches 910 disengage the surfaces 810 of the terminal mounting bracket 800, and unlatch the latch actuator 900 from the terminal mounting bracket 800, and thereby also remove the optical terminal 700 from the terminal mounting bracket 800 in the second direction along the first axis Z since the optical terminal 700 is attached to the latch actuator 900 by the first and second mechanical interfaces 722, 922 that are described above in more detail.

Figure 33:
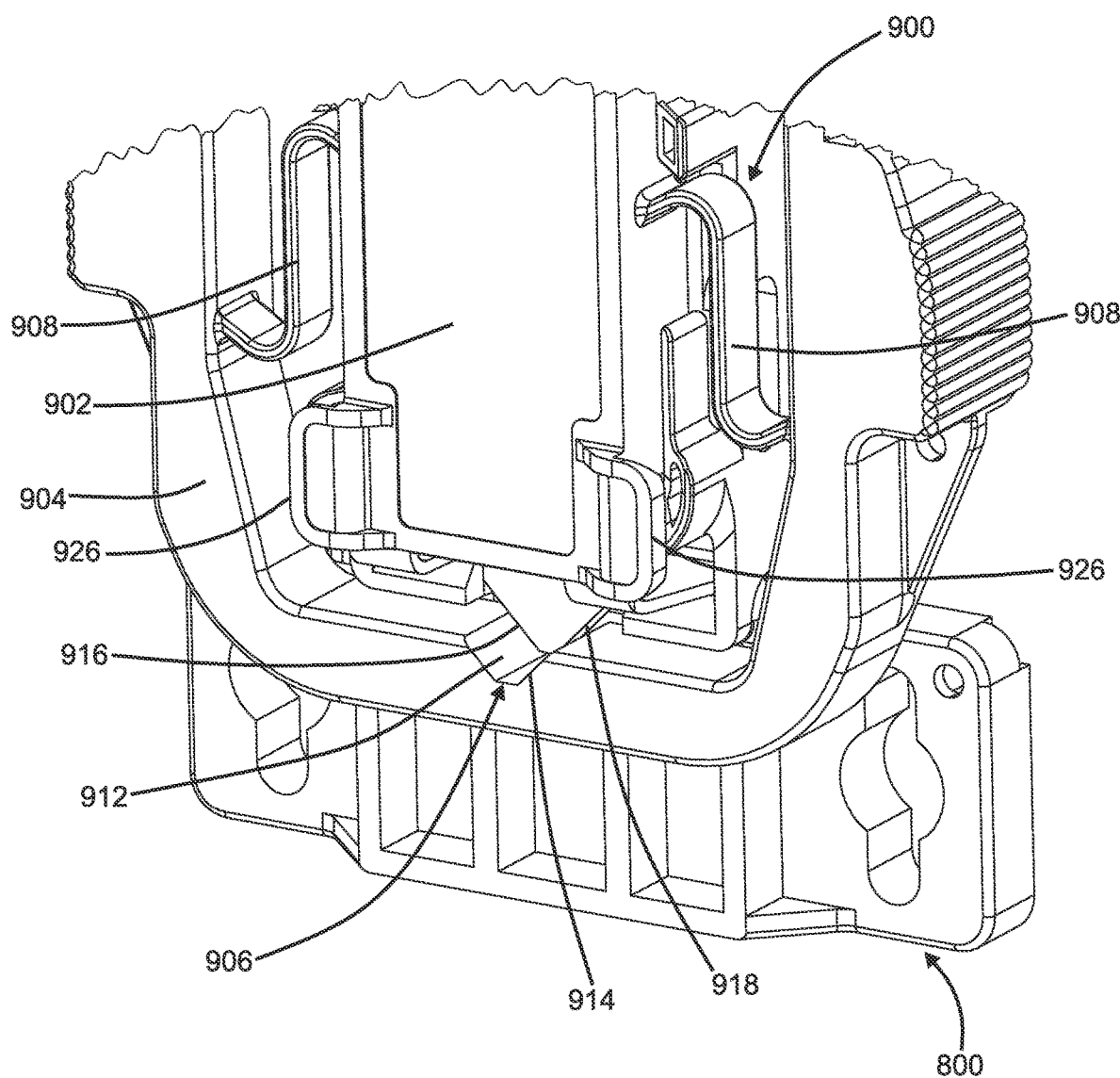
FIG. 33 is a detailed front isometric view of a cam arrangement of the latch actuator.

FIG. 33 is a detailed front isometric view of the cam arrangement 906. Referring now to FIGS. 32 and 33, the cam arrangement 906 includes first angled surfaces 912, 914 on the ring portion 904 and corresponding second angled surfaces 916, 918 on the central portion 902. Movement of the ring portion 904 in a first direction along the second axis X (e.g., from left to right) allows the first angled surfaces 912 to engage the second angled surfaces 916. First and second sets of latches 910a, 910b are flexible with respect to the central portion 902 such that when the first angled surfaces 912 engage the corresponding second angled surfaces 916, a first set of latches 910a are flexed in a first direction along the third axis Y (e.g., downward) causing the first set of latches 910a to disengage corresponding surfaces 810 on the terminal mounting bracket 800, and a second set of latches 910b are flexed in a second direction along the third axis Y (e.g., upward) causing the second set of latches 910b to disengage corresponding surfaces 810 on the terminal mounting bracket 800.

Movement of the ring portion 904 in a second direction along the second axis X (e.g., from right to left) allows the first angled surfaces 914 to engage corresponding second angled surfaces 918 to flex the first set of latches 910a in the first direction along the third axis Y (e.g., downward) causing the first set of latches 910a to disengage corresponding surfaces 810 on the terminal mounting bracket 800, and to flex the second set of latches 910b in the second direction along the third axis Y (e.g., upward) causing the second set of latches 910b to disengage corresponding surfaces 810 on the terminal mounting bracket 800.

Advantageously, the latch actuator 900 can be unlatched from the terminal mounting bracket 800 at the first or second sides 712, 714 of the optical terminal 700 while the optical terminal 700 is mounted onto the latch actuator 900. Additionally, the latch actuator 900 enables the optical terminal 700 to be removed from the terminal mounting bracket 800 in the second direction along the first axis Z without pivoting the optical terminal 700 relative to the terminal mounting bracket 800.

Figure 34:
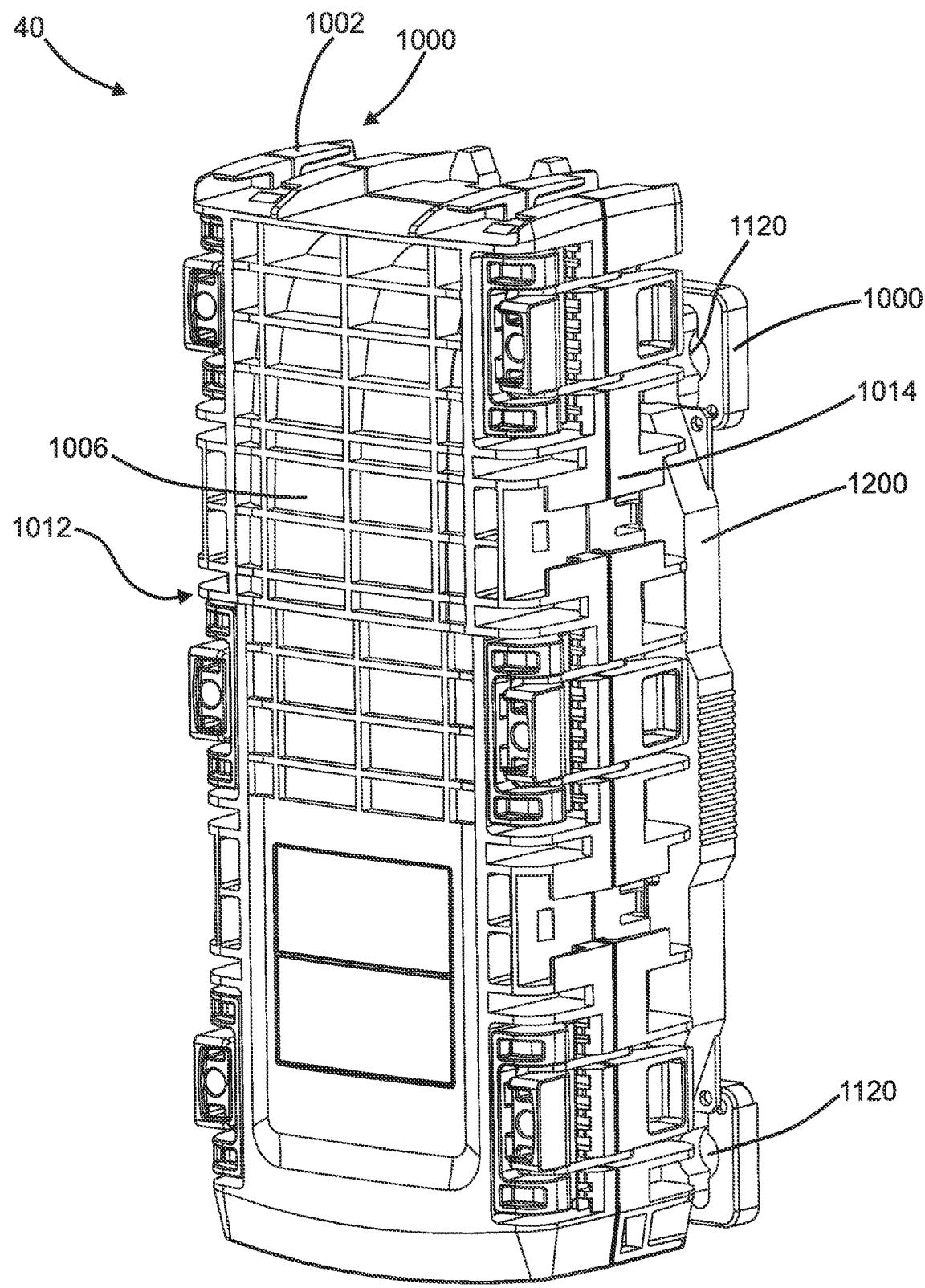
FIGS. 34 and 35 are front and rear isometric views of a telecommunications enclosure system in accordance with a fourth embodiment of the present disclosure.
Figure 35:
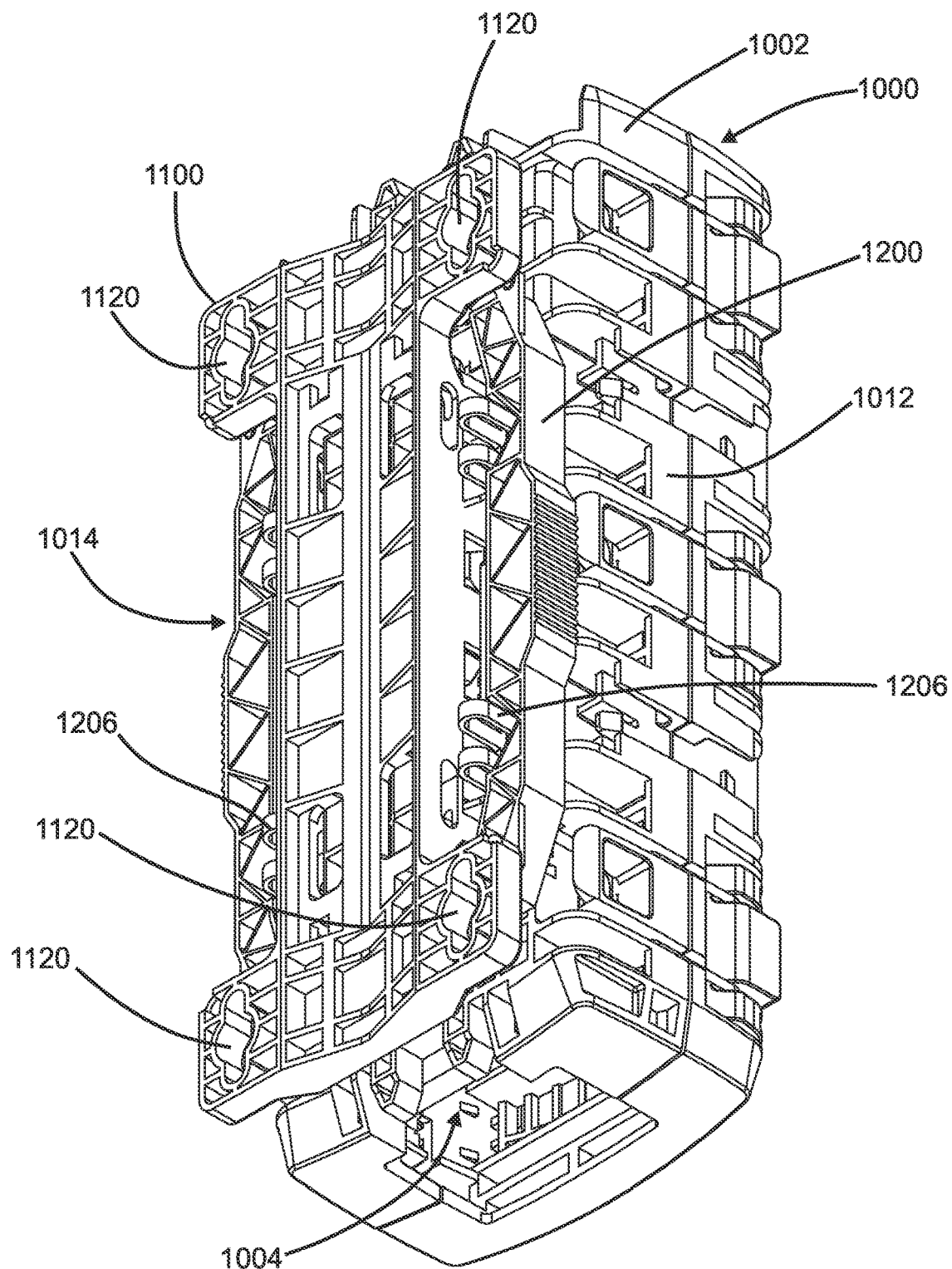

FIGS. 34 and 35 are front isometric and rear isometric views, respectively, of a telecommunications enclosure system 40 in accordance with a fourth embodiment of the present disclosure. The telecommunications enclosure system 40 includes an optical terminal 1000, a terminal mounting bracket 1100, and a latch actuator 1200.

The optical terminal 1000 has front and rear sides 1006, 1008, and opposite first and second sides 1012, 1014. The optical terminal 1000 includes a housing 1002 for enclosing optical components. The housing 1002 has at least one optical port 1004 that can be configured to receive a fiber optic connector from outside the optical terminal 1000 such that the optical port 1004 is a hardened fiber optic adapter port or can be configured to receive a fiber optic cable such that the optical port 1004 is a sealed cable opening.

The terminal mounting bracket 1100 includes fastener openings 1120 configured to receive fasteners for mounting the terminal mounting bracket 1100 to a structure in the field. Fasteners such as screws, bolts, nails, and the like can be passed through the fastener openings 1120 for mounting the terminal mounting bracket 1100 (and the optical terminal 1000 when mounted thereto) to structures including a wall, a pole, and the like. When mounted to a structure, the terminal mounting bracket 1100 and optical terminal 1000 can be mounted in either a horizontal orientation or a vertical orientation.

The latch actuator 1200 is configured to latch and unlatch the optical terminal 1000 from the terminal mounting bracket 1100. Advantageously, the optical terminal 1000 does not pivot or slide relative to the terminal mounting bracket 1100 when the optical terminal 1000 is mounted onto the terminal mounting bracket 1100 via the latch actuator 1200. Instead, the latch actuator 1200 enables the optical terminal 1000 to mount to the terminal mounting bracket 1100 by moving linearly relative to the terminal mounting bracket 1100 in a first direction along a first axis Z (see FIG. 36).

Figure 36:
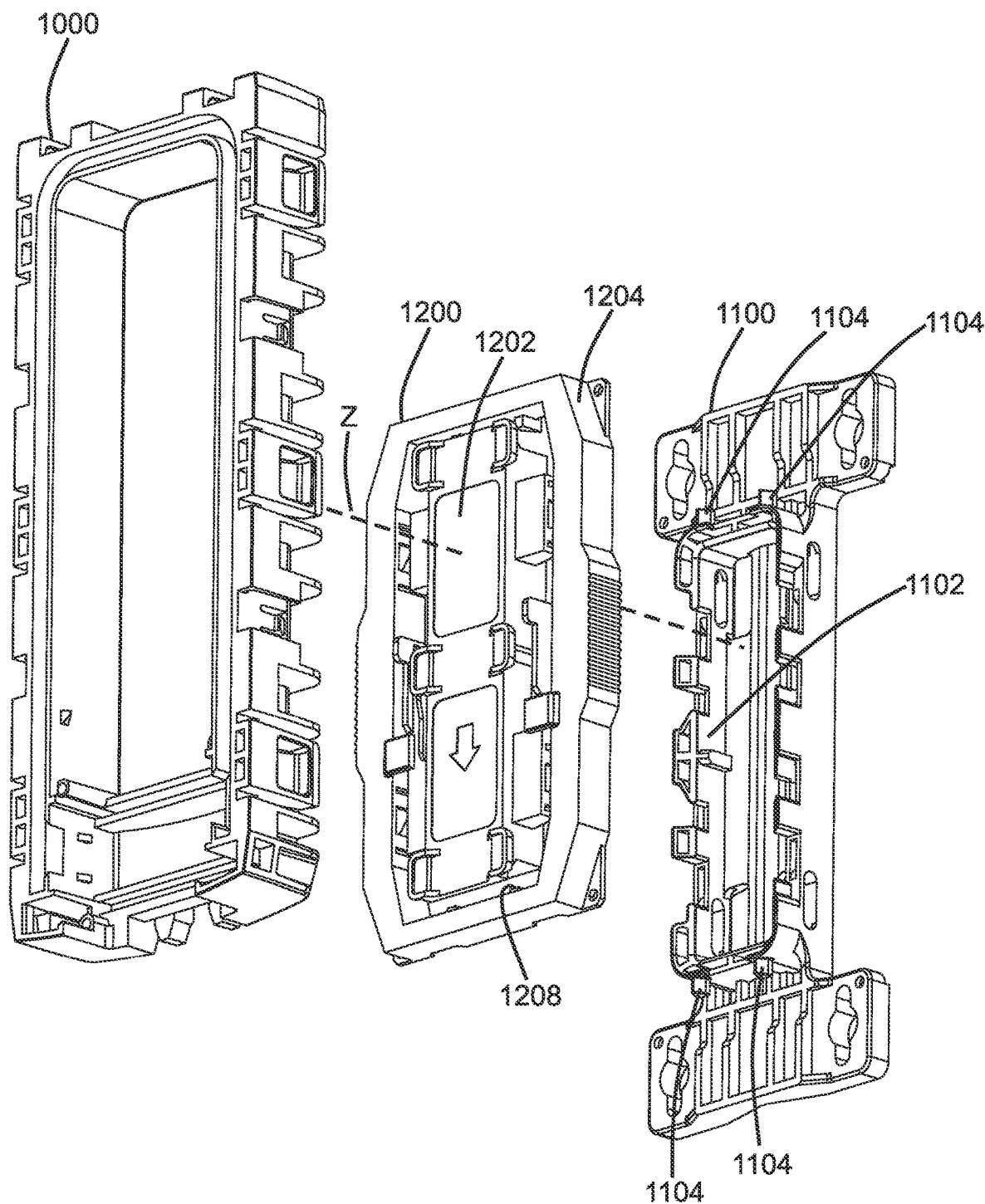
FIG. 36 is a front exploded isometric view of the telecommunications enclosure system of FIG. 34.
Figure 37:
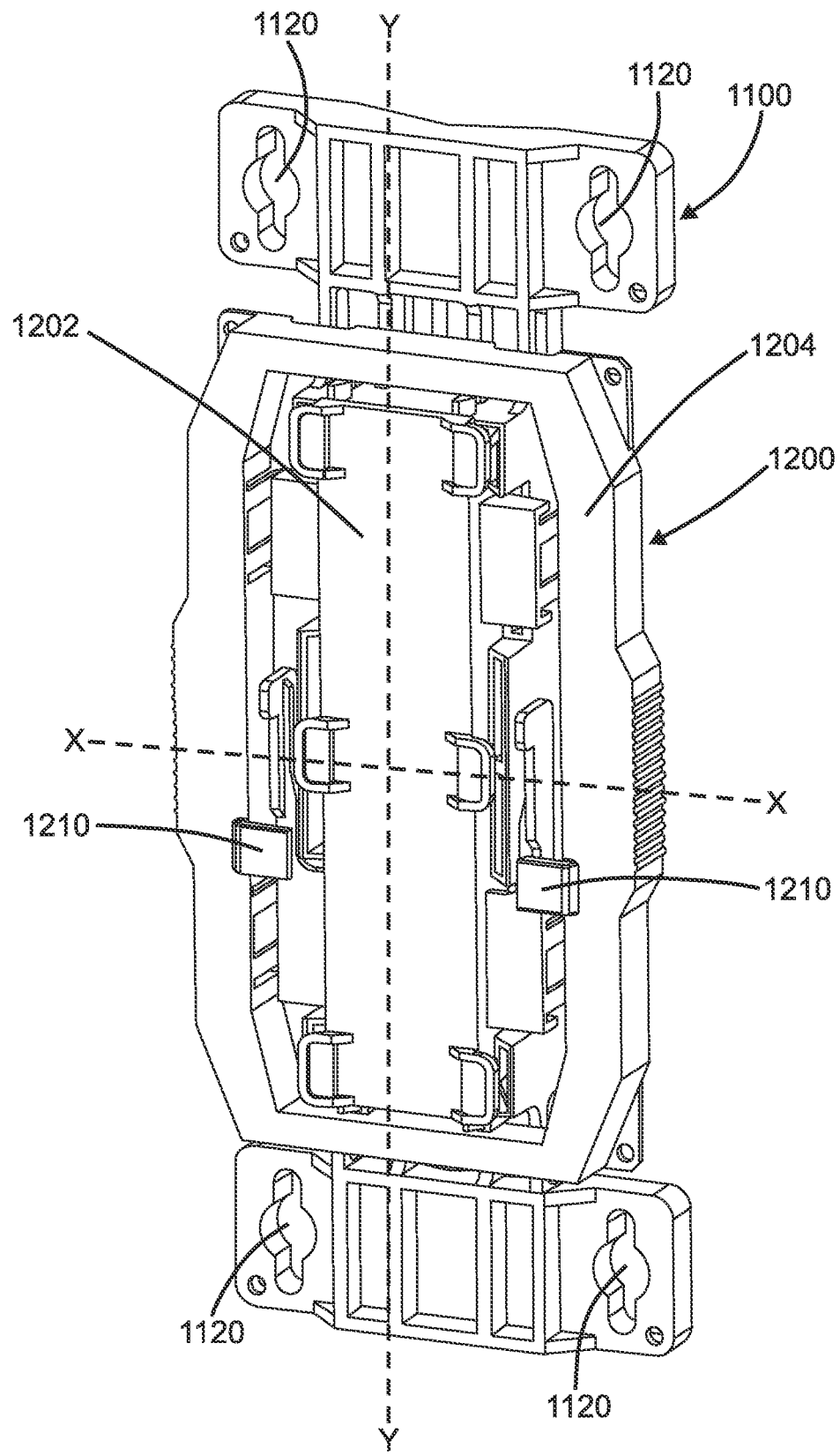
FIGS. 37 and 38 are front isometric and front views of a latch actuator latched onto a terminal mounting bracket of the telecommunications enclosure system of FIG. 34.

FIG. 36 is a front exploded isometric view of the telecommunications enclosure system 40. FIG. 37 is a front isometric view of the latch actuator 1200 latched onto the terminal mounting bracket 1100. A central portion 1202 of the latch actuator 1200 couples to the optical terminal 1000 using first and second mechanical interfaces similar to the ones of the third embodiment shown and described above with reference to FIGS. 25-33. While the latch actuator 1200 is shown in the FIGS. as a component that is separate from the optical terminal 1000, it is contemplated that the latch actuator 1200 could be integral with the optical terminal 1000 such that the latch actuator 1200 is a part of the optical terminal 1000.

The latch actuator 1200 includes a ring portion 1204 that surrounds the central portion 1202. The ring portion 1204 is connected to the central portion 1202 by at least one elastic member 1206 that biases the ring portion 1204 toward a neutral position relative to the central portion 1202. In the example embodiment shown in the FIGS., a plurality of elastic members 1206 are positioned between the central portion 1202 and the ring portion 1204 about a perimeter of the central portion 1202. The ring portion 1204 is moveable from the neutral position relative to the central portion 1202 in opposite first and second directions along a second axis X that is transverse to the first axis Z.

In some examples, the elastic members 1206 are plastic arms each arranged in a U-shape between the central portion 1202 and the ring portion 1204. In some further examples, the ring portion 1204 includes reinforcing tabs 1210 that prevent movement of the ring portion 1204 relative to the central portion 1202 in along the first axis Z. For example, the reinforcing tabs 1210 overlap the central portion 1202 when the ring portion 1204 is in the neutral position to provide reinforcement against relative movement between the ring portion 1204 and the central portion 1202 in the first and second directions along the first axis Z.

The terminal mounting bracket 1100 defines a nest feature 1102 that receives the central portion 1202 of the latch actuator 1200. The central portion 1202 and nest feature 1102 are mated together by inserting the central portion 1202 and nest feature 1102 together in the first direction (e.g., an insertion direction) along the first axis Z. When mated together, the central portion 1202 and nest feature 1102 resist relative movement to one another in a plane perpendicular to the first axis Z. The central portion 1202 and nest feature 1102 are removable from one another in an opposite, second direction (e.g., a removal direction) along the first axis Z. Also, the central portion 1202 and nest feature 1102 have a limited depth of insertion when the central portion 1202 and nest feature 1102 are fully inserted together.

Figure 38:
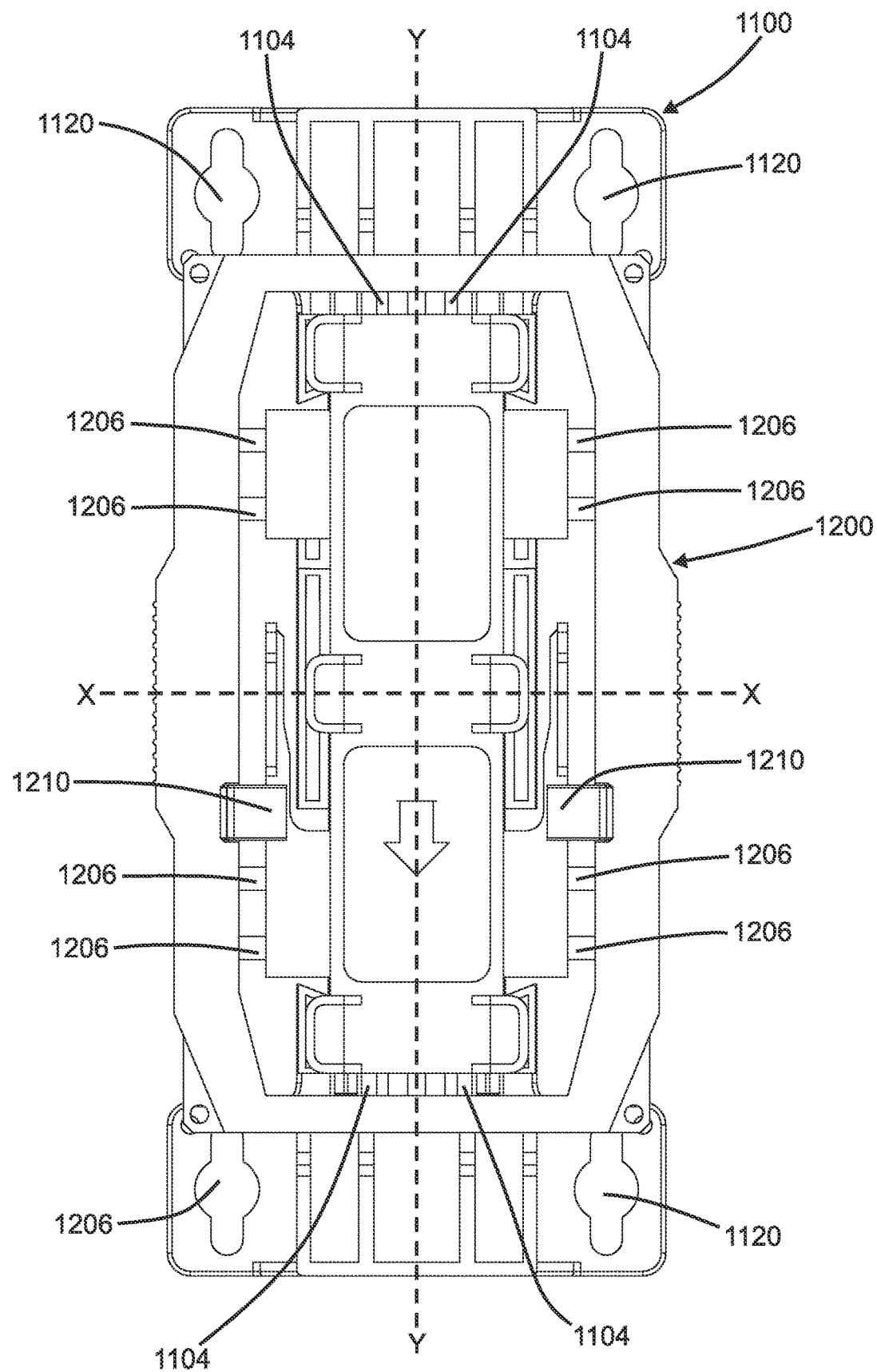
Figure 39:
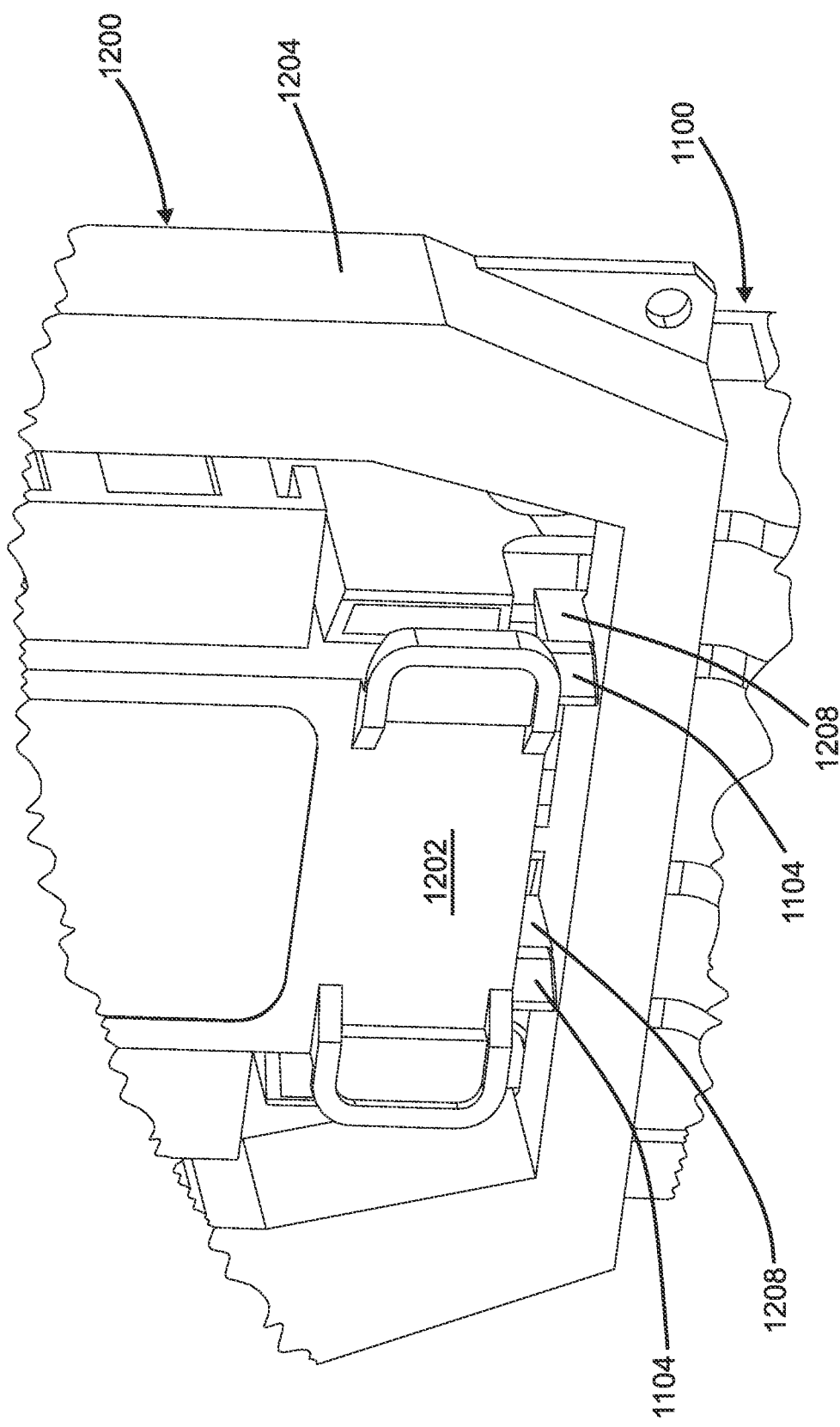
FIG. 39 is a detailed front isometric view of a mechanical coupling arrangement between the latch actuator and terminal mounting bracket of FIGS. 37 and 38.

FIG. 38 is a front view of the latch actuator 1200 latched onto the terminal mounting bracket 1100. FIG. 39 is a detailed front isometric view of a mechanical coupling arrangement between the latch actuator 1200 and terminal mounting bracket 1100. Referring now to FIGS. 36-39, the ring portion 1204 includes retention latches 1208 that engage retention catches 1104 on the terminal mounting bracket 1100. The retention latches 1208 oppose the retention catches 1104 when the ring portion 1204 is in the neutral position and the central portion 1202 and nest feature 1102 are fully inserted together. Interference between the retention latches 1208 and retention catches 1104 prevents the central portion 1202 and nest feature 1102 from being detached from one another in the removal direction.

The central portion 1202 and nest feature 1102 are detachable from one another in the removal direction by moving the ring portion 1204 in the first direction in the second axis X from the neutral position to a first disengaged position such that the retention latches 1208 are offset from the retention catches 1104. Also, the central portion 1202 and nest feature 1102 are detachable from one another in the removal direction by moving the ring portion 1204 in the second direction in the second axis X from the neutral position to a second disengaged positon in which the retention latches 1208 are offset from the retention catches 1104.

The central portion 1202 and nest feature 1102 are inserted together in the first direction along the first axis Z such that a cam arrangement between the retention latches 1208 and retention catches 1104 forces the ring portion 1204 to the first or second disengaged position to allow the retention latches 1208 to move past the retention catches 1104. For example, the retention catches 1104 can include angled surfaces that enable the retention latches 1208 to slide past the retention catches 1104 when the central portion 1202 and nest feature 1102 are inserted together in the first direction along the first axis Z. Once the retention latches 1208 move past the retention catches 1104, the elastic members 1206 automatically return the ring portion 1204 to the neutral position in which the retention latches 1208 oppose the retention catches 1104.

Advantageously, the latch actuator 1200 can be unlatched from the terminal mounting bracket 1100 at the first or second sides 1012, 1014 of the optical terminal 1000 while the optical terminal 1000 is mounted onto the latch actuator 1200. Additionally, the latch actuator 1200 enables the optical terminal 1000 to be removed from the terminal mounting bracket 1100 in the removal direction along the first axis Z without pivoting the optical terminal 1000 relative to the terminal mounting bracket 1100.

Figure 40:
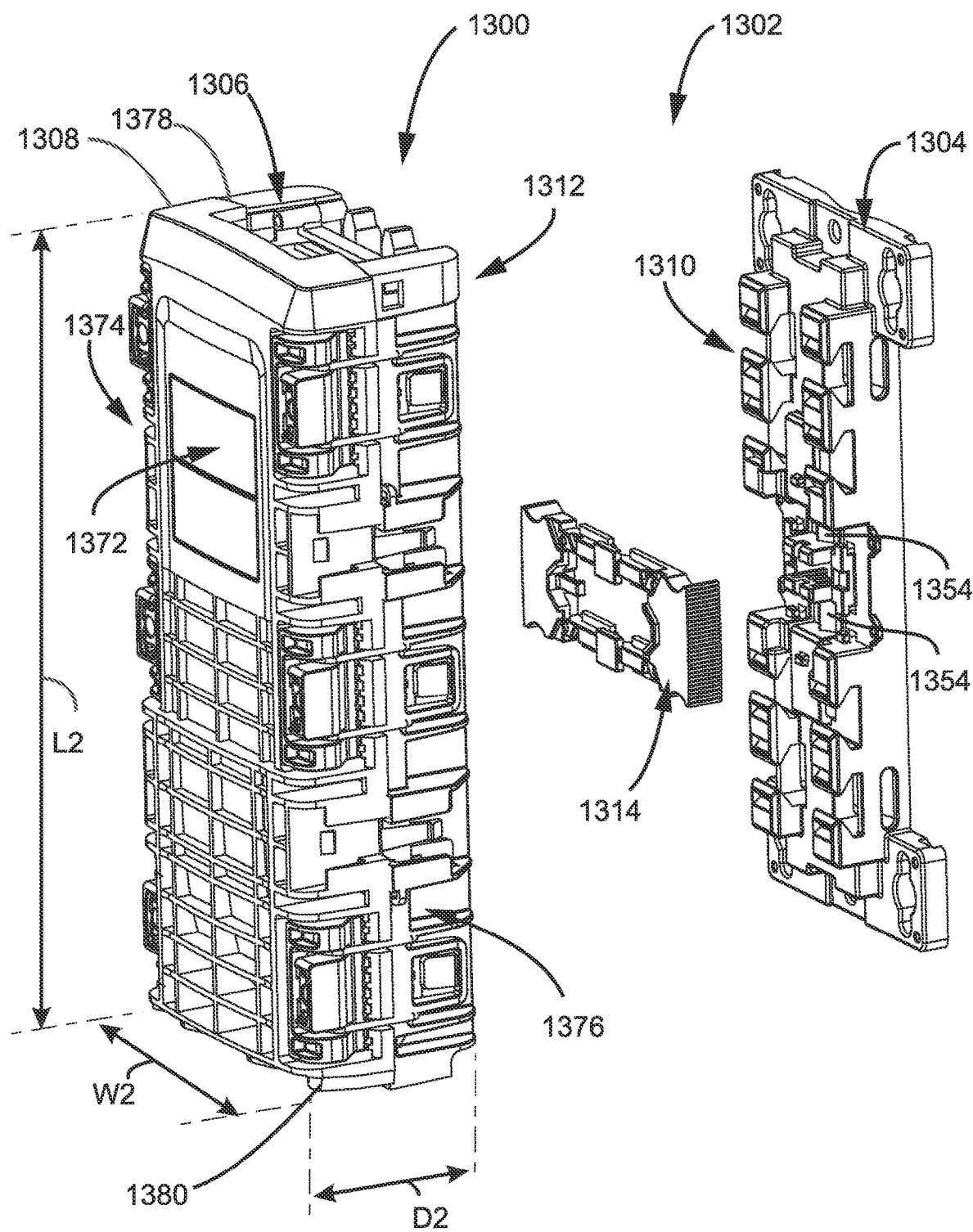
FIG. 40 depicts another telecommunications enclosure system in accordance with the principles of the present disclosure, the telecommunications enclosure system includes an optical terminal shown disconnected from a corresponding terminal mounting bracket.
Figure 41:
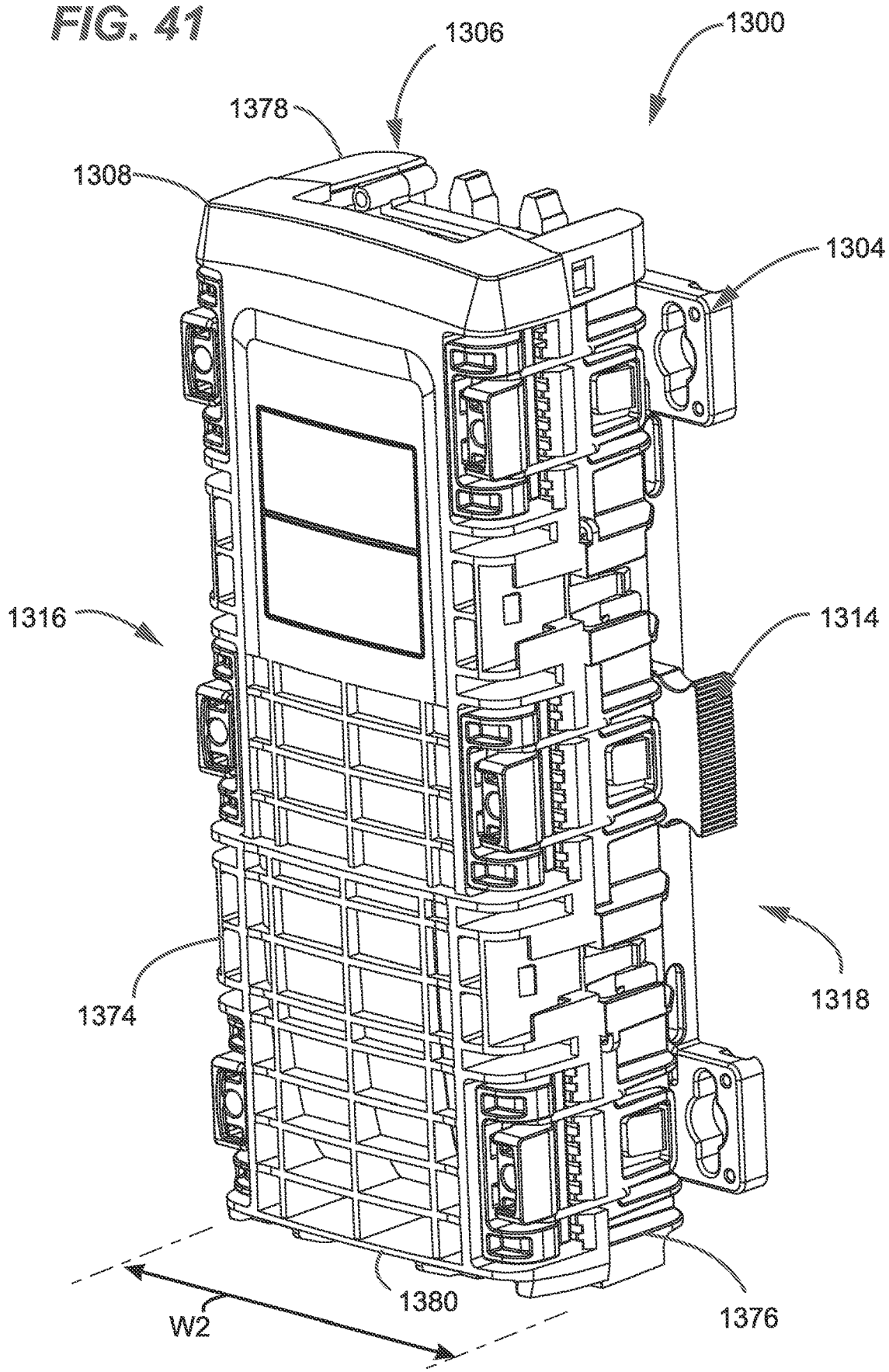
FIG. 41 is a front perspective view showing the telecommunications enclosure system of FIG. 40 with the optical terminal coupled to the terminal mounting bracket.
Figure 42:
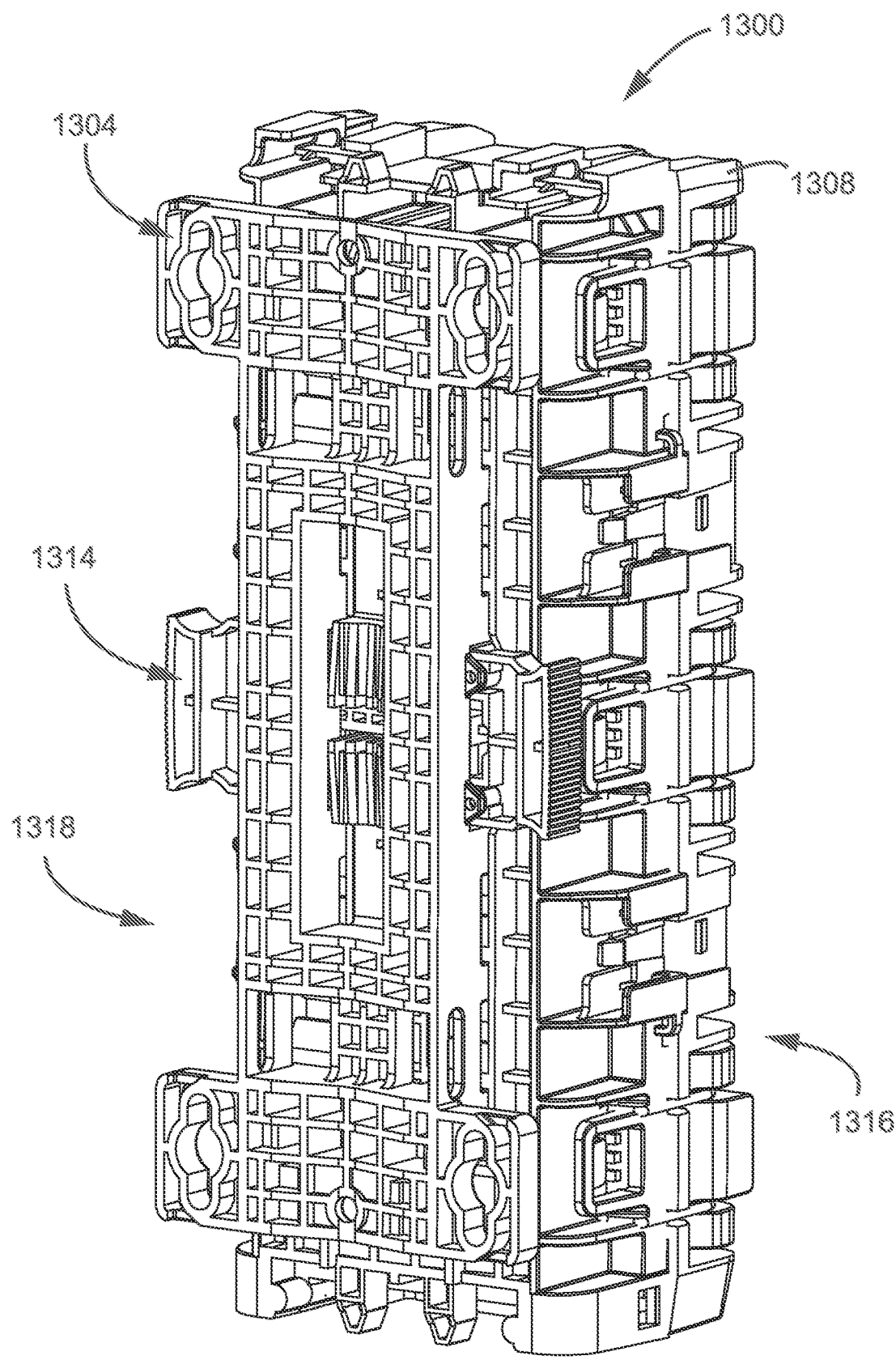
FIG. 42 is a rear perspective view of a telecommunications enclosure system of FIG. 40 with the optical terminal coupled to the terminal mounting bracket.

FIGS. 40-42 depict another telecommunications enclosure system 1300 in accordance with the principles of the present disclosure. The telecommunications enclosure system 1300 includes a terminal assembly 1302 having a terminal mounting bracket 1304 and an optical terminal 1306. The terminal mounting bracket 1304 is configured to be pre-mounted to a structure such as a wall, pole, cable or other structure to which terminals are commonly mounted in the field to build out a fiber optic network. In certain examples, the terminal mounting bracket 1304 can include openings for receiving fasteners (e.g., screws, bolts, straps, clamps, ties, etc.) used to secure the terminal mounting bracket 1304 to a structure in the field. In certain examples, the terminal mounting bracket 1304 can include tabs through which fastener openings are defined. The optical terminal 1306 includes a terminal housing 1308 configured to attach to the terminal mounting bracket 1304 once the terminal mounting bracket 1304 has been mounted to a corresponding structure in the field. Thus, the terminal mounting bracket 1304 can be used as an intermediate attachment structure for securing the terminal housing 1308 to a structure in the field.

In a preferred example, a mechanical coupling interface for securing the terminal housing 1308 to the terminal mounting bracket 1304 is defined between a mechanical coupling arrangement at a front side 1310 of the terminal mounting bracket 1304 and a mechanical coupling arrangement at rear side 1312 of the terminal housing 1308. The mechanical coupling interface is configurable in a retention state in which the terminal housing 1308 is locked in place with respect to the terminal mounting bracket 1304 and a release state in which the terminal housing 1308 is removable from the terminal mounting bracket 1304. The terminal assembly 1302 includes a release actuator 1314 for actuating the mechanical coupling interface from the retention state to the release state. Preferably, the release actuator 1314 is accessible from first and second opposite sides 1316, 1318 of the terminal assembly 1302. The mechanical coupling interface can be actuated from the retaining state to the release state by accessing the release actuator 1314 from the first side 1316 without requiring the release actuator 1314 to be accessed from the second side 1318. Similarly, the mechanical coupling interface can be actuated from the retaining state to the release by accessing the release actuator 1314 from the second side 1318 without requiring the release actuator 1314 to be accessed from the first side 1316.

Figure 43:
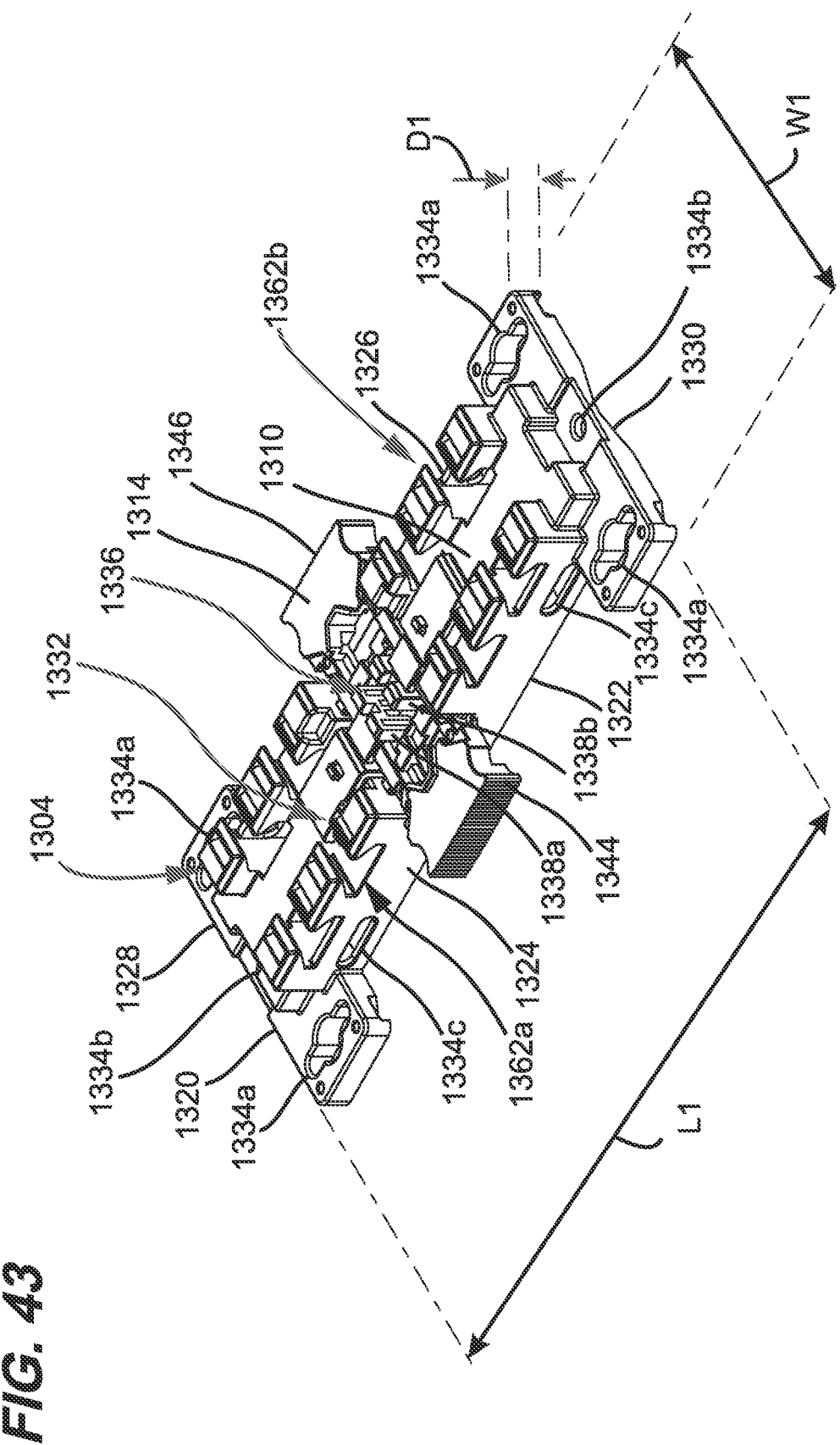
FIG. 43 is a front, perspective view of the terminal mounting bracket of the telecommunications enclosure system of FIG. 40 with a release actuator shown in a centered position.

Referring to FIGS. 43-46, the terminal mounting bracket 1304 includes a main body 1320 having a length L1, a width W1 and a depth D1. The depth D1 extends between the front 1310 and a back 1322 of the main body 1320. The width W1 extends between opposite first and second sides 1324, 1326 of the main body 1320. The length L1 extends between opposite first and second ends 1328, 1330 of the main body 1320. The length L1, the width W1 and the depth D1 are oriented perpendicular with respect to one another. As shown at FIG. 43, the front 1310 of the terminal mounting bracket 1304 includes a linear guide 1332 for guiding linear sliding movement of the terminal housing 1308 relative to the terminal mounting bracket 1304. It will be appreciated that the linear guide 1332 can include a linear channel, a linear rail or combinations thereof. The linear guide 1332 guides linear movement of the terminal housing 1308 along the length L1 of the main body 1320 of the terminal mounting bracket 1304 between an interlocked state and a non-interlocked (e.g., staged) state. In the depicted example, the linear guide 1332 is centrally located on the terminal mounting bracket 1304 and is positioned along a central longitudinal axis of the terminal mounting bracket 1304.

Referring still to FIG. 43, the terminal mounting bracket 1304 includes a plurality of fastener openings for allowing the terminal mounting bracket 1304 to be secured to a structure in the field. For example, fastener openings 1334a are located at corner tabs of the main body 1320 and are adapted for receiving fasteners such as screws, nails, wires, ties or the like. Fastener openings 1334b are aligned the central longitudinal axis of the main body 1320 and are also adapted for receiving fasteners such as screws, nails, wires, ties or the like. Fastener openings 1334c are defined through side walls of the main body 1320 and are adapted for receiving straps, ties or the like for attaching the terminal mounting bracket 1304 to a pole or cable.

Figure 50:
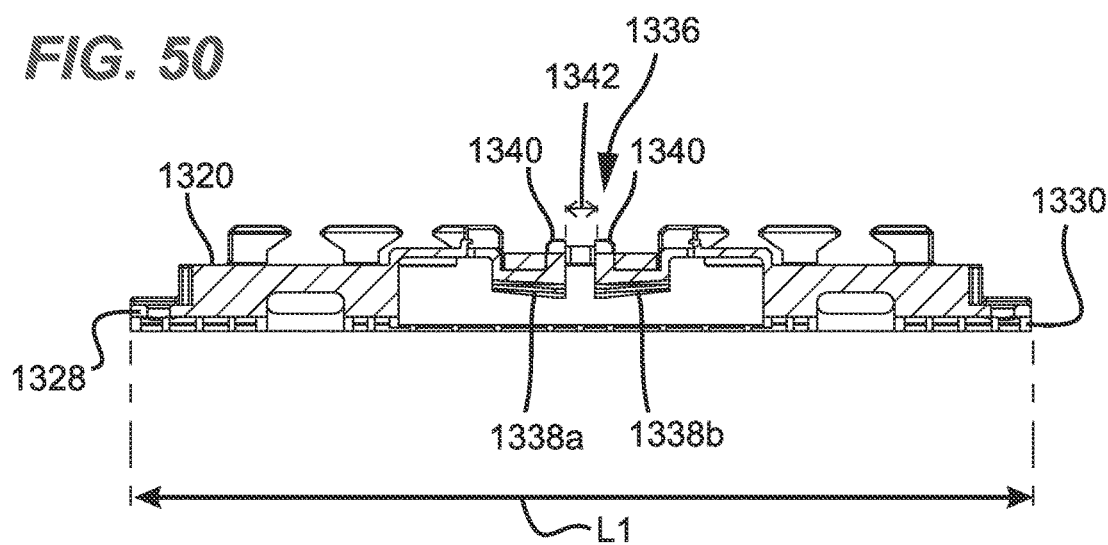
FIG. 50 is a cross sectional view taken along section line 50-50 of FIG. 49.
Figure 54:
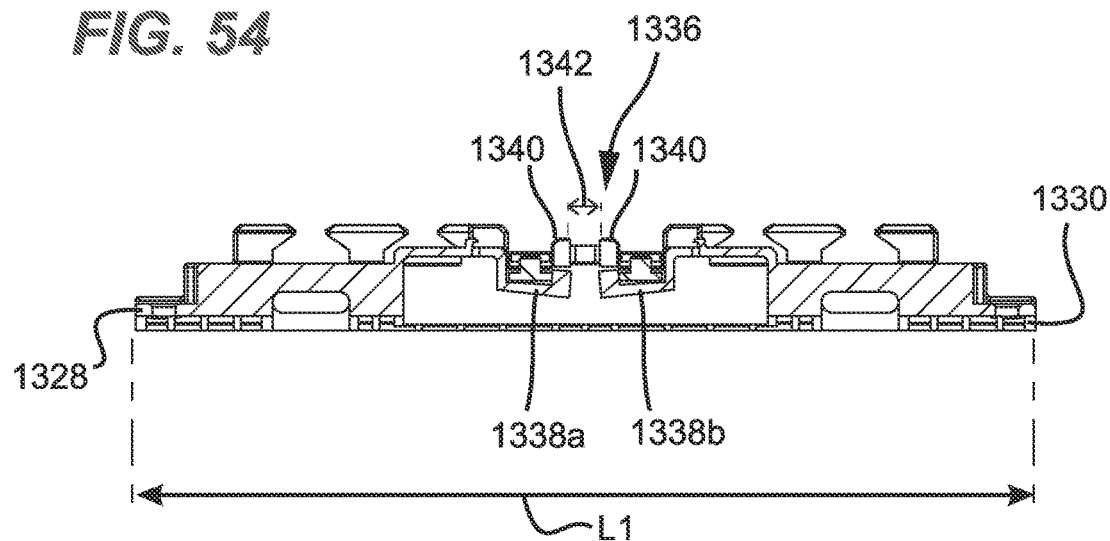
FIG. 54 is a cross sectional view taken along section 54-54 of FIG. 52 or FIG. 53.
Figure 55:
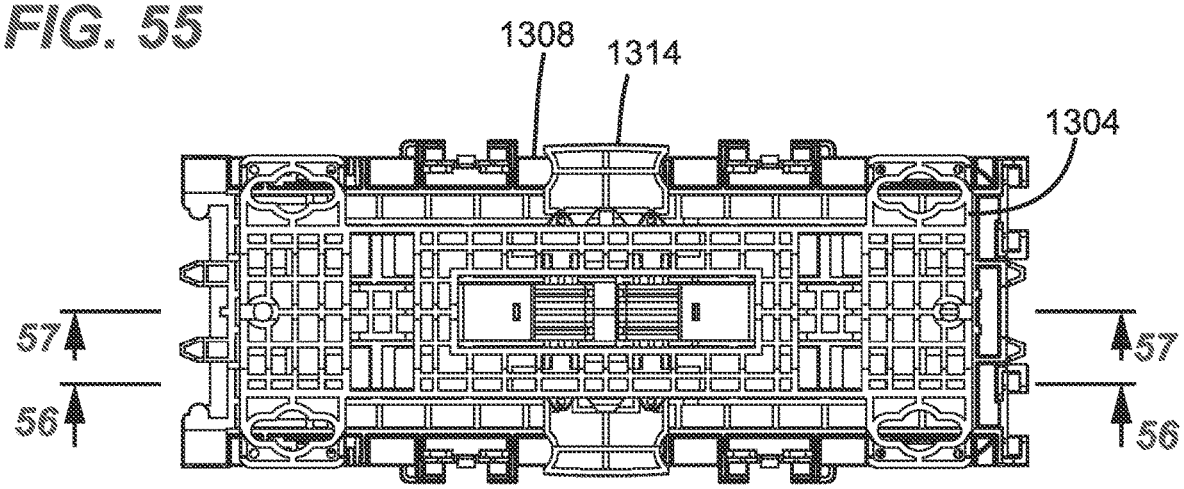
FIG. 55 is a rear view of the telecommunications enclosure system of FIGS. 40-42 with the release actuator of the terminal mounting bracket in a centered positon and the terminal in a staged position in a first mounting orientation relative to the terminal mounting bracket.

Still referring to FIG. 43, the terminal mounting bracket 1304 also includes a slide lock 1336 for locking sliding movement of the terminal housing 1308 relative to the terminal mounting bracket 1304. The slide lock 1336 includes first and second retaining elements 1338a, 1338b centrally located on the terminal mounting bracket 1304. The first and second retaining elements 1338a, 1338b includes stop portions 1340 (see FIG. 50) separated by a stop gap 1342 that extends between the stop portions 1340 along an orientation that extends along the length L1 of the terminal mounting bracket 1304. The first and second retaining elements 1338a, 1338b are flexibly movable relative to the main body 1320 of the terminal mounting bracket 1304 between a forward position (see FIG. 50) and a rearward position (see FIG. 54). The first and second retaining elements 1338a, 1338b are elastically biased toward the forward position via the inherent internal resiliency or elasticity of the retaining elements 1338a, 1338b. It will be appreciated that the retaining elements 1338a, 1338b are adapted for locking sliding movement of the terminal housing 1308 relative to the terminal mounting bracket 1304 when in the forward position of FIG. 50, and are adapted to allow sliding movement of the terminal housing 1308 relative to the terminal mounting bracket 1304 when in the rearward position of FIG. 54. It will be appreciated that, for the depicted example, the release state of mechanical coupling interface between the terminal housing 1308 and the terminal mounting bracket 1304 corresponds with the retaining elements 1338a, 1338b being positioned in the rearward position of FIG. 54.

Figure 49:
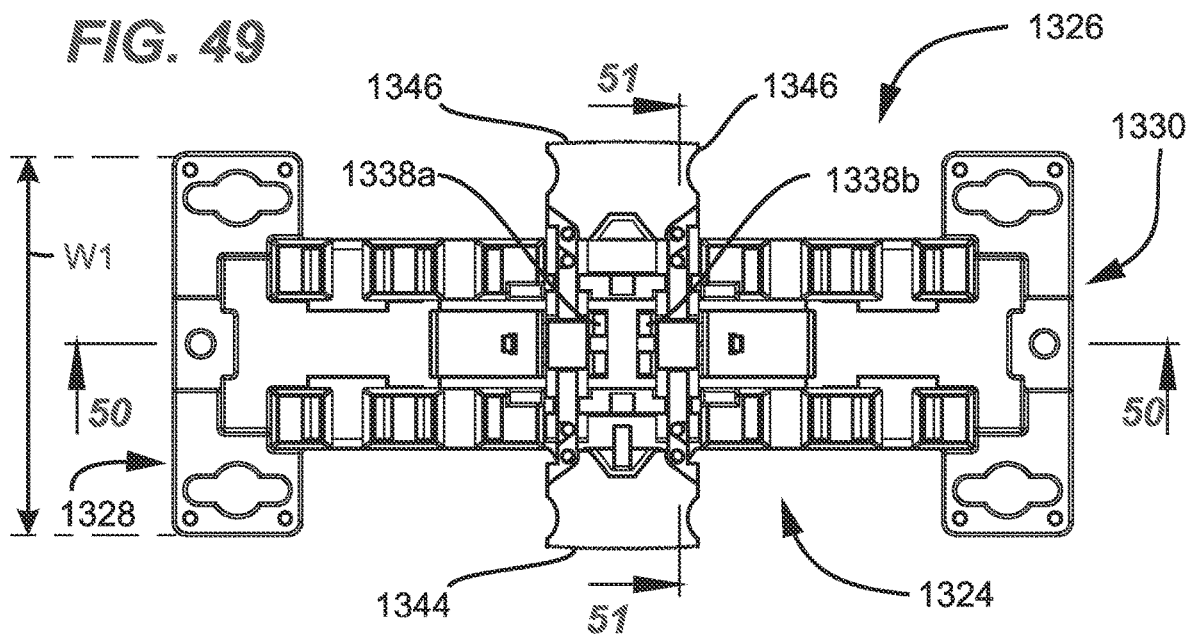
FIG. 49 is a front view of the terminal mounting bracket of FIG. 43, the terminal mounting bracket is shown including the release actuator oriented in the centered position.

Referring to FIGS. 43, 44, 69 and 70, the release actuator 1314 is depicted as a release bar adapted to be mounted across the width W1 of the terminal mounting bracket 1304. The release actuator 1314 includes a first end 1344 at the first side 1324 of the terminal mounting bracket 1304 and a second end 1346 at the second side 1326 of the terminal mounting bracket 1304. The release actuator 1314 is adapted to slide relative to the main body 1320 of the terminal mounting bracket 1304 along an orientation that extends across the width W1 of the terminal mounting bracket 1304. The release actuator 1314 is adapted to be positioned in a non-actuating position (e.g., a neutral position) in which the release actuator 1314 allows the retaining elements 1338a, 1338b to be positioned in the forward position. FIG. 49 shows the release actuator 1314 in the non-actuating position which in the depicted example corresponds with a centered position in which the release actuator 1314 is centered relative to the width W1 of the terminal mounting bracket 1304. It will be appreciated that the retaining elements 1338a, 1338b can be moved from the forward position of FIG. 50 to the rearward position of FIG. 54 by sliding the release actuator 1314 along the width W1 of the terminal mounting bracket 1304 from the centered, non-actuating position toward the first side 1324 of the terminal mounting bracket 1304. The first and second retaining elements 1338a, 1338b can also be moved from the forward position of FIG. 50 to the rearward position of FIG. 54 by sliding the release actuator 1314 across the width W1 from the centered, non-actuating position of FIG. 49 toward the second side 1326 of the terminal mounting bracket 1304. FIG. 52 shows the release actuator 1314 in a first actuating position in which the release actuator 1314 has been slid from the centered position of FIG. 49 toward the first side 1324 of the terminal mounting bracket 1304. FIG. 53 shows the release actuator 1314 in a second actuating position in which the release actuator 1314 has been slid from the centered position of FIG. 49 toward the second side 1326 of the terminal mounting bracket 1304.

In certain examples, a cam arrangement can be provided between the release actuator 1314 and each of the retaining elements 1338a, 1338b for causing movement of the retaining elements 1338a, 1338b from the forward position to the rearward position when the release actuator 1314 is slid from the centered position of FIG. 49 toward either the first actuating position of FIG. 52 or the second actuating position of FIG. 53. Thus, the retaining elements 1338a, 1338b can be moved from the forward position to the rearward position by pressing on the first end 1344 of the release actuator 1314 from the first side 1324 of the terminal mounting bracket 1304, or by pressing on the second end 1346 of the release actuator 1314 from the second side 1326 of the terminal mounting bracket 1304.

Figure 51:
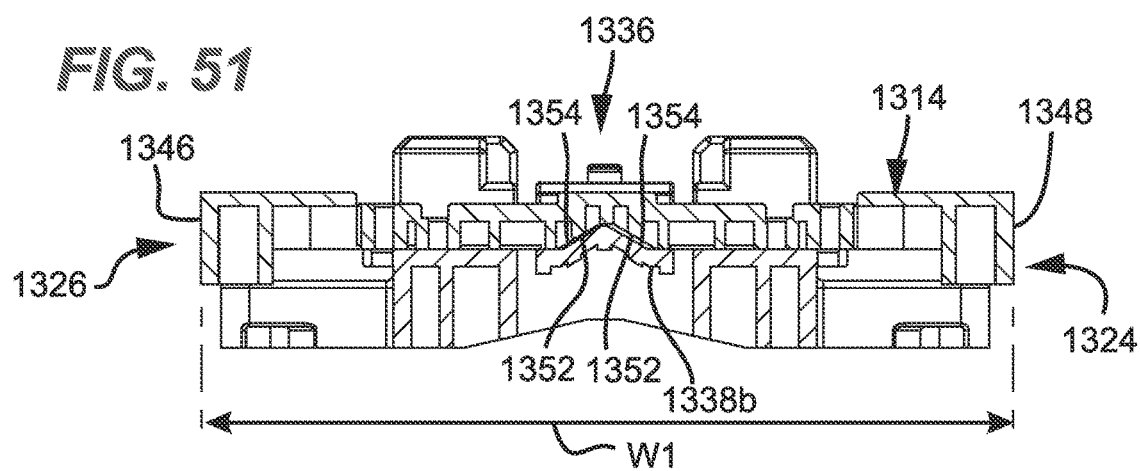
FIG. 51 is a cross sectional view taken along section line 51-51 of FIG. 49.

FIG. 51 depicts an example cam arrangement 1350 between the release actuator 1314 and the retaining element 1338b. It will be appreciated that a similar cam arrangement is provided between the retaining element 1338a and the release actuator 1314. The cam arrangement(s) 1350 are configured for allowing force from the release actuator 1314 to be transferred to the retaining elements 1338a, 1338b as the release actuator 1314 is pushed from the centered position toward either the first or second side 1324, 1326 to cause movement of the retaining elements 1338, 1338b from the forward position of FIG. 50 to the rearward position of FIG. 54. The cam arrangement 1350 includes ramped surfaces 1352 (see FIGS. 51 and 70) provided on the release actuator 1314 that engage corresponding contact surfaces 1354 (see FIGS. 40 and 51) of the retaining elements 1338a, 1338b when the release actuator 1314 is slid across the width W1 of the terminal mounting bracket 1304 from the centered position toward one of the first or second sides 1324, 1326 of the terminal mounting bracket 1304. In certain examples, a detent arrangement can be provided between the release actuator 1314 and the main body 1324 of the terminal mounting bracket 1304 for temporarily retaining the release actuator 1314 in the first actuating position of FIG. 52 and in the second actuating position of FIG. 53.

Figure 62:
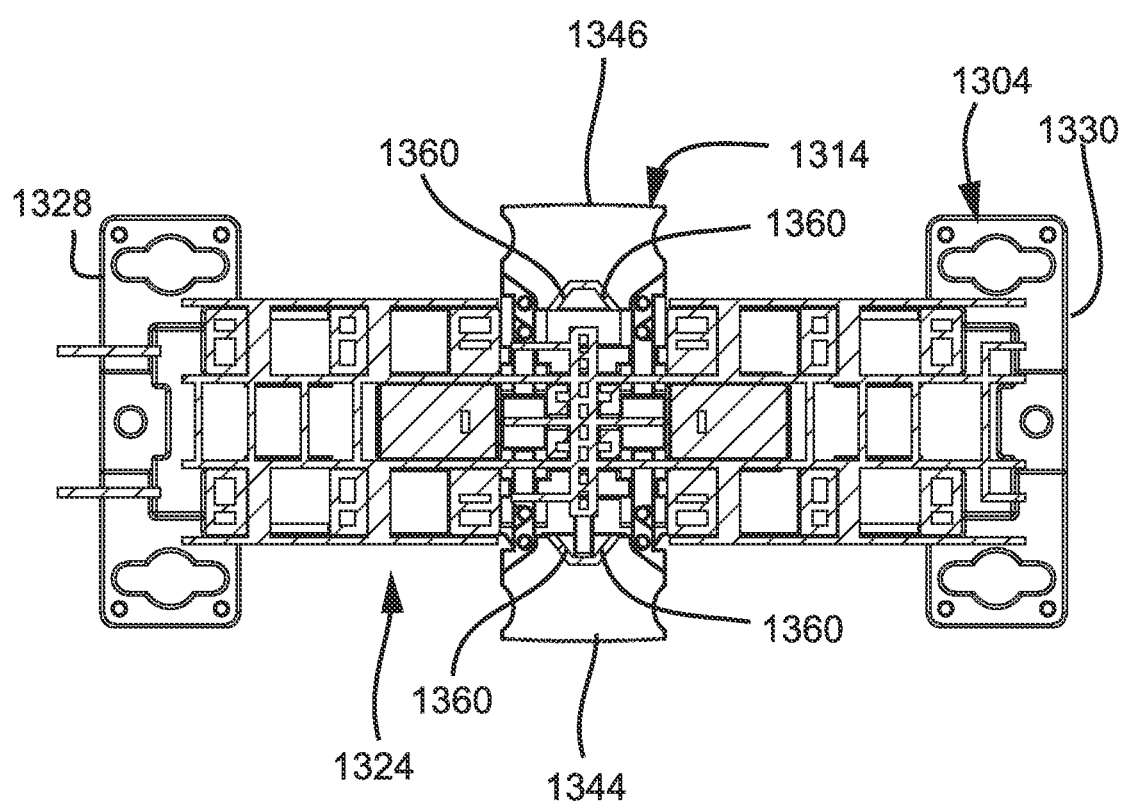
FIG. 62 is a cross sectional view taken along section line 62-62 of FIG. 61.

A secondary cam arrangement can be defined between the release actuator 1314 and the terminal housing 1308 for causing the release actuator 1314 to be forced from the first or second actuated position (FIG. 52 or 53) toward the centered position (FIG. 49) when the terminal housing 1308 is slid along the length L1 of the terminal mounting bracket 1304 from an interlocked position to a non-interlocked position. The secondary cam arrangement can include contact surfaces on the terminal housing 1308 that engage ramp surfaces 1360 (see FIG. 62) on the actuator 1314 when the terminal housing 1308 is slid longitudinally from an interlocked position toward a non-interlocked position to force the actuator 1314 from one of the actuated positions toward the centered position. It will be appreciated that the secondary cam arrangement can provide sufficient force to overcome the detent that temporarily holds the release actuator 1314 in either of the first or second actuated positions.

Figure 67:
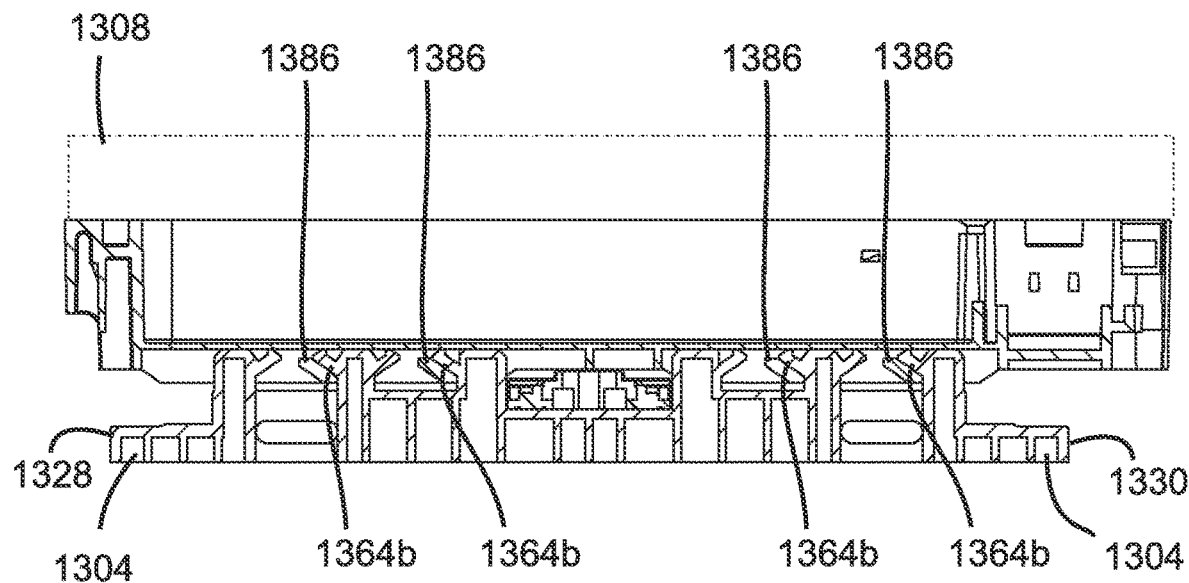
FIG. 67 is a cross sectional view through the hooking arrangement of the system of FIG. 40 showing the terminal housing slid from the intermediate position of FIG. 65 to an interlocked position while in the second mounting orientation.
Figure 68:
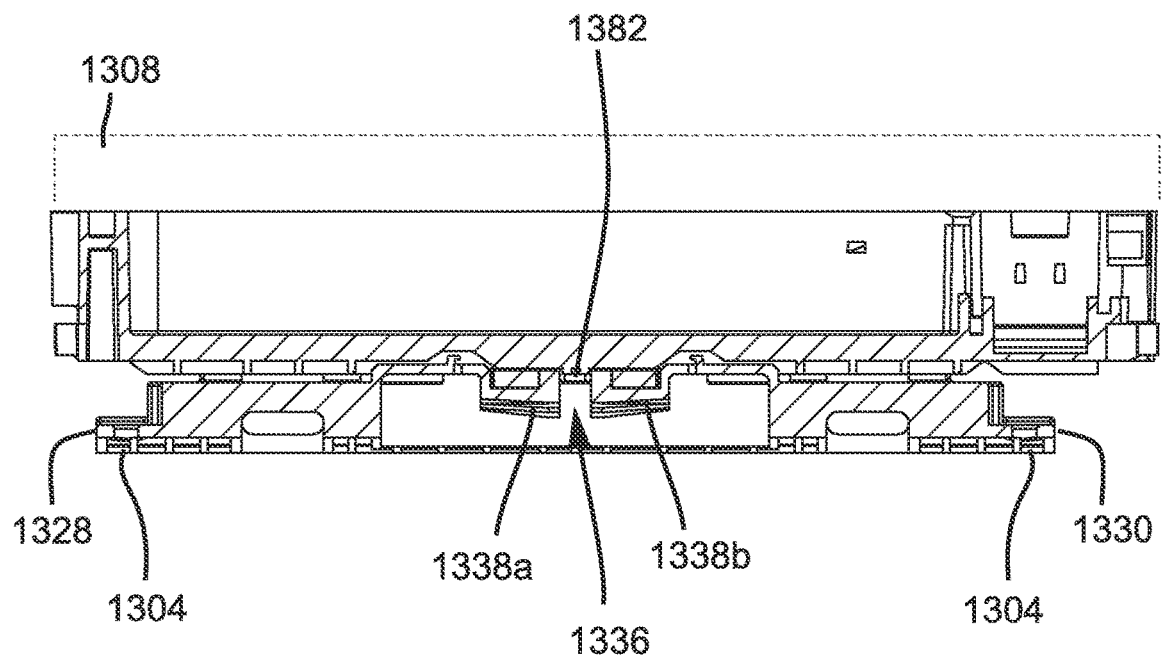
FIG. 68 is a cross sectional view through the slide lock arrangement of the system of FIG. 40 showing the slide lock of the terminal mounting bracket retaining the terminal in the interlocked position while the terminal is in the second mounting orientation.
Figure 69:
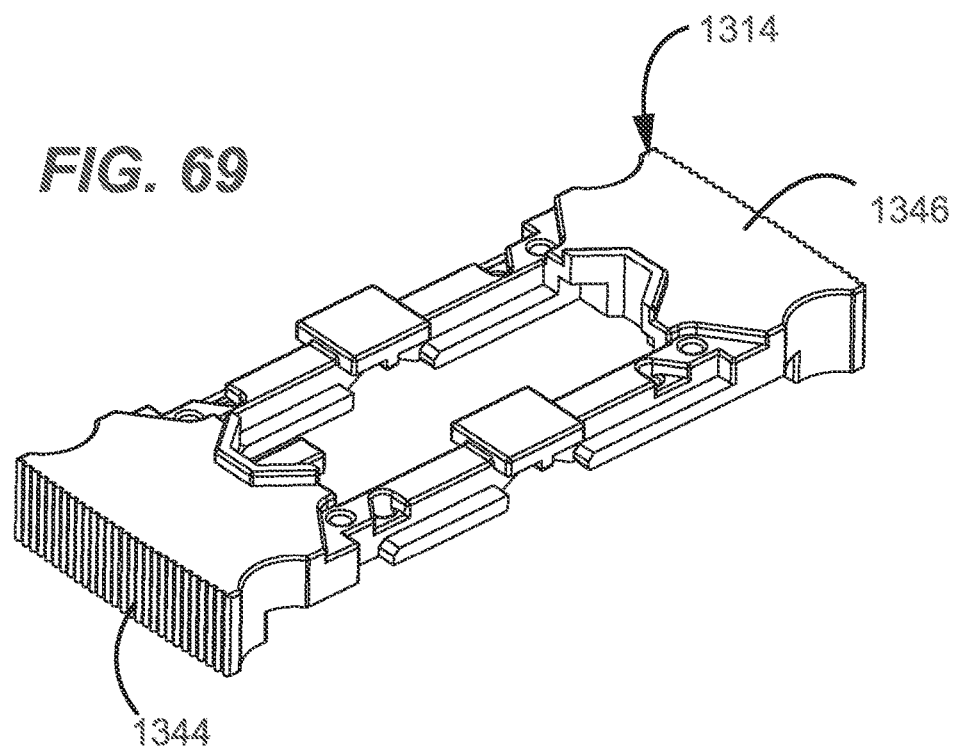
FIG. 69 is a front, perspective view of the release actuator of the terminal mounting bracket of FIG. 43.

For the depicted system 1300, the terminal housing 1308 can be secured to (e.g., interlocked with respect to) the terminal mounting bracket 1304 in a first mounting orientation (see FIGS. 60 and 61) and can also be secured to (e.g., interlocked with respect to) the terminal mounting bracket 1304 in a second mounting orientation (see FIGS. 67 and 68). The terminal housing 1308 is rotated 180 degrees relative to the terminal mounting bracket 1304 between the first and second mounting orientations. The ability to select between the two mounting orientations can allow an installer to select a direction in which a given port faces when the terminal housing 1308 is installed.

Figure 44:
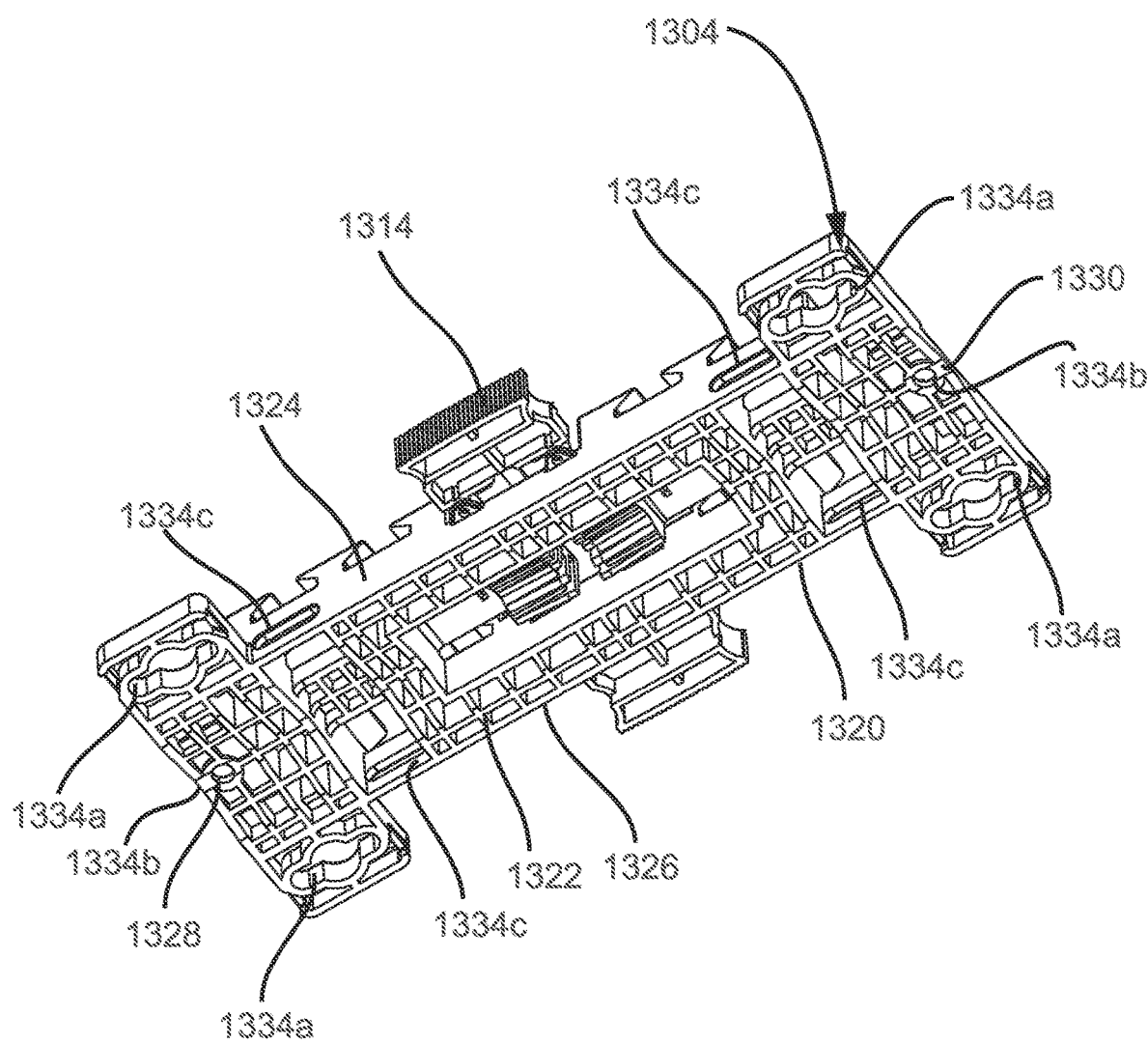
FIG. 44 is a rear respective view of the terminal mounting bracket of FIG. 43.
Figure 45:
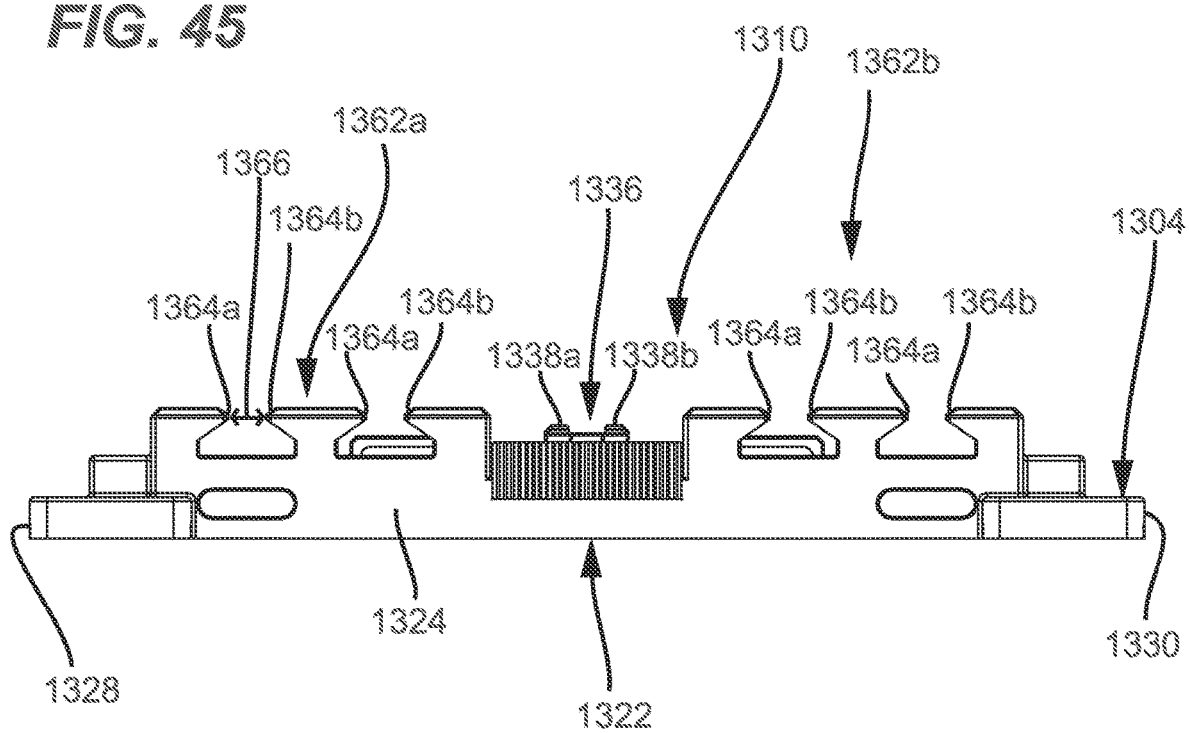
FIG. 45 is a side view of the terminal mounting bracket of FIG. 43.
Figure 46:
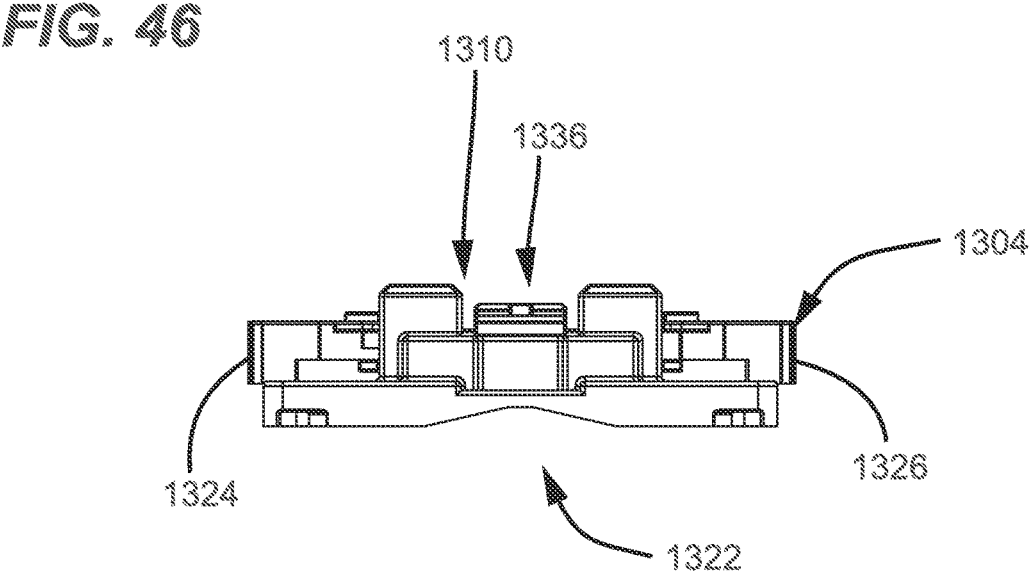
FIG. 46 is an end view of the terminal mounting bracket of FIG. 43.

Referring to FIGS. 43-45, the main body includes at least one hook or hooks for interlocking with a corresponding hook or hooks provided on the terminal housing 1308. In the depicted example, the main body 1320 defines first and second sets of hooks 1362a, 1362b. The first set of hooks 1362a is positioned between the slide lock 1336 and the first end 1328 of the main body 1320. The second set of hooks 1362b is positioned between the slide lock 1336 and the second end 1330 of the main body 1320. The first set of hooks 1362a and the second set of hooks 1362b each preferably includes at least one pair of hooks including first and second opposing hooks 1364a, 1364b separated by a hook gap 1366. The hook gap 1366 extends between the first and second opposing hooks 1364a, 1364b in an orientation that extends along the length L1 of the terminal mounting bracket 1304. In the depicted example, the first set of hooks 1362a includes four pairs of first and second hooks 1364a, 1364b, and the second set of hooks 1362b includes four pairs of first and second hooks 1364a, 1364b. Each of the first and second sets of hooks 1362a, 1362b includes two pairs of the hooks 1364a, 1364b positioned on one side of the longitudinal center line of the terminal mounting bracket 1304 and another two pairs of the first and second hooks 1364*a*, 1364*b* positioned on the opposite side of the longitudinal center line of the terminal mounting bracket 1304.

Figure 47:
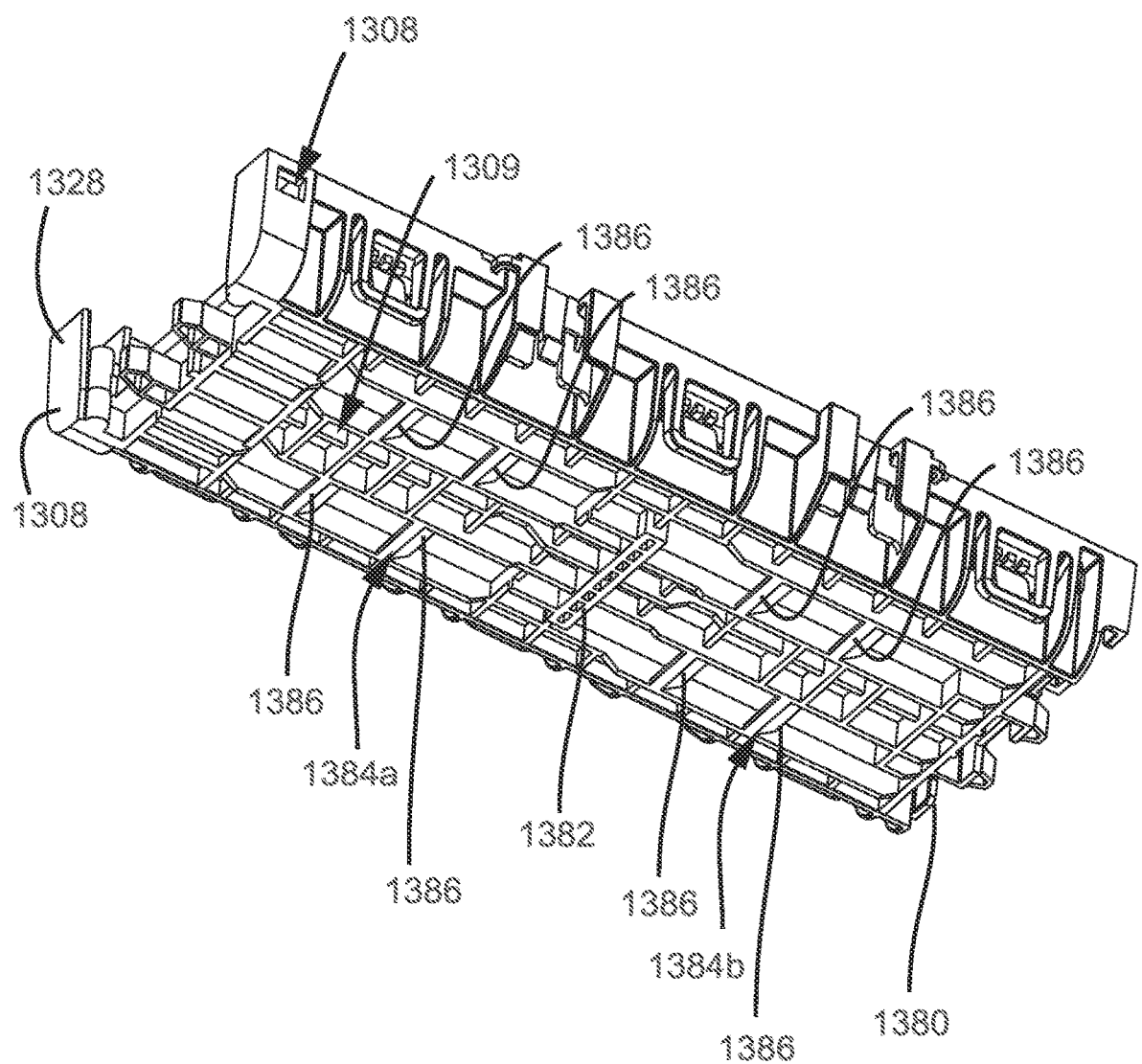
FIG. 47 is a rear perspective view of a base of the optical terminal of the telecommunications enclosure system of FIG. 40 depicting a mechanical coupling arrangement compatible with a mating coupling arrangement provided by the front of the terminal mounting bracket of FIGS. 43-46.
Figure 48:
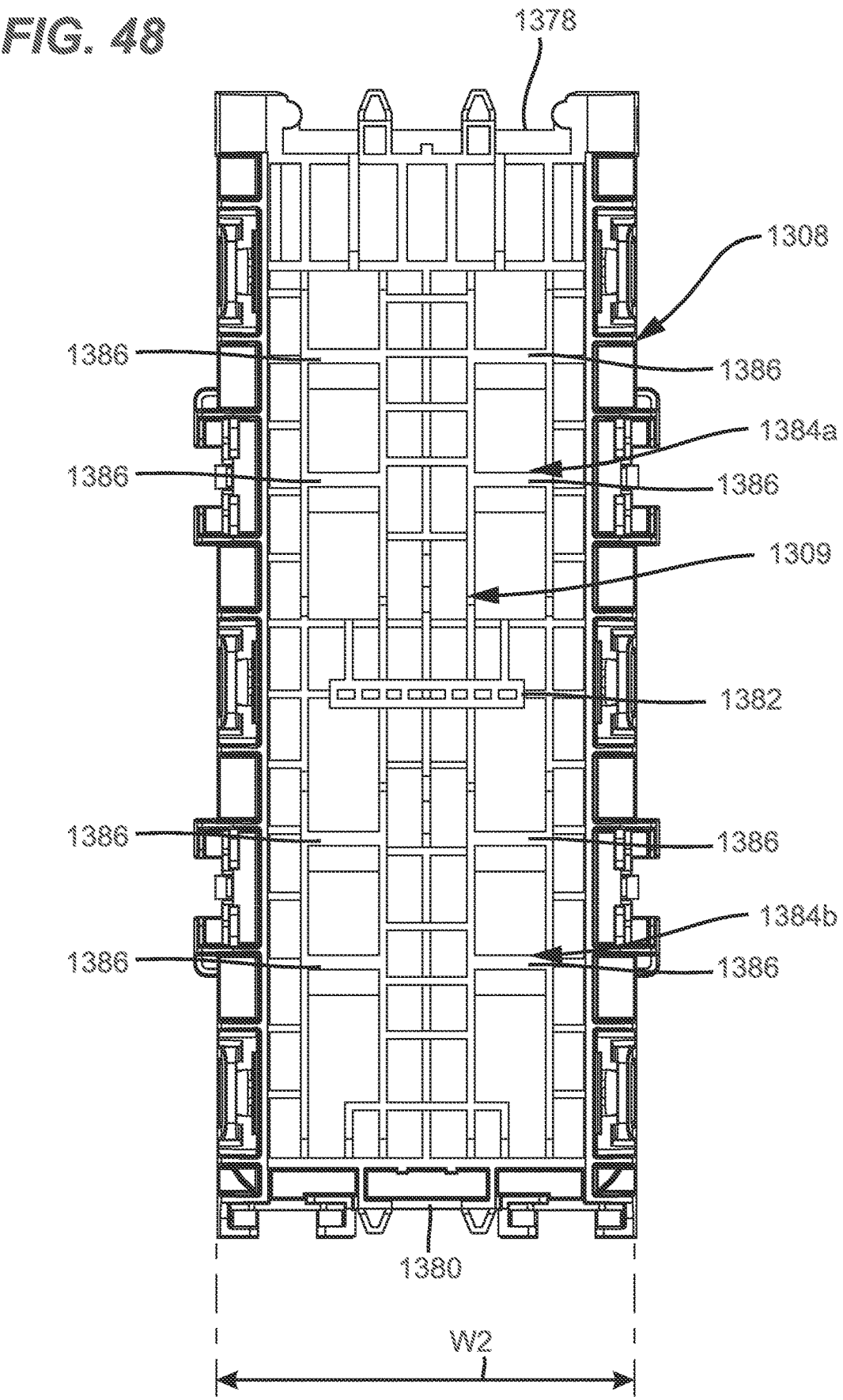
FIG. 48 is a rear view of the base of FIG. 47.

FIGS. 40-42 show the terminal 1306 of the system 1300, and FIGS. 47 and 48 show a base of the optical terminal 1306. The optical terminal 1306 includes the terminal housing 1308 which includes at least one optical port. In certain examples, the optical port or ports can be defined at one or both ends of the terminal housing in the same way disclosed with respect to terminal housings disclosed earlier herein. In other examples, a port or ports can be defined at a front of the terminal housing. As shown at FIG. 40, the terminal housing 1308 includes a depth D2 extending between the rear side 1312 of the terminal housing 1308 and a front side 1372 of the terminal housing 1308. The terminal housing 1308 also includes first and second opposite sides 1374, 1376 separated by a width W2 of the terminal housing 1308 and first and second opposite ends 1378, 1380 separated by a length L2 of the terminal housing 1308. The depth D2, the width W2 and the length L2 are all oriented perpendicular relative to one another. It will be appreciated that the rear side 1312 of the terminal housing 1308 includes a mechanical connection arrangement adapted for connection to a corresponding mechanical connection arrangement provided at the front side 1310 of the terminal mounting bracket 1304. In one example, the mechanical connection arrangement at the front 1310 of the terminal mounting bracket 1304 includes at least the slide lock 1336 and the sets of hooks 1362*a*, 1362*b*. In certain examples, the mechanical connection arrangement provided at the rear 1312 of the terminal housing 1308 includes at least one stop and at least one hook. In the depicted example of FIGS. 47 and 48, the mechanical connection arrangement provided at the rear 1312 of the terminal housing 1308 includes a stop 1382 formed by a centrally located cross-rail that extends across the width W2 of the terminal housing 1308. The mechanical connection arrangement at the rear 1312 of the terminal housing 1308 also includes a hook arrangement including a first set of hooks 1384*a* and a second set of hooks 1384*b*. The first set of hooks 1384*a* is positioned between the central stop 1382 and the first end 1378 of the terminal housing 1308, and the second set of hooks 1384*b* is positioned between the stop 1382 and the second end 1380 of the terminal housing 1308. In the depicted example, each of the sets of hooks 1384*a*, 1384*b* includes four hooks 1386 with two of the hooks positioned on one side of the longitudinal center line of the terminal housing 1308 and the remaining two hooks positioned on the opposite side of the central longitudinal axis of the terminal housing 1308.

It will be appreciated that the first and second sets of hooks 1384*a*, 1384*b* of the terminal housing 1308 are adapted to interlock with the first and second sets of hooks 1362*a*, 1362*b* of the terminal mounting bracket 1304. In one example, the hook arrangements are configured such that the terminal housing 1308 can be mounted in the first and second different mounting orientations relative to the terminal mounting bracket 1304. As previously indicated, the terminal housing 1308 is rotated 180 degrees between the two different mounting orientations. In the first mounting orientation, the first set of hooks 1384*a* of the terminal housing 1308 interlock with the first set of hooks 1362*a* of the terminal mounting bracket 1304 and the second set of hooks 1384*b* of the terminal housing 1308 interlock with the second set of hooks 1362*b* of the terminal mounting bracket 1304. In the second mounting orientation, the first set of hooks 1384*a* of the terminal housing 1308 interlock with the second set of hooks 1362*b* of the terminal mounting bracket 1304 and the second set of hooks 1384*b* of the terminal housing 1308 interlock with the first set of hooks 1362*a* of the terminal mounting bracket 1304.

Figure 56:
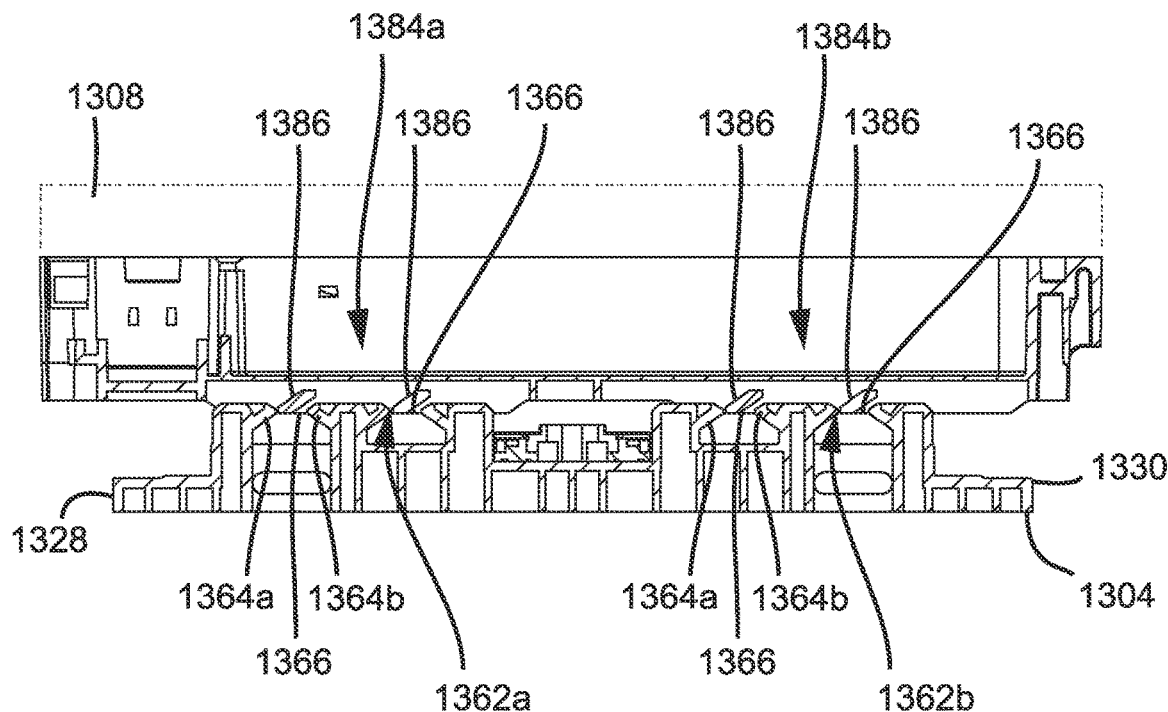
FIG. 56 is a cross sectional view taken along section line 56-56 of FIG. 55 with the optical terminal in the staged positon relative to the terminal mounting bracket.
Figure 57:
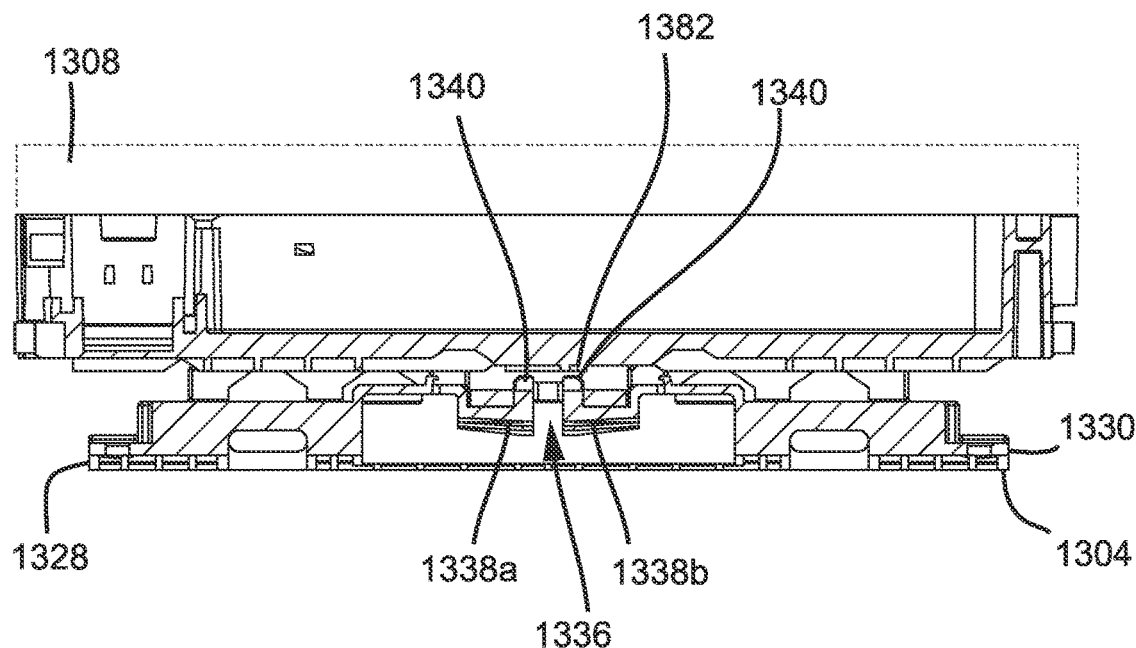
FIG. 57 is a cross sectional view taken along section line 57-57 of FIG. 55 with the optical terminal in the staged position relative to the terminal mounting bracket.
Figure 58:
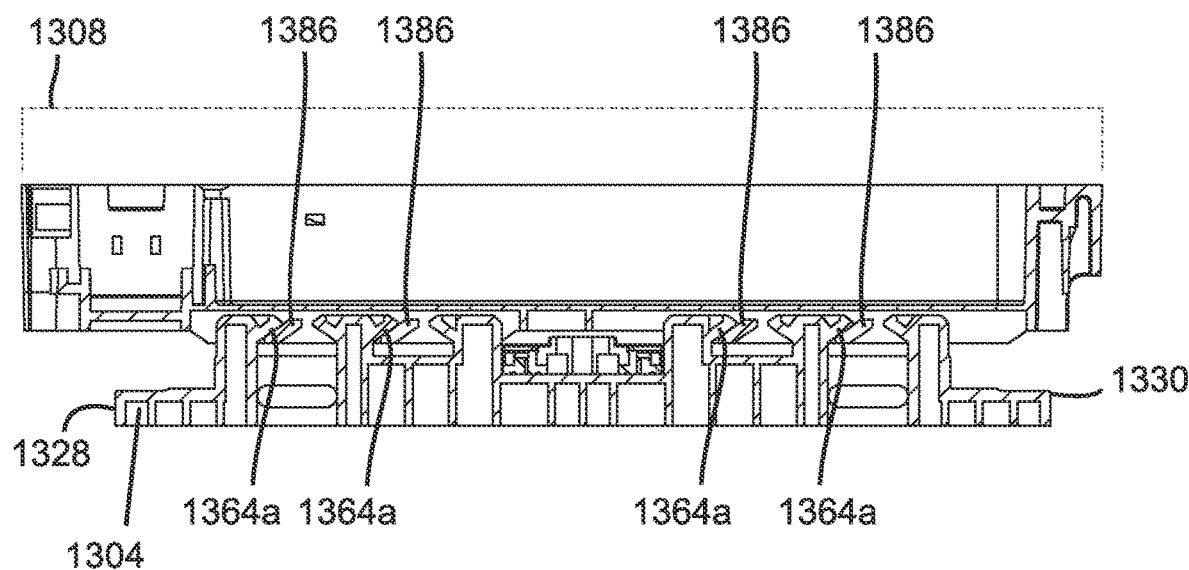
FIG. 58 is a cross sectional view taken along section line 56-56 showing the optical terminal moved from the staged position to an intermediate position.
Figure 59:
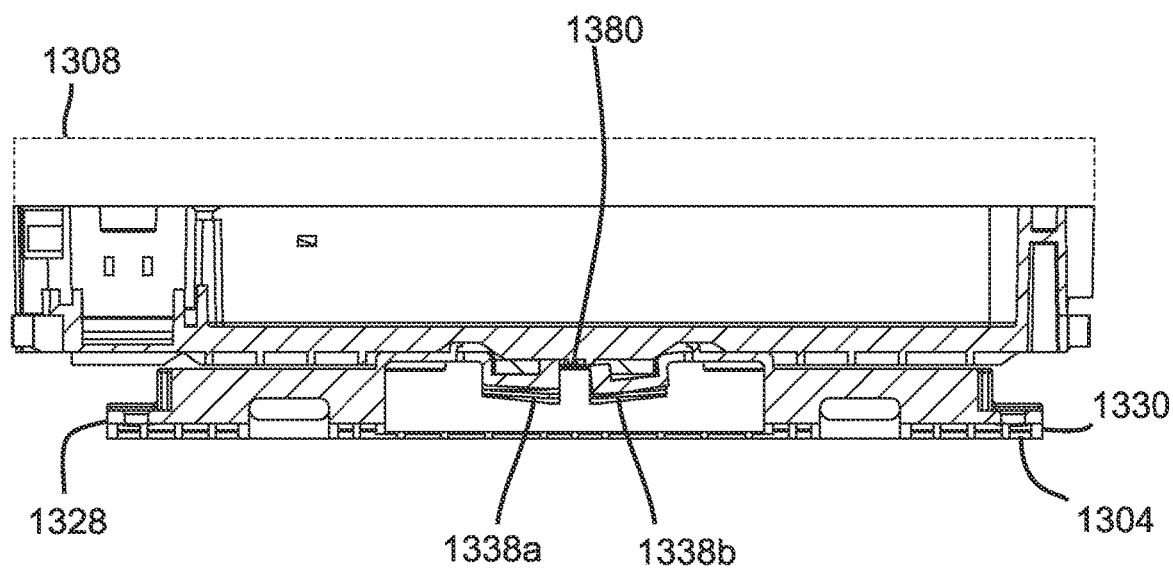
FIG. 59 is a cross sectional view taken along section line 57-57 showing the terminal moved from the staged position of FIG. 57 to the intermediate position in which a rail of the terminal is depressing a first stop retainer of a slide lock of the terminal mounting bracket.
Figure 60:
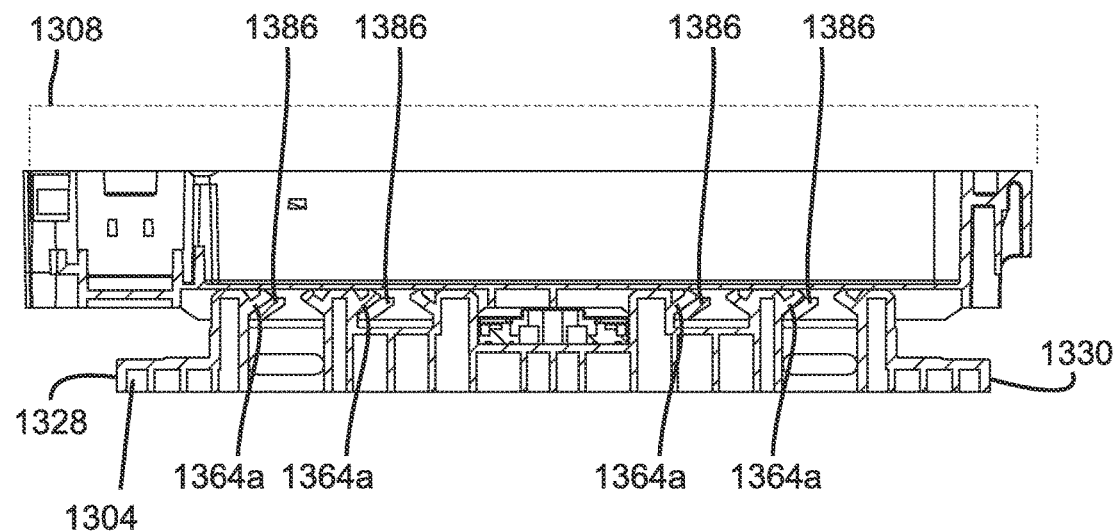
FIG. 60 is a cross sectional taken along section line 56-56 view showing the optical terminal slid from the intermediate position of FIG. 58 to an interlocked position.
Figure 61:
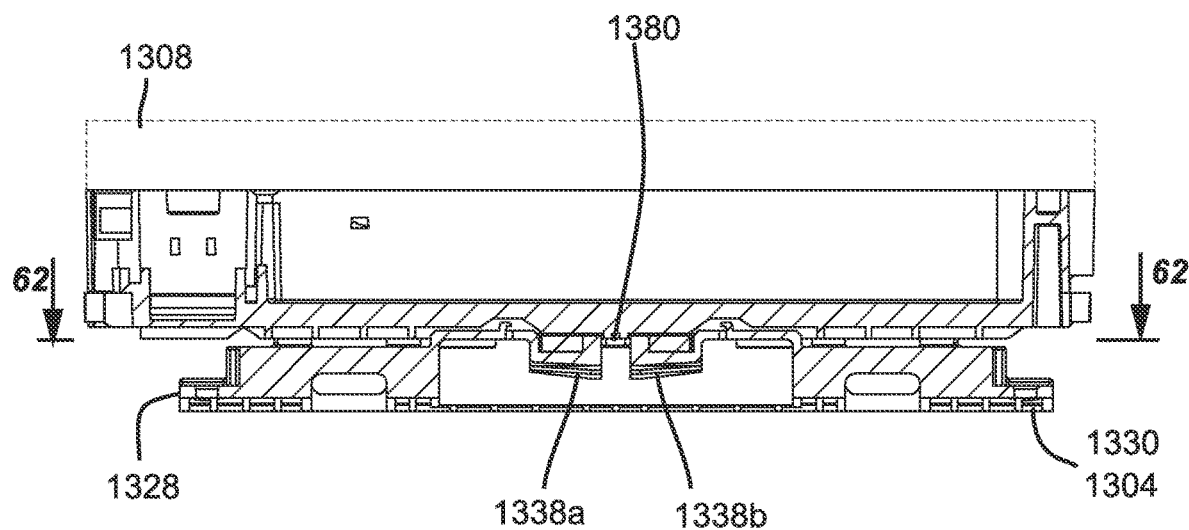
FIG. 61 is a cross sectional view taken along section line 57-57 showing the optical terminal slid to the interlocked position in which the rail of the optical terminal is secured within the slide lock of the terminal mounting bracket.

FIGS. 56-61 depict a sequence of steps for securing the terminal housing 1308 in the first mounting orientation relative to the terminal mounting bracket 1304. FIGS. 56 and 57 show the terminal housing 1308 in a staged, non-interlocked position relative to the terminal mounting bracket 1304. FIGS. 60 and 61 show the terminal housing 1308 in an interlocked position relative to the terminal mounting bracket. FIGS. 58 and 59 show the terminal housing 1308 in an intermediate, transitory state relative to the terminal mounting bracket between the non-interlocked state and the interlocked state.

Figure 63:
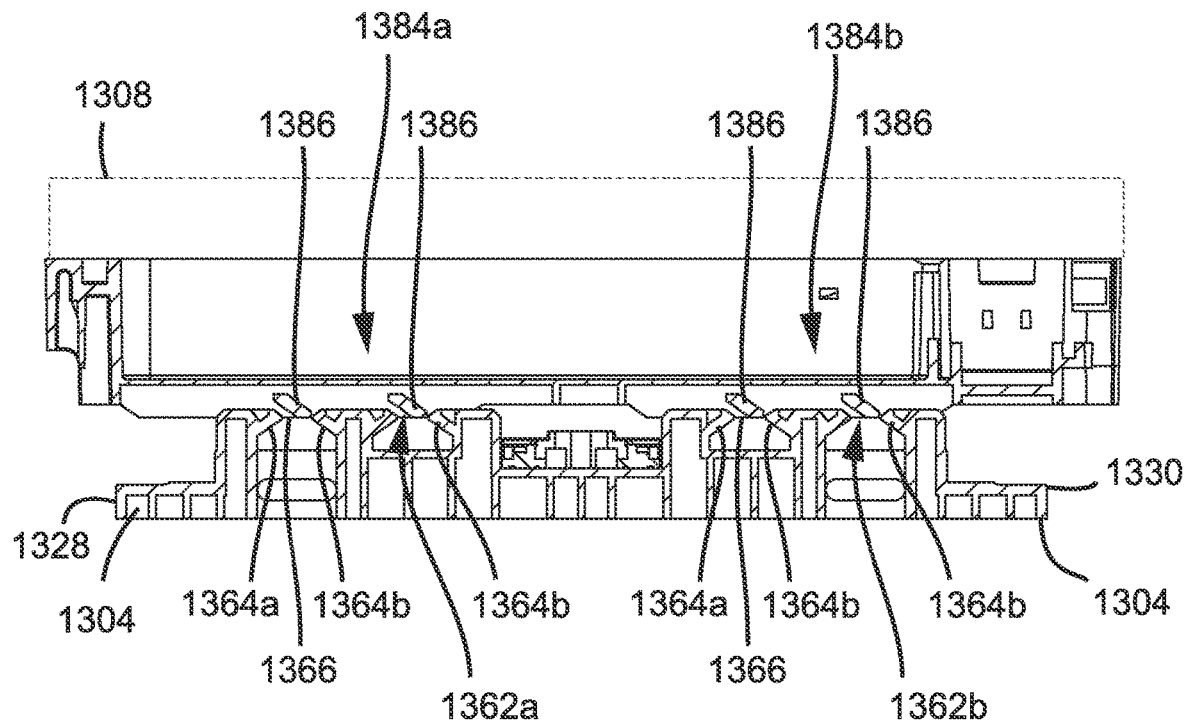
FIG. 63 is a cross sectional view though the hooking arrangement of the system of FIG. 40 showing the optical terminal in a staged position relative to the terminal mounting bracket, the optical terminal is staged in a second mounting orientation in which the optical terminal is rotated 180 degrees as compared to the first mounting orientation of FIG. 56.
Figure 64:
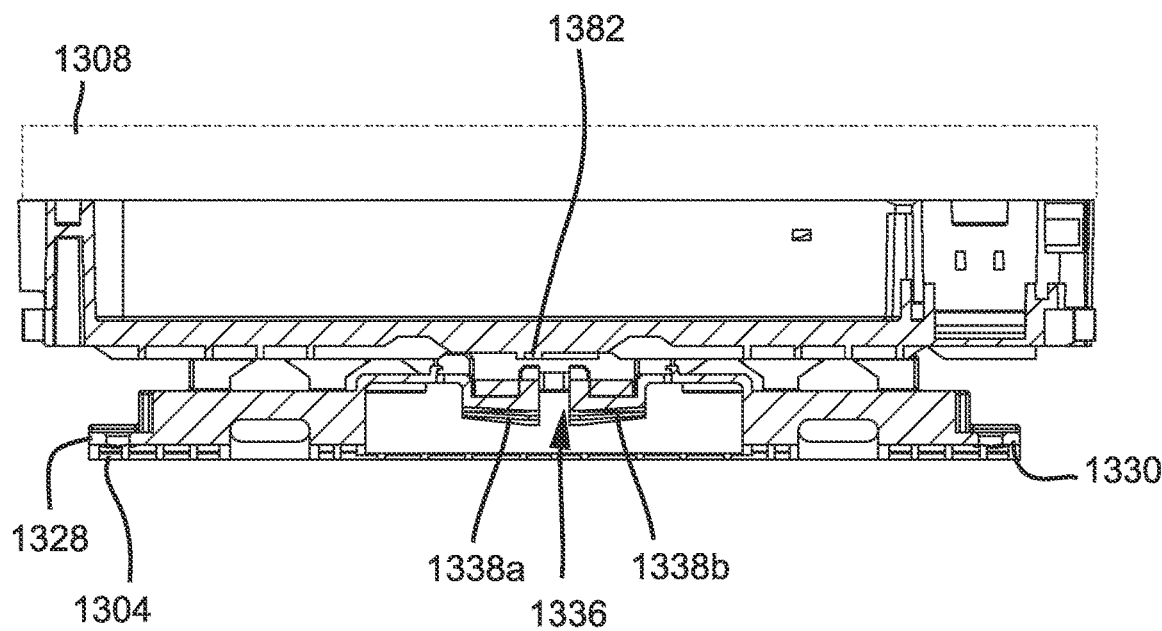
FIG. 64 is a cross sectional view through the slide lock of the system of FIG. 40 showing the optical terminal staged in the second mounting orientation.
Figure 65:
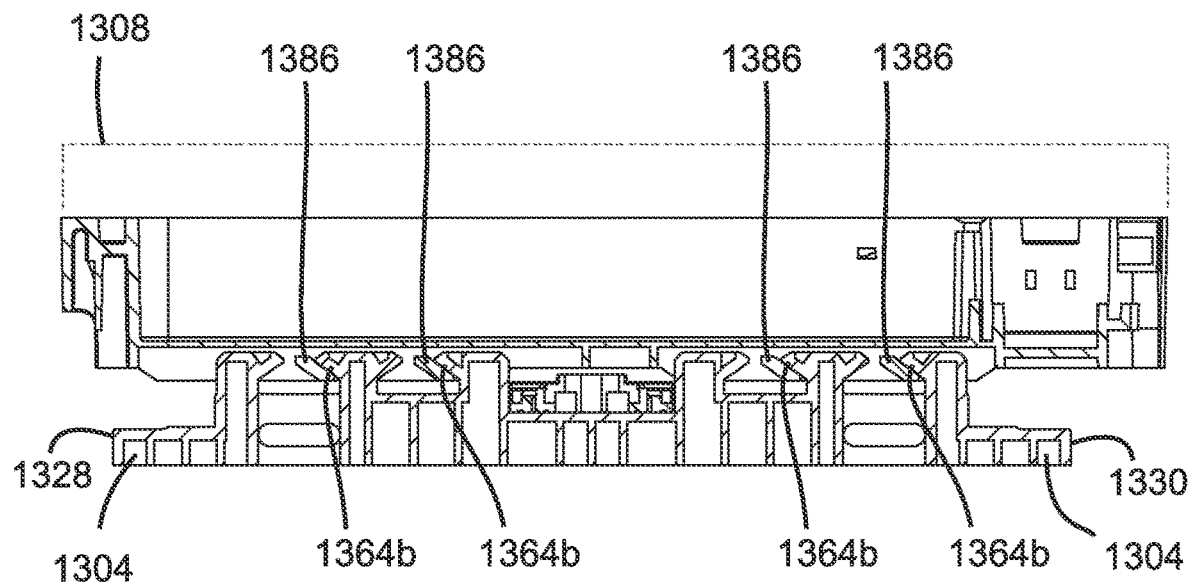
FIG. 65 is a cross sectional view through the hooking arrangement of the system of FIG. 40 showing the terminal housing slid from the staged position of FIG. 63 to an intermediate position while in the second mounting orientation.
Figure 66:
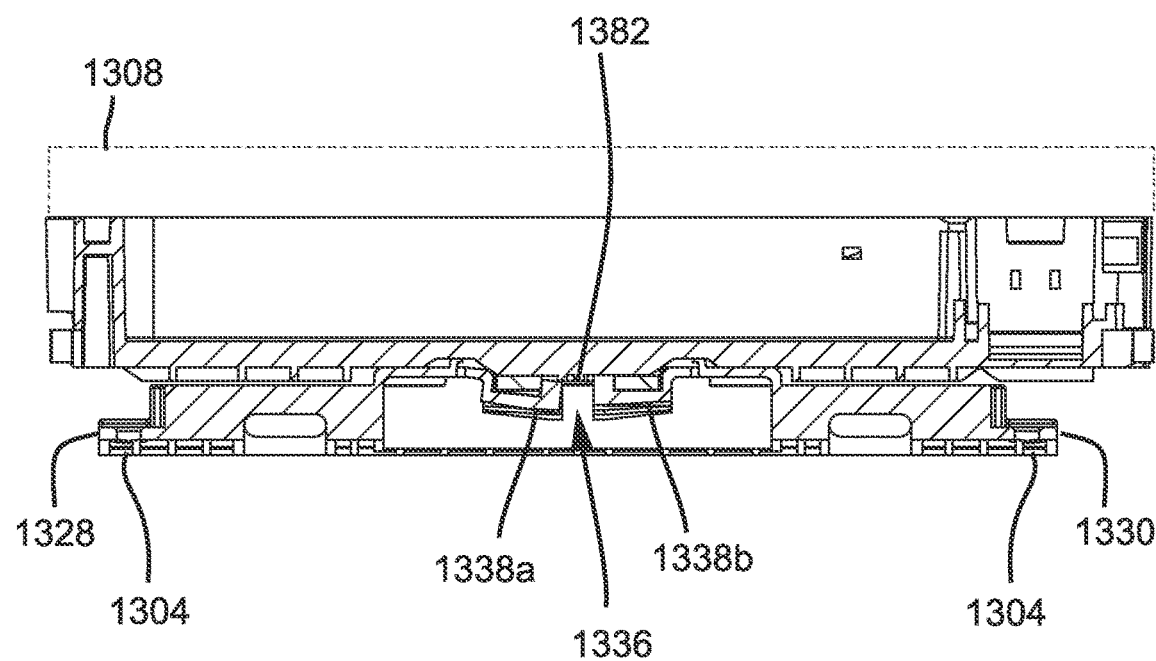
FIG. 66 is a cross sectional view cut through the slide lock of the system of FIG. 40 showing the terminal housing in the intermediate position of FIG. 65 while in the second mounting orientation.

FIGS. 63-68 depict a sequence of steps for securing the terminal housing 1308 to the terminal mounting bracket 1304 in the second mounting orientation. FIGS. 63 and 64 show the terminal housing 1308 in a staged, non-interlocked position relative to the terminal mounting bracket 1304. FIGS. 67 and 68 show the terminal housing 1308 in an interlocked position relative to the terminal mounting bracket. FIGS. 65 and 66 show the terminal housing 1308 in an intermediate, transitory state relative to the terminal mounting bracket between the non-interlocked state and the interlocked state.

When the terminal housing 1308 is interlocked with the terminal mounting bracket 1304, the stop 1382 is captured between the stop portions 1340 of the retaining elements 1338*a*, 1338*b* of the slide lock 1336 to prevent the terminal housing 1308 from sliding along the length L1 of the terminal mounting bracket 1304 from the interlocked position to the non-interlocked position. The stop 1382 is captured between the stop portions 1340 when the retaining elements 1338*a*, 1338*b* are in the forward position. By moving the retaining elements 1338*a*, 1338*b* to the rearward position via actuation of the release actuator 1314, the terminal housing 1308 can be moved at least partially in a direction along the length L1 of the terminal mounting bracket 1304 to move the terminal housing 1308 from the interlocked position to the non-interlocked position. In certain examples, when the terminal housing 1308 is interlocked with the terminal mounting bracket 1308, the interlocked hooks prevent the terminal housing 1308 from being pulled forwardly from the terminal mounting bracket, the interlocked stop arrangement prevents longitudinal movement of the terminal housing 1308 relative to the terminal mounting bracket 1304, and intermating linear guide structures (e.g., channels and rails) provided on the terminal mounting bracket 1304 and the terminal housing 1308 prevent lateral movement of the terminal housing relative to the terminal mounting bracket 1304 along the width W1 of the terminal mounting bracket 1304. For example, a longitudinal rail 1309 on the housing 1308 can fit in the linear guide channel 1332 of the bracket 1304.

To install the terminal housing 1308 in the first mounting orientation on the terminal mounting bracket 1304, the terminal housing 1308 is positioned in the staged position as shown at FIGS. 56 and 57 in which the first set of hooks 1384*a* align with the hook gap 1366 of the first set of hooks 1362*a*, the second set of hooks 1384*b* align with the hook gaps 1366 of the second set of hooks 1362*b*, and the stop 1382 aligns with the stop portion 1340 of the second retaining element 1338*b*. From the staged position of FIGS. 56 and 57, the terminal housing 1308 is moved toward the interlocked positon of FIGS. 60 and 61 along a direction that that is angled to extend rearwardly toward the terminal mounting bracket 1304 and longitudinally toward the first end 1328 of the terminal mounting bracket 1304. As the terminal housing 1308 is moved from the staged position to the interlocked position, hooks of the first and second sets of hooks 1384a, 1384b pass through the hook gaps 1366 of the first and second sets of hooks 1362a, 1362b, and the stop 1382 pushes the second retaining element 1338b from the forward position to the rearward position (see FIGS. 58 and 59). When the terminal housing 1308 reaches the interlocked position, the stop 1382 moves past the second retaining element 1338b thereby allowing the second retaining element to elastically return to the forward position such that the stop 1382 is captured between the retaining elements 1338a, 1338b (see FIG. 61) thereby locking the terminal housing 1308 longitudinally in place. Also, hooks 1386 of the first and second sets of hooks 1384a, 1384b interlock with hooks of the first and second sets of hooks 1362a, 1362b (see FIG. 60). To release the terminal housing 1308 from the terminal mounting bracket 1304, the release actuator 1314 is actuated thereby forcing the retaining elements 1338a, 1338b from the forward position to the rearward position. With the retaining elements 1338a, 1338b in the rearward position, the terminal housing 1308 can be slid from the interlocked position to the non-interlocked position without interference between stop 1382 and the stop portions 1340 of the retaining elements 1338a, 1338b. When the terminal housing 1308 reaches the non-interlocked position, the secondary cam arrangement 1360 can cause the release actuator 1314 to move back to the centered position.

When the terminal housing 1308 is mounted on the terminal mounting bracket 1304, the length L1, width W1 and depth D1 of the terminal mounting bracket 1304 correspond with the length L2, width W2 and depth D2 of the terminal housing 1308. With the terminal housing 1308 mounted in the first mounting orientation relative to the terminal mounting bracket 1304, the first end 1328 of the terminal housing 1308 is positioned at the first end 1328 of terminal mounting bracket 1304 and the second end 1380 of the terminal housing 1308 is positioned at the second end 1330 of the terminal mounting bracket 1304. It will be appreciated that the rotational orientation of the terminal housing 1308 is rotated 180 degrees with respect to the terminal mounting bracket 1304 between the first mounting orientation and the second mounting orientation. In the second mounting orientation, the first end 1328 of the terminal housing 1308 is positioned adjacent the second end 1330 of the terminal mounting bracket 1304 and the second end 1380 of the terminal housing 1308 is positioned adjacent the first end 1328 of the terminal mounting bracket 1304.

FIGS. 63-68 depict a sequence of steps for securing the terminal housing 1308 in the second mounting orientation relative to the terminal mounting bracket 1304. FIGS. 63 and 64 show the terminal housing 1308 in a staged, non-interlocked position relative to the terminal mounting bracket 1304. In the staged position of FIGS. 63 and 64, the hooks 1386 of the second set of hooks 1384b align with the hook gap 1366 of the first set of hooks 1362a and the hooks 1386 of the first set of hooks 1384a align with the hook gaps 1366 of the second set of hooks 1362b. Also, the stop 1386 aligns with the stop portion 1340 of the first retaining element 1338a. From the staged position of FIGS. 63 and 64, the terminal housing 1308 is moved relative to the terminal mounting bracket 1304 toward the interlocked position of FIGS. 67 and 68. The movement is along a direction angled to extend partially rearwardly and partially longitudinally toward the second end 1330 of the terminal mounting bracket 1304. As the terminal housing 1308 is moved toward the interlocked position, the hooks 1386 pass through the hook gaps 1366 and the stop 1382 depresses the first retaining element 1338a from the forward position to the rearward position (see FIGS. 65 and 66). Upon reaching the interlocked position of FIGS. 67 and 68, the stop 1382 moves past the stop portion 1340 of the first retaining element 1338a thereby allowing the first retaining element 1338a to elastically return from the rearward position to the forward position in which the stop 1382 is captured between the stop portions 1340 of the retaining elements 1338a, 1338b to prevent longitudinal sliding movement of the terminal housing 1308 relative to the mounting bracket 1304. In this way, the slide lock 1336, prevents sliding movement in the longitudinal orientation between the terminal housing 1308 and the terminal mounting bracket 1304 to prevent the terminal housing 1308 from being displaced from the interlock position. To remove the terminal housing 1308 from the terminal mounting bracket 1304, the release actuator 1314 is actuated to cause the retaining elements 1338a, 1338b to move from the forward position to the rearward position. With the retaining elements 1338a, 1338b retracted, the terminal housing 1308 can be longitudinally slid relative to the terminal mounting bracket 1304 from the interlocked position of FIGS. 67 and 68, through the intermediate state of FIGS. 65 and 66 to the non-interlock position of FIGS. 63 and 64. As the terminal housing 1308 is moved from the interlocked position of FIGS. 67 and 68 to the non-interlocked position of FIGS. 63 and 64, the secondary cam arrangement 1360 causes the release actuator 1314 to move back to the centered position.

Figure 70:
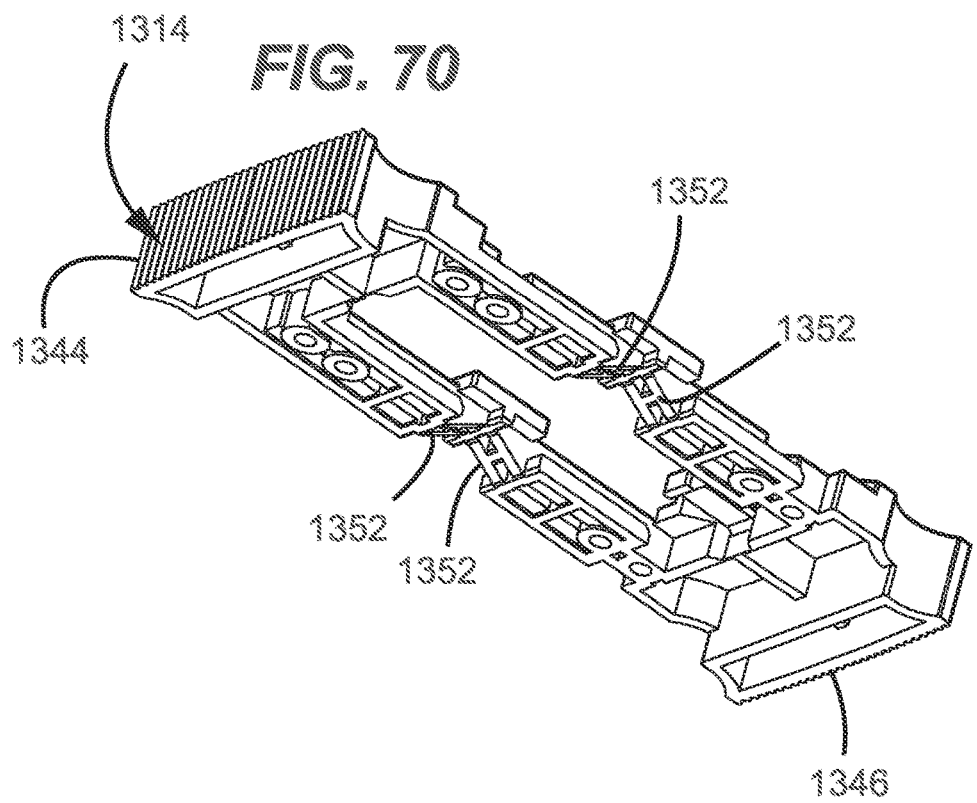
FIG. 70 is a rear, perspective of the release actuator of FIG. 69.
Figure 71:
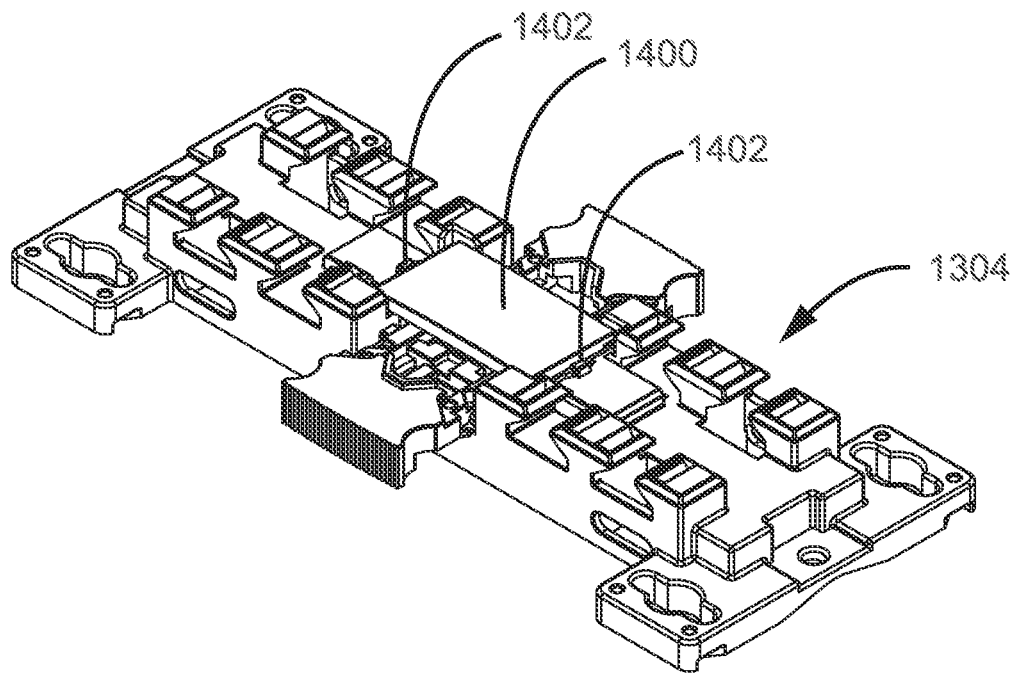
FIG. 71 is a front, perspective view of the terminal mounting bracket of FIG. 43 with an informational panel mounted at a front side of the terminal mounting bracket.

FIG. 70 shows an example identification plate 1400 (e.g., card, panel, etc.) mounted at the front side 1310 of the terminal mounting bracket 1304 via mounting tabs 1402. In the depicted example, the identification plate 1400 covers the slide lock 1336 thereby blocking access to the slide lock 1336. Therefore, it is required for the identification plate 1400 to be removed from the front side of the terminal mounting bracket 1304 before the terminal housing 1308 is secured to the terminal mounting bracket 1304. It will be appreciated that the identification plate can provide information such as installation instructions, model numbers, compatibility information relating to terminals and mounting brackets, geographic information about where the mounting bracket 1304 has been installed, or other information.

Figure 72:
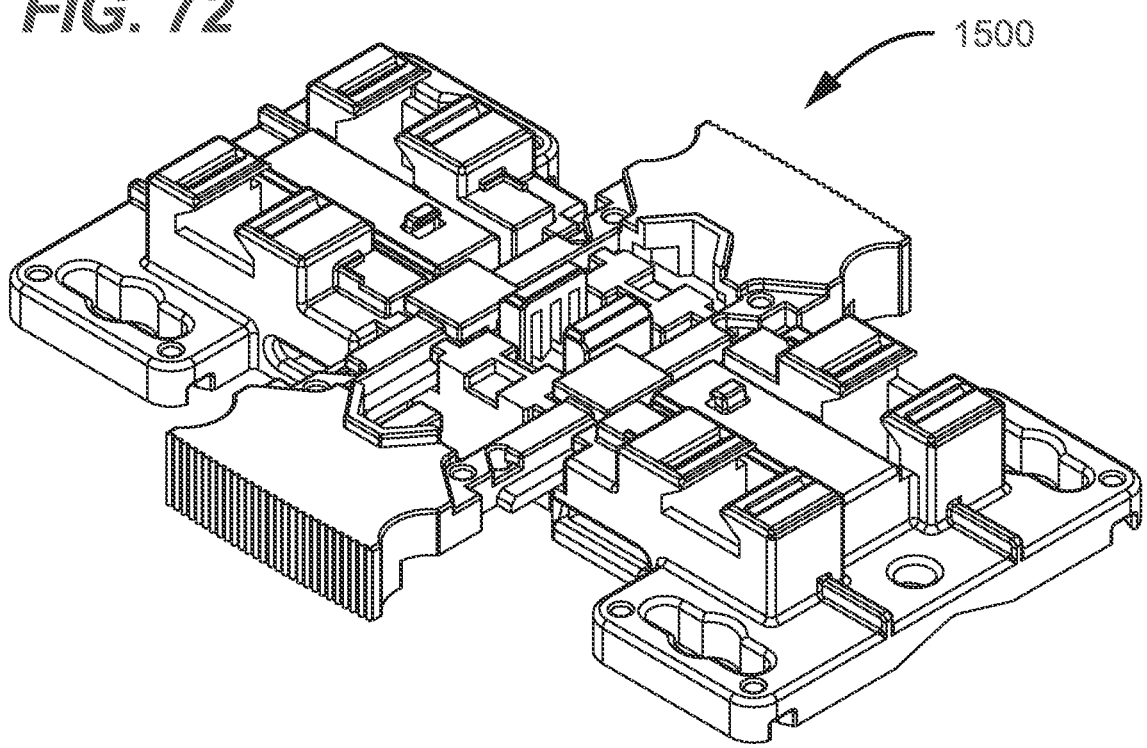
FIG. 72 depicts another terminal mounting bracket in accordance with the principles of the present disclosure.

FIG. 72 depicts another terminal mounting bracket 1500 in accordance with principles of the present disclosure. The terminal mounting bracket 1500 has a similar configuration as the terminal mounting bracket 1304, except the terminal mounting bracket 1500 has a reduced number of interlock hooks.

Figure 73:
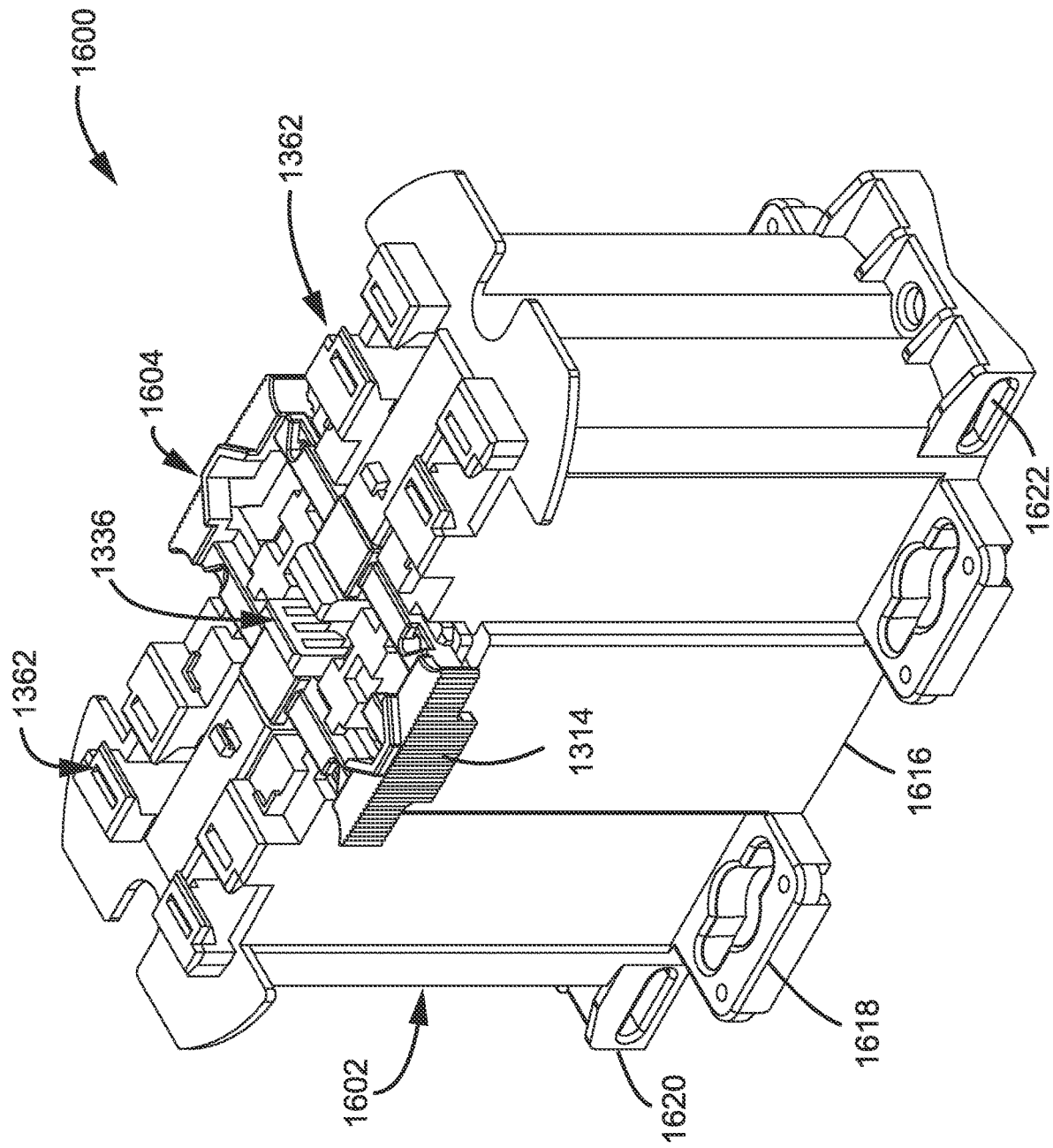
FIG. 73 is a front, side perspective view of another terminal mounting bracket in accordance with the principles of the present disclosure.
Figure 74:
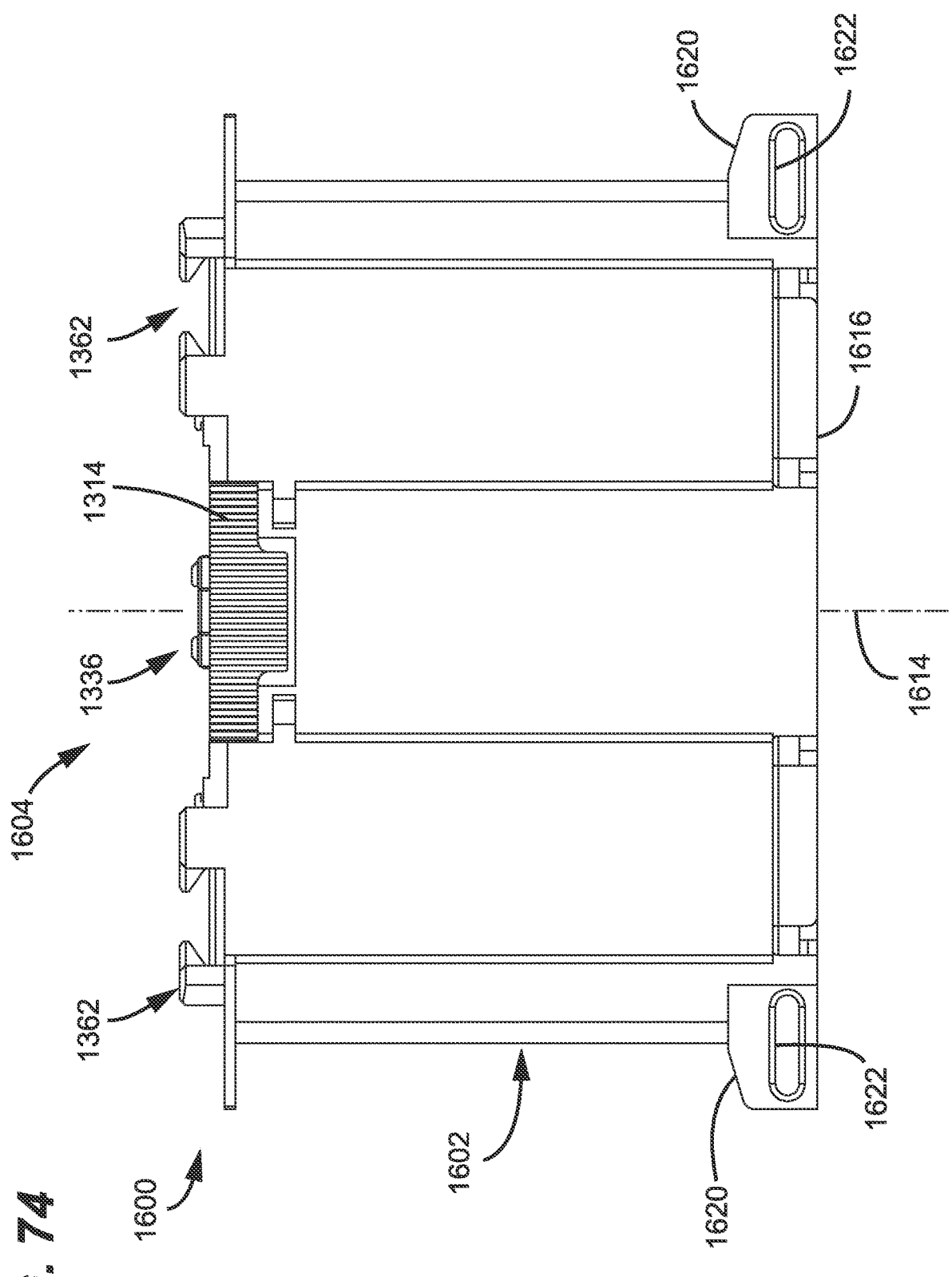
FIG. 74 is a side view of the terminal mounting bracket of FIG. 73.

FIGS. 73 and 74 depict another terminal mounting bracket 1600 in accordance with the principles of the present disclosure. The terminal mounting bracket 1600 has a similar configuration as the terminal mounting bracket 1500 and the terminal mounting bracket 1304, except the terminal mounting bracket 1600 includes an integrated cable spooling portion 1602. The terminal mounting bracket 1600 includes a front portion 1604 including a coupling arrangement adapted to interlock with a corresponding coupling arrangement provided at a rear side 1606 of a terminal housing 1608 (see FIG. 75). In the depicted example, the mechanical coupling arrangement at the front portion 1604 of the terminal mounting bracket 1600 has a configuration incorporating similar components as the mechanical coupling arrangement provided at the front side 1310 of the terminal mounting bracket 1304. For example, the front portion 1604 can include the slide lock 1336, the release actuator 1314 and sets of retention hooks 1362 of the type described with respect to the terminal mounting bracket 1304. The mechanical coupling arrangement provided at the rear side of the terminal housing 1608 is adapted to interlock with the coupling arrangement provided at the front of the terminal mounting bracket 1600 and preferably includes coupling features of the type previously described with respect to the terminal housing 1308. Example coupling features can include at least one stop and at least one hook of the type described with respect to the mechanical coupling arrangement of the terminal housing 1308.

Figure 75:
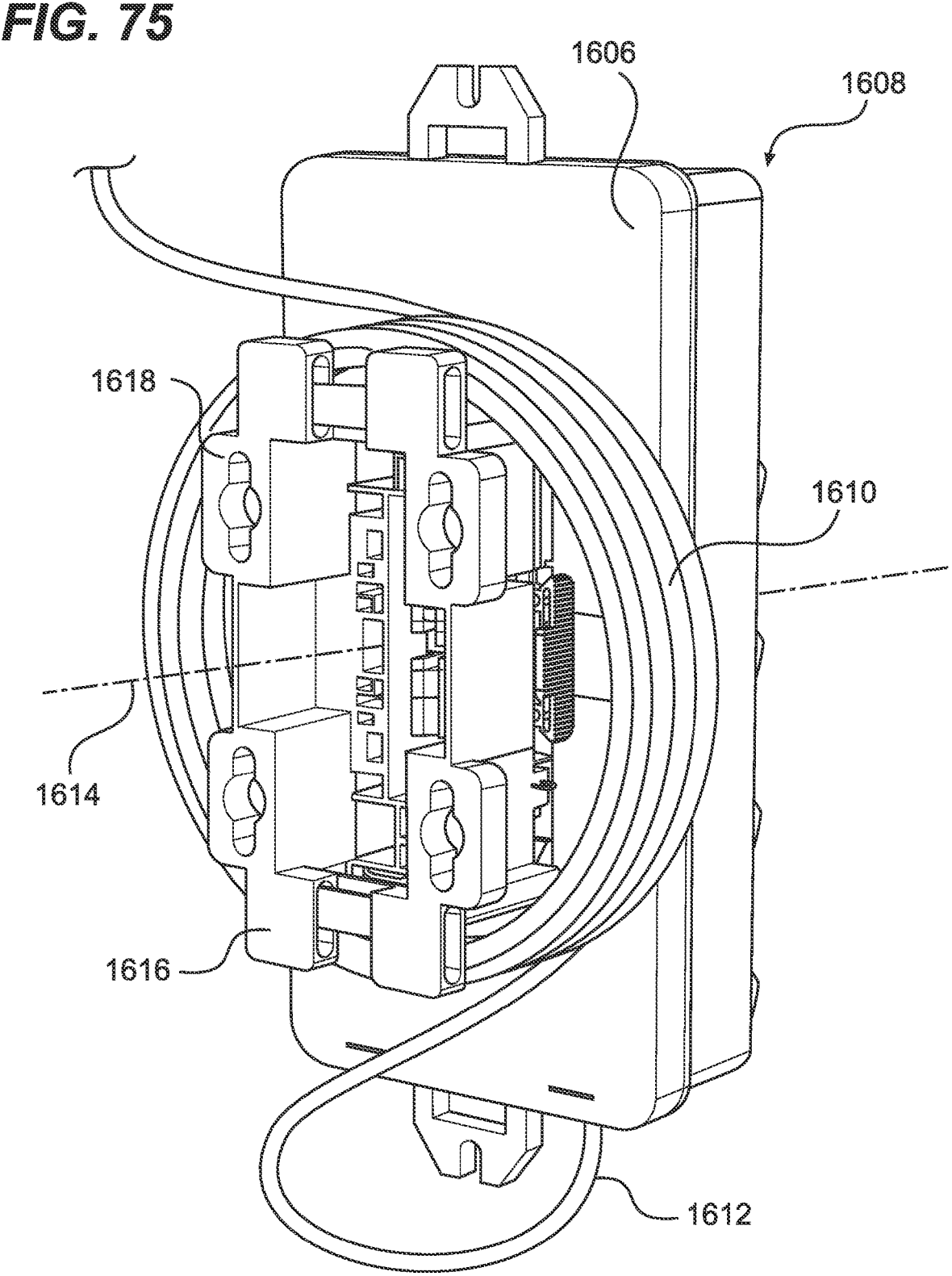
FIG. 75 depicts a terminal housing secured to the terminal mounting bracket of FIG. 73, an input cable is shown routed into the terminal housing and excess cable length of the input cable is coiled about a cable spooling portion of the terminal mounting bracket.

As shown at FIG. 75, the cable spooling portion 1602 is adapted for allowing excess cable length 1610 corresponding to a cable 1612 routed to the terminal housing 1608 to be coiled and stored. In certain examples, the cable spooling portion 1602 is located behind the terminal housing 1608 when the terminal housing 1608 is mounted to the terminal mounting bracket 1600, and the cable spooling portion 1602 defines a cable spooling axis 1614 that extends in a front-to-rear orientation. It will be appreciated that the excess cable length 1610 can be wrapped around the cable spooling portion 1602 and the cable spooling axis 1614 to coil the excess cable length 1610 about the cable spooling portion 1602. Flanges or other structures can be integrated with the terminal mounting bracket 1600 for retaining the coiled excess cable length 1610 axially on the cable spooling portion 1602. In certain examples, the cable 1612 can be an input cable routed into the terminal housing 1608 through an end of the terminal housing. In other examples, excess cable length corresponding to one or more drop cables coupled to ruggedized ports of the terminal housing 1608 can be coiled at the cable spooling portion 1602 to provide storage of excess cable length.

Referring back to FIG. 73, the terminal mounting bracket 1600 also includes a rear portion 1616 including structure for assisting in coupling the terminal mounting bracket 1600 to a structure such as a wall, pole, cable, bracket within a hand-hole or other structure to which terminals are commonly mounted in the field to build out a fiber optic network. For example, the terminal mounting bracket 1600 can include openings defined by tabs 1618 for receiving fasteners for securing the terminal mounting bracket 1600 to a structure in the field. The terminal mounting bracket 1600 can also include tabs 1620 defining openings 1622 for receiving structures such as cable ties for securing a cable (e.g., cable 1612) to the cable spooling portion 1602, or straps for securing the terminal mounting bracket 1600 to a structure in the field such as a pole. The cable spooling portion 1602 is located between the front mechanical connection arrangement adapted to interlock with the rear side of the terminal housing 1608 and the rear portion 1616 of the terminal mounting bracket 1600 adapted for connection to a structure in the field.

Figure 76:
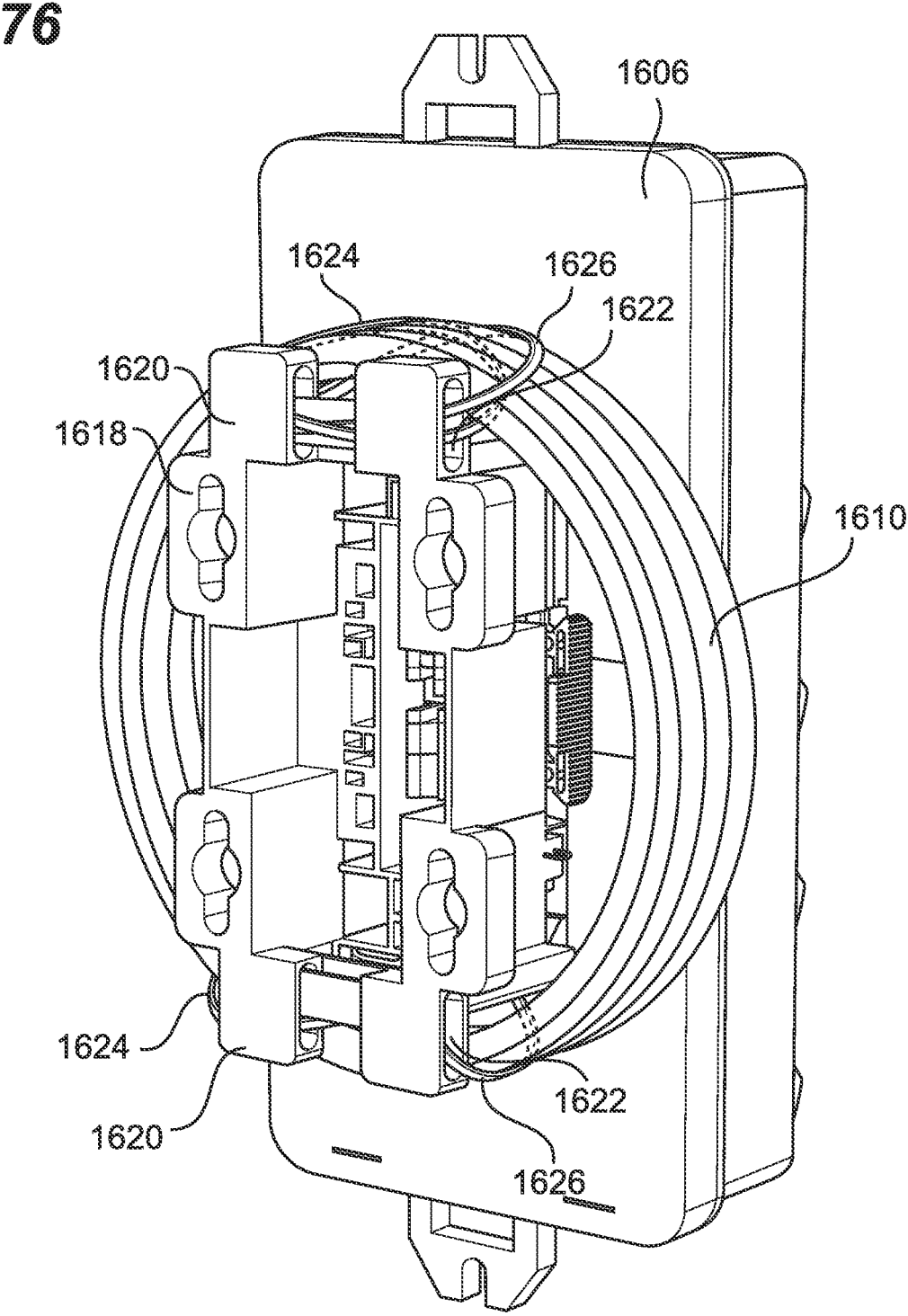
FIG. 76 depicts cable ties holding the input cable to the terminal mounting bracket using the lateral openings in the terminal mounting bracket.

In certain implementations, the openings 1622 defined in the tabs 1620 face laterally relative to the cable spooling axis 1614. In certain examples, the openings 1622 extend circumferentially along the winding path about the cable spooling portion 1602. A first cable tie 1624 is wrapped diagonally around the coiled cable 1610 and through the openings 1622. For example, as depicted at the top of FIG. 76, the first cable tie 1624 extends out through an opening 1622 of a first of the tabs 1620, through an interior of the coil of the cable 1610 (see dashed lines), around an opposite side of the coil from the tabs 1620, over an outer surface of the coil, and into the opening 1622 of a second of the tabs 1620. In certain examples, a second cable tie 1626 also is wrapped diagonally around the coiled cable 1610. In an example, the second cable tie 1626 is wrapped in an opposite configuration from the first cable tie 1624. In the depicted example at the top of FIG. 76, the second cable tie 1626 extends out through the opening 1622 of the first tab 1620, over the outer surface of the coil, around the opposite side of the coil from the tabs 1620, through the interior of the coil of the cable 1610 (see dashed lines), and into the opening 1622 of the second tab 1620. In alternative implementations, each cable ties 1624, 1626 can secure the cable coil to a respective one of the tabs 1620 (e.g., see the bottom of FIG. 76).

Figure 77:
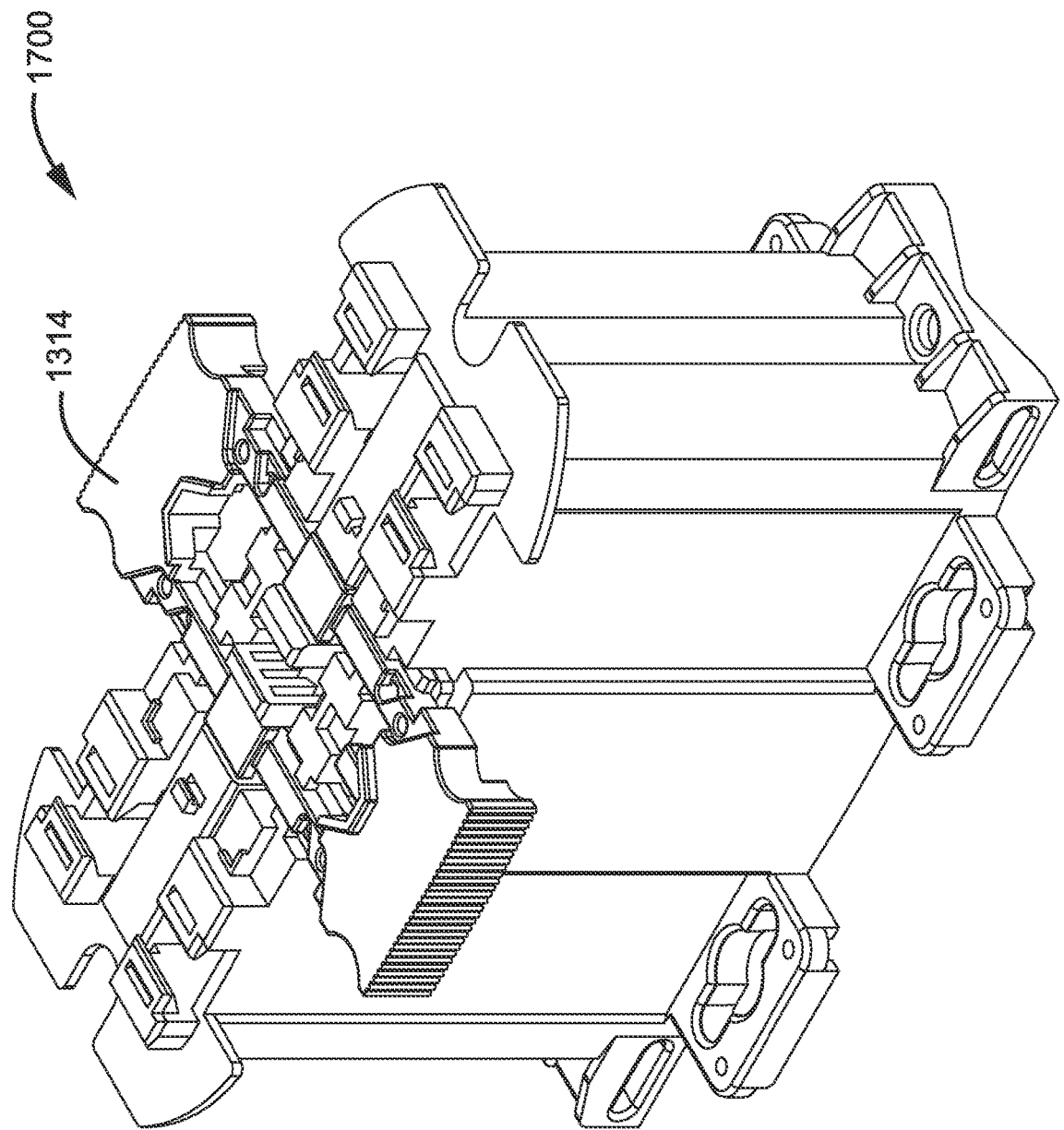
FIG. 77 depicts another terminal mounting bracket in accordance with the principles of the present disclosure.

FIG. 77 depicts another terminal mounting bracket 1700 in accordance with the principles of the present disclosure. The bracket 1700 has the same configuration as the bracket 1600, except the release actuator 1314 is longer.

Example Aspects of the Disclosure

Aspect 1. A telecommunications enclosure system comprising:
a terminal mounting bracket;
an optical terminal that mounts onto the terminal mounting bracket by linearly moving relative to the terminal mounting bracket in a first direction along a first axis, the optical terminal including a housing for enclosing optical components, the housing having at least one optical port, and front and rear sides; and
at least one latching arrangement having at least one latch that engages at least one catch to mount the optical terminal onto the terminal mounting bracket, the latching arrangement when latched prevents the optical terminal from moving in a second direction along the first axis relative to the terminal mounting bracket, and the latching arrangement unlatches from a first side of the optical terminal without accessing a second side of the optical terminal, and unlatches from the second side of the optical terminal without accessing the first side of the optical terminal.

Aspect 2. The telecommunications enclosure system of aspect 1, wherein the optical terminal does not pivot or slide relative to the terminal mounting bracket when the optical terminal mounts onto the terminal mounting bracket by linearly moving relative to the terminal mounting bracket in the first direction along the first axis.

Aspect 3. The telecommunications enclosure system of aspect 1 or 2, wherein when the latching arrangement is latched, the latching arrangement prevents movement of the optical terminal along a plane perpendicular to the first axis.

Aspect 4. The telecommunications enclosure system of any of aspects 1-3, further comprising a latch actuator that is moveable in opposite first and second directions along a second axis to unlatch the latching arrangement, the second axis being transverse to the first axis.

Aspect 5. The telecommunications enclosure system of aspect 4, wherein the latching arrangement includes a cam arrangement to use movement of the latch actuator along the second axis into a flexing of the at least one latch along a third axis to disengage the at least one catch, the third axis being transverse to the first and second axes.

Aspect 6. The telecommunications enclosure system of aspect 5, wherein the cam arrangement is defined between the latch actuator and the terminal mounting bracket, the terminal mounting bracket including the at least one latch of the latching arrangement, the optical terminal includes the at least one catch, and the cam arrangement uses movement of the latch actuator in the first or second directions along the second axis to disengage the at least one catch.

Aspect 7. The telecommunications enclosure system of aspect 6, wherein the cam arrangement includes first angled surfaces on the latch actuator and corresponding second angled surfaces on the terminal mounting bracket, and movement of the latch actuator in the first or second directions along the second axis allows a first angled surface to engage a corresponding second angled surface to flex the at least one latch on the terminal mounting bracket in first or second directions along the third axis to disengage the at least one catch.

Aspect 8. The telecommunications enclosure system of any of aspects 6 or 7, wherein a nested relationship is provided by a nest feature defined by the terminal mounting bracket and a corresponding nest feature defined by the rear side of the housing, the nested relationship preventing relative movement between the optical terminal and the terminal mounting bracket along a plane perpendicular to the first axis.

Aspect 9. The telecommunications enclosure system of any of aspects 6-8, wherein the latch actuator is accessible from adjacent opposite sides of the optical terminal when the optical terminal is mounted onto the terminal mounting bracket.

Aspect 10. The telecommunications enclosure system of aspect 5, wherein the terminal mounting bracket includes the at least one latch of the latching arrangement, the optical terminal includes the at least one catch, and the cam arrangement is defined between the latch actuator and the terminal mounting bracket and uses movement of the latch actuator in first and second directions along the second axis to disengage the at least one catch.

Aspect 11. The telecommunications enclosure system of aspect 10, wherein the latch actuator includes a ring portion that surrounds a nest feature on the terminal mounting bracket, and a nested relationship between the nest feature on the terminal mounting bracket and a corresponding nest feature on the optical terminal prevents relative movement between the optical terminal and the terminal mounting bracket in a plane perpendicular to the first axis.

Aspect 12. The telecommunications enclosure system of aspect 11, wherein the cam arrangement includes first angled surfaces on the ring portion and second angled surfaces on the at least one latch, and movement of the ring portion in the first or second directions along the second axis allows the first angled surfaces to engage the second angled surfaces to move the at least one latch in along the third axis to disengage the at least one catch.

Aspect 13. The telecommunications enclosure system of any of aspect 10-12, wherein the ring portion of the latch actuator is accessible from adjacent opposite sides of the optical terminal when the optical terminal is mounted onto the terminal mounting bracket.

Aspect 14. The telecommunications enclosure system of any of aspect 10-13, wherein the latch actuator includes secondary latches to mount the latch actuator onto the terminal mounting bracket, the secondary latches allowing the latch actuator to move relative to the terminal mounting bracket in the first and second directions along the second axis.

Aspect 15. The telecommunications enclosure system of aspect 5, wherein the optical terminal includes a first mechanical interface that mounts onto a second mechanical interface of the latch actuator, and the latch actuator includes a central portion surrounded by a ring portion, the central portion including the at least one latch of the latching arrangement, the terminal mounting bracket including the at least one catch of the latching arrangement Aspect 16. The telecommunications enclosure system of aspect 15, wherein the cam arrangement is defined between the central portion and the ring portion, and uses movement of the ring portion in the first and second directions along the second axis to unlatch the latch actuator from the terminal mounting bracket, and allowing the optical terminal to be removed from terminal mounting bracket in the second direction along the first axis.

Aspect 17. The telecommunications enclosure system of aspect 16, wherein the latch actuator includes one or more elastic members connecting the ring portion to the central portion, the one or more elastic members biasing the ring portion toward a neutral position relative to the central portion and enabling the ring portion to be moveable from the neutral position relative to the central portion in the first and second directions of the second axis.

Aspect 18. The telecommunications enclosure system of any of aspects 15-17, wherein the cam arrangement includes first angled surfaces on the ring portion and corresponding second angled surfaces on the central portion, and movement of the ring portion in the first or second directions along the second axis allows the first angled surfaces to engage the second angled surfaces to disengage the at least one latch along the third axis.

Aspect 19. The telecommunications enclosure system of any of aspects 15-18, wherein the ring portion of the latch actuator is accessible from adjacent opposite sides of the optical terminal when the optical terminal is mounted onto the latch actuator and the latch actuator is mounted onto terminal mounting bracket.

Aspect 20. The telecommunications enclosure system of any of aspects 15-19, wherein a nested relationship is provided by the central portion and a nest feature on the terminal mounting bracket, the nested relationship limiting relative movement between the optical terminal and the terminal mounting bracket along a plane perpendicular to the first axis.

Aspect 21. A mechanical coupling interface comprising:

a first mechanical coupling arrangement including a first nest feature and a ring, the ring being positionable in a centered position relative to the first nest feature, the ring being moveable relative to the first nest feature from the centered positon in first and second opposite directions along a first orientation, the first mechanical coupling arrangement also including a retention latch; and a second mechanical coupling arrangement including a second nest feature and a retention catch fixed relative to the second nest feature, the first and second nest features being configured to be mated together by inserting the first and second nest features together along a second orientation that is perpendicular relative to the first orientation, the first and second nest features, when mated together, being configured to resist relative movement relative to one another in the first orientation and in a third orientation perpendicular to the first and second orientations, the first and second nest features being insertable together in an insertion direction along the second orientation, the first and second nest features having a limited a depth of insertion between the first and second nest features corresponding to when the first and second nest features are fully inserted together;

the retention latch being configured to oppose the retention catch when the ring is in the centered position while the first and second nest features are fully inserted together such that engagement between the retention latch and the retention catch prevents the first and second nest features from being detached from one another along the second orientation in a removal direction that is opposite from the insertion direction;

the first and second nest features being detachable from one another in the removal direction when the ring is in a first latch disengagement position in which: a) the ring is offset in the first direction from the centered position; and b) the positioning of the ring allows the retention latch to be disengaged from the retention catch; and the first and second nest features being also being detachable from one another in the removal direction when the ring is in a second latch disengagement position in which: a) the ring is offset in the second direction from the centered position; and b) the positioning of the ring allows the retention latch to be disengaged from the retention catch.

Aspect 22. The mechanical coupling interface of aspect 21, wherein the retention latch is coupled to the ring and moves with the ring as the ring is moved in the first and second directions.

Aspect 23. The mechanical coupling interface of aspect 22, wherein when the ring is in the first latch disengagement position the retention latch is in a first non-retaining position that is offset from the catch in the first direction when the first and second nest features are nested together, and wherein when the ring is in the second latch disengagement position the retention latch is in a second non-retaining position that is offset from the catch in the second direction when the first and second nest features are nested together.

Aspect 24. The mechanical coupling interface of aspect 21, wherein the retention latch is coupled to the first nest feature, wherein the retention latch is configured to flex relative to the first nest feature between a retaining position and an non-retaining position, wherein the retention latch is adapted to engage the catch to retain the first and second nest features together when in the retaining position, wherein the retention latch is adapted to be disengaged from the catch when in the non-retaining position such that first and second nest features can be separated from one another, wherein a first cam arrangement defined between the retention latch and the ring allows the retention latch to flex relative to the first nest feature from the retaining position to the non-retaining position when the ring is moved relative to the first nest feature in the first direction from the centered position, and wherein the first cam arrangement also allows the retention latch to flex relative to the first nest feature from the retaining position to the non-retaining position when the ring is moved relative to the first nest feature in the second direction from the centered position.

Aspect 25. The mechanical coupling interface of aspect 24, further comprising a second cam arrangement defined between the retention latch and the catch for causing the retention latch to be deflected from the retaining position to the non-retaining position as the first and second nest features are inserted together, wherein the retention latch is a flexible arm, and wherein elasticity of the flexible arm returns the retention latch to the retaining position once the first and second nest features have been fully inserted together.

Aspect 26. The mechanical coupling interface of aspect 21, wherein the ring is connected to the first nest feature by at least one elastic member that allows the ring to be moved in the first and second directions along the first orientation relative to the first nest feature and that biases the ring toward the centered position, wherein the latch is coupled to the ring and moves with the ring as the ring is moved in the first and second directions, wherein when the first and second nest structures are inserted together in the insertion direction a cam arrangement forces the ring to the first or second latch disengagement position to allow the retention latch to move past the retention catch, and wherein once the retention latch moves past the retention catch during insertion in the insertion direction the elastic member automatically returns the ring to the centered position in which the retention latch opposes the retention catch.

Aspect 27. The mechanical coupling interface of aspect 26, wherein the first mechanical coupling arrangement includes a plurality of the elastic members positioned between the first nest feature and the ring about a perimeter of the first nest feature.

Aspect 28. The mechanical coupling interface of aspect 27, wherein the elastic members include plastic arms each arranged in a U-shape.

Aspect 29. The mechanical coupling interface of aspect 26, wherein the ring includes reinforcing tabs that resist movement of the ring relative to the first nest feature in the removal direction along the second orientation.

Aspect 30. The mechanical coupling interface of aspect 21, wherein the first nest feature is adapted couple to an optical terminal housing for enclosing optical components, wherein the optical terminal housing includes at least one optical port, and wherein the second nest feature is configured to be coupled to a structural element in the field.

Aspect 31. The mechanical coupling interface of aspect 30, wherein the structural element includes a wall, a pole or a cable.

Aspect 32. A mechanical coupling interface comprising:

a first mechanical coupling arrangement including a first nest feature, a latch actuator and a retention latch, the latch actuator being moveable from a centered position relative to the first nest feature in first and second opposite directions along a first orientation; and a second mechanical coupling arrangement including a second nest feature and a retention catch fixed relative to the second nest feature, the first and second nest features being configured to be mated together, the retention latch and the retention catch being adapted to engage one another when the first and second nest features are mated together to retain the first and second nest features in a mated state, the first and second nest features being detachable from one another by disengaging the retention latch and the retention catch, wherein the latch actuator allows the retention latch to disengage from the retention catch when the latch actuator is moved away from the centered position in the first direction, and wherein the latch actuator also allows the retention latch to disengage from the retention catch when the latch actuator is moved away from the centered position in the second direction.

Aspect 33. The mechanical coupling interface of aspect 32, wherein the retention catch is coupled to the latch actuator and moves with the latch actuator as the latch actuator is moved in the first and second directions along the first orientation.

Aspect 34. The mechanical coupling interface of aspect 32, wherein a cam arrangement is defined between the retention latch and the latch actuator for disengaging the retention latch from the retention catch when the latch actuator is moved away from the centered position along the first orientation.

Aspect 35. The mechanical coupling interface of any of aspects 32-34, wherein the latch actuator includes a ring positioned outside the first nest feature.

Aspect 36. A telecommunications enclosure system comprising:

an optical terminal including a housing for enclosing optical components, the optical terminal also including at least one optical port provided at the housing, the optical terminal having a front side and a rear side;

a terminal mounting bracket configured to mate with the optical terminal in a nested relationship, wherein when the terminal mounting bracket and the optical terminal are in the nested relationship the rear side of the optical terminal faces toward the terminal mounting bracket and the front side of optical terminal faces outwardly from the terminal mounting bracket;

the optical terminal being linearly moveable in a rearward direction along a front-to-rear orientation relative to the terminal mounting bracket to mate the optical terminal and the terminal mounting bracket in the nested relationship; and a latching arrangement for latching the optical terminal and the terminal mounting bracket together in the nested relationship, wherein the latching arrangement is adapted to prevent the optical terminal from being moved in a forward direction relative to the terminal mounting bracket when the latching arrangement is latched.

Aspect 37. The telecommunications enclosure system of aspect 36, wherein the optical terminal is not pivoted relative to the terminal mounting bracket as the optical terminal is linearly moved in the rearward direction relative to the terminal mounting bracket to mate the optical terminal and the terminal mounting bracket in the nested relationship.

Aspect 38. The telecommunications enclosure of aspect 36 or 37, wherein the nested relationship is configured to prevent relative movement between the optical terminal and the terminal mounting bracket along a plane that is perpendicular to the front-to-rear orientation.

Aspect 39. The telecommunications enclosure system of any of aspects 36-38, further comprising a latch actuator for unlatching the latching arrangement to allow the optical terminal to be removed from the terminal mounting bracket by linearly moving the optical terminal in the forward direction relative to the terminal mounting bracket, the latch actuator being moveable in first direction transverse to the front-to-rear orientation to unlatch the latching arrangement, the latch actuator also being moveable in a second direction opposite from the first direction to unlatch the latching arrangement.

Aspect 40. The telecommunications enclosure of aspect 39, wherein the latch actuator includes a ring that includes portions accessible adjacent opposite sides of the optical terminal when the optical terminal is in the nested relationship with the terminal mounting bracket.

Aspect 41. The telecommunications enclosure of aspect 39 or 40, wherein the latch actuator carries a latch of the latching arrangement.

Aspect 42. The telecommunications enclosure of aspect 39 or 40, wherein a cam arrangement is defined between the latch actuator and a latch of the latching arrangement for unlatching the latching arrangement when the latch actuator is moved in the first direction and the second direction.

Aspect 43. The telecommunications enclosure of any of aspects 36-42, wherein the nested relationship is provided by a nest feature defined by the terminal mounting bracket and a mating nest feature defined by the housing at the rear side of the optical terminal.

Aspect 44. The telecommunications enclosure of any of aspects 36-42, wherein the optical terminal includes an adapter bracket that mounts to the housing at the rear side of the optical terminal, wherein the nested relationship is provided by a nest feature defined by the adapter bracket and a mating nest feature defined by the terminal mounting bracket.

Aspect 45. The telecommunications enclosure of aspect 43, wherein the latch actuator and the latch are integrated with the terminal mounting bracket.

Aspect 46. The telecommunications enclosure of aspect 44, wherein the latch actuator and the latch are integrated with the adapter bracket.

Aspect 47. The telecommunications enclosure of any of aspects 36-46, wherein the optical terminal has opposite first and second sides, wherein the latching arrangement can be unlatched from the first side without accessing the second side, and can be unlatched from the second side without accessing the first side.

Aspect 48. The terminal mounting bracket recited in any of aspects 1-20 and 36-47, wherein the terminal mounting bracket includes a cable spool for storing excess length of cable about a cable spooling axis extending through the cable spool.

Aspect 49. The terminal mounting bracket of aspect 48, wherein tabs extend from the cable spool to define cable tie receptacles that face laterally to the cable spooling axis.

Aspect 50. A cable spooling device for holding a cable in one or more coils, the cable spooling device comprising:

a cable support structure defining a cable spooling axis about which the cable can be coiled, the cable support structure defining a cable support surface facing outwardly from the cable spooling axis; and a tie support coupled to the cable support structure so that the tie support extends outwardly beyond the cable support surface, the tie support defining an opening extending along a passage axis that is angled relative to the cable spooling axis.

Aspect 51. The cable spooling device of aspect 50, wherein the passage axis is generally transverse to the cable spooling axis.

Aspect 52. The cable spooling device of aspect 50, wherein the tie support is one of a plurality of tie supports coupled to the cable support structure, each tie support defining a respective opening extending along a respective passage axis that is angled relative to the cable spooling axis.

Aspect 53. The cable spooling device of aspect 50, wherein the tie support includes a tab cantilevered off the cable support structure.

Aspect 54. The cable spooling device of aspect 50, wherein the cable support surface is one of a plurality of cable support surfaces facing in different directions.

Aspect 55. The cable spooling device of aspect 54, wherein the cable support surfaces include oppositely facing first and second cable support surfaces.

Aspect 56. The cable spooling device of aspect 50, wherein the cable support structure is elongate to define a non-circular cable winding path about the cable spooling axis.

Aspect 57. The cable spooling device of aspect 50, wherein the cable support structure includes mounting structure for attaching the cable support structure to a pole, vertical wall, or other installation location.

Aspect 58. The cable spooling device of aspect 57, wherein the mounting structure defines fastener openings extending parallel to the cable spooling axis.

Aspect 59. The cable spooling device of aspect 50, wherein the cable support structure forms part of a terminal mounting bracket.

The various embodiments described above are provided by way of illustration only and should not be construed to limit the claims attached hereto. Those skilled in the art will readily recognize various modifications and changes that may be made without following the example embodiments and application illustrated and described herein, and without departing from the true spirit and scope of the following claims.

What is claimed is:

1. A telecommunications enclosure system comprising:
   a terminal assembly including:
      a terminal mounting bracket;
      an optical terminal including a housing for enclosing optical components, the housing including at least one optical port, the housing including a front side and a rear side, the housing being configured to mount to the terminal mounting bracket with the rear side of the housing facing toward the terminal mounting bracket and the front side facing away from the terminal mounting bracket;
      a mechanical coupling interface defined between the rear side of the housing and a front side of the terminal mounting bracket for securing the optical terminal to the terminal mounting bracket, the mechanical coupling interface being configurable in a retention state in which the housing is locked in place with respect to the terminal mounting bracket and a release state in which the housing is removable from the terminal mounting bracket; and
      a release actuator accessible from first and second opposite sides of the terminal assembly for actuating the mechanical coupling interface from the retention state to the release state, wherein the mechanical coupling interface can be actuated from the retention state to the release state by accessing the release actuator from the first side without requiring the release actuator to be accessed from the second side, and wherein the mechanical coupling interface can be actuated from the retention state to the release state by accessing the release actuator from the second side without requiring the release actuator to be accessed from the first side.

2. The telecommunications enclosure system of claim 1, wherein the mechanical coupling interface includes a hook arrangement and a slide lock, wherein the housing is slid relative to the terminal mounting bracket from an interlocked position in which the hook arrangement is interlocked and a non-interlocked position in which the hook arrangement is not interlocked, wherein the slide lock is movable between the retention state and the release state, and wherein the slide lock is adapted to retain the housing in the interlocked position when in the retention state and is adapted to allow the housing to be moved from the interlocked position to the non-interlocked position when in the release state.

3. The telecommunications enclosure system of claim 2, wherein the slide lock includes a flexible retaining element that flexes between the retention state and the release state and that is biased toward the retention state, and wherein the flexible retaining element includes a stop adapted to oppose movement of the housing from the interlocked position to the non-interlocked position when the flexible retaining element is in the retention state.

4. The telecommunications enclosure system of claim 2, further comprising a linear guide arrangement for guiding sliding movement of the housing between the interlocked and non-interlocked positions.

5. The telecommunications enclosure system of claim 3, wherein a cam arrangement is defined between the release actuator and the flexible retaining element for moving the flexible retaining element from the retention state to the release state.

6. The telecommunications enclosure system of claim 5, wherein the flexible retaining element flexes in a rearward direction when moving from the retention state to the release state.

7. The telecommunications enclosure system of claim 1, wherein the housing is mountable to the terminal mounting bracket in a first orientation, and is also mountable to the terminal mounting bracket in a second orientation rotated 180 degrees with respect to the first orientation.

8. The telecommunication enclosure system of claim 2, wherein the slide lock includes two flexible retaining elements that flex between the retention state and the release state and that are biased toward the retention state, and wherein the flexible retaining elements include opposing stops between which a stop of the housing is captured to retain the housing in the interlocked position.

9. The telecommunications enclosure system of claim 1, wherein the release actuator includes a slide bar having opposite ends accessible at the first and second sides of the terminal assembly.

10. The telecommunications enclosure system of claim 9, wherein the terminal mounting bracket includes a width that extends between the first and second sides of the terminal assembly, a depth that extends in a front-to-back orientation and a length that extends between opposite ends of the terminal mounting bracket, wherein the slide bar extends across the width of the terminal mounting bracket, and wherein the housing slides along the length of the terminal mounting bracket when moving between an interlocked position and a non-interlocked position.

11. The telecommunications enclosure system of claim 1, wherein the mechanical coupling interface includes a nest arrangement for mounting the housing in a nested relationship with respect to the terminal mounting bracket, and wherein the mechanical coupling interface includes a latch for latching the housing and the terminal bracket together in the nested relationship, wherein the latch is movable by the release actuator between the retention position and the release position.

12. The telecommunications enclosure system of claim 11, wherein the housing is mated in the nested relationship with respect to the terminal mounting bracket by linearly moving the housing rearwardly toward the terminal mounting bracket.

13. The telecommunications enclosure system of claim 1, wherein the terminal mounting bracket includes a cable spooling portion for coiling excess cable length corresponding to cable routed to the terminal housing.

14. The telecommunications enclosure system of claim 13, wherein the terminal housing mounts in front of the terminal mounting bracket, wherein the cable spooling portion is located behind the terminal housing when the terminal housing is mounted to the terminal mounting bracket, and wherein the cable spooling portion defines a cable spooling axis that extends in a front-to-rear orientation.

15. The telecommunications enclosure system of claim 14, wherein the terminal mounting bracket also includes tabs defining cable tie openings facing laterally relative to the cable spooling axis.

16. An apparatus comprising:
   a terminal mounting bracket including a main body having a length, a width, and a depth, the depth extending between a front and a back of the terminal mounting bracket, the width extending between opposite first and second sides of the terminal mounting bracket, and the length extending between opposite first and second ends of the terminal mounting bracket, the terminal mounting bracket including:

a linear guide that extends along the length of the terminal mounting bracket;

a slide lock including first and second retaining elements centrally located on the terminal mounting bracket, the first and second retaining elements including stop portions separated by a stop gap that extends between the stop portions along the length of the terminal mounting bracket, the first and second retaining elements being flexibly movable relative to the main body of the terminal mounting bracket between a forward position and a rearward position, the first and second retaining elements being elastically biased toward the forward position;

a release bar mounted across the width of the terminal mounting bracket, the release bar having a first end at the first side of the terminal mounting bracket and a second end at the second side of the terminal mounting bracket, the release bar being adapted to slide relative the terminal mounting bracket along an orientation that extends across the width of the terminal mounting bracket, the release bar being adapted to be positioned in a centered positioned relative to the width of the terminal mounting bracket, wherein the first and second retaining elements are in the forward position when the release bar is in the centered position;

a cam arrangement defined between the release bar and the slide lock, the cam arrangement being configured such that, when the release bar is slid from the centered position toward the first side of the terminal mounting bracket, the first and second retaining elements are moved from the forward position to the rearward position, the cam arrangement also being configured such that, when the release bar is slid from the centered position toward the second side of the terminal mounting bracket, the first and second retaining elements are moved from the forward position to the rearward position; and a hook arrangement including first and second sets of hooks, the first set of hooks being positioned between the slide lock and the first end of the terminal mounting bracket, the second set of hooks being positioned between the slide lock and the second end of the terminal mounting bracket, each of the first and second sets of hooks including a pair of hooks, each pair of hooks including first and second opposing hooks separated by a hook gap that extends between the first and second opposing hooks along the length of the terminal mounting bracket.

17. The apparatus of claim 16, wherein the first and second sets of hooks each include two of the pairs of hooks which are located on opposite sides of a longitudinal center line of the terminal mounting bracket.

18. The telecommunications enclosure system of claim 16, wherein the terminal mounting bracket includes a cable spooling portion having a cable spooling axis extending along the depth of the terminal mounting bracket.

19. The telecommunications enclosure system of claim 18, wherein the terminal mounting bracket includes tabs defining cable tie openings facing laterally relative to the cable spooling axis.

20. The telecommunications enclosure system of claim 9, wherein a cam arrangement is defined between the slide bar and the mechanical coupling interface.

\* \* \* \* \*